(12) United States Patent
Kawamura

(10) Patent No.: US 9,389,400 B2
(45) Date of Patent: Jul. 12, 2016

(54) ZOOM LENS AND IMAGING APPARATUS

(71) Applicant: FUJIFILM Corporation, Tokyo (JP)

(72) Inventor: Daiki Kawamura, Saitama-ken (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/818,689

(22) Filed: Aug. 5, 2015

(65) Prior Publication Data

US 2016/0062089 A1    Mar. 3, 2016

(30) Foreign Application Priority Data

Aug. 28, 2014   (JP) .................................. 2014-174106

(51) Int. Cl.
G02B 15/14         (2006.01)

(52) U.S. Cl.
CPC ..................................... *G02B 15/14* (2013.01)

(58) Field of Classification Search
CPC .............................. G02B 15/14; G02B 15/20
USPC .................. 359/683, 684, 686, 687
See application file for complete search history.

(56) References Cited

U.S. PATENT DOCUMENTS

| 2010/0214658 A1* | 8/2010 | Ito | G02B 15/173 359/557 |
| 2013/0293967 A1* | 11/2013 | Hayakawa | G02B 15/173 359/684 |

FOREIGN PATENT DOCUMENTS

| JP | 2011-099964 | 5/2011 |
| JP | 2011-158599 | 8/2011 |
| JP | 2012-027217 | 2/2012 |
| JP | 2013-007878 | 1/2013 |
| JP | 2013-174758 | 9/2013 |

* cited by examiner

*Primary Examiner* — Scott J Sugarman
(74) *Attorney, Agent, or Firm* — Young & Thompson

(57) ABSTRACT

A zoom lens consists of, in order from the object side, a first lens group having a positive refractive power, a second lens group having a negative refractive power, one or two middle lens groups including a mp lens group having a positive refractive power, and a rearmost lens group disposed at the most image side position of the entire system and having a positive refractive power, wherein magnification change is effected by changing all distances between the adjacent lens groups, and focusing from an object at infinity to a closest object is effected by moving only the entire mp lens group or only a part of lens groups forming the mp lens group along the optical axis, the lens group moved during focusing includes a positive lens and a negative lens and has a positive refractive power as a whole, and given condition expressions are satisfied.

20 Claims, 34 Drawing Sheets

FIG.1
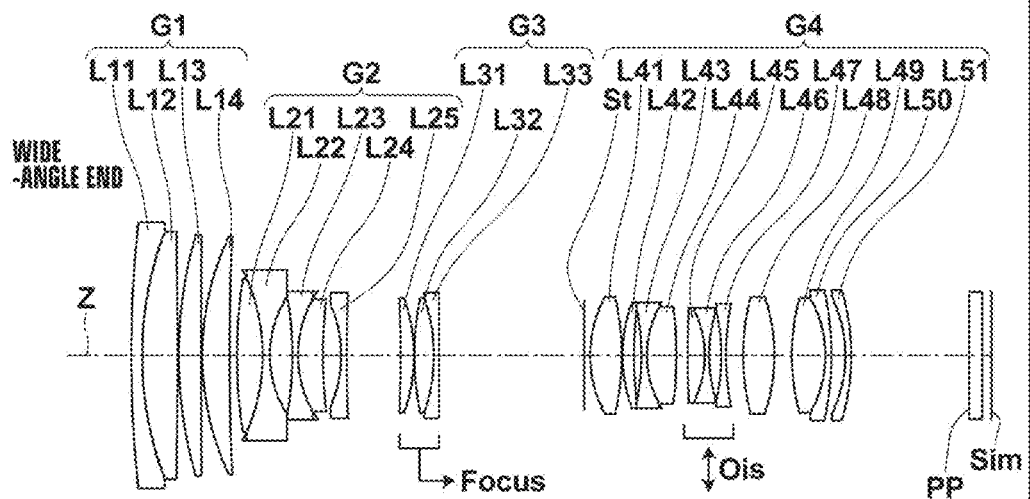
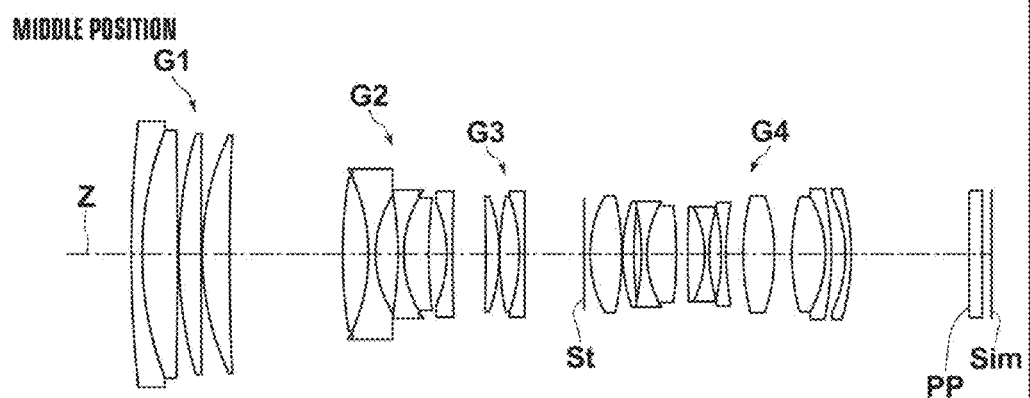
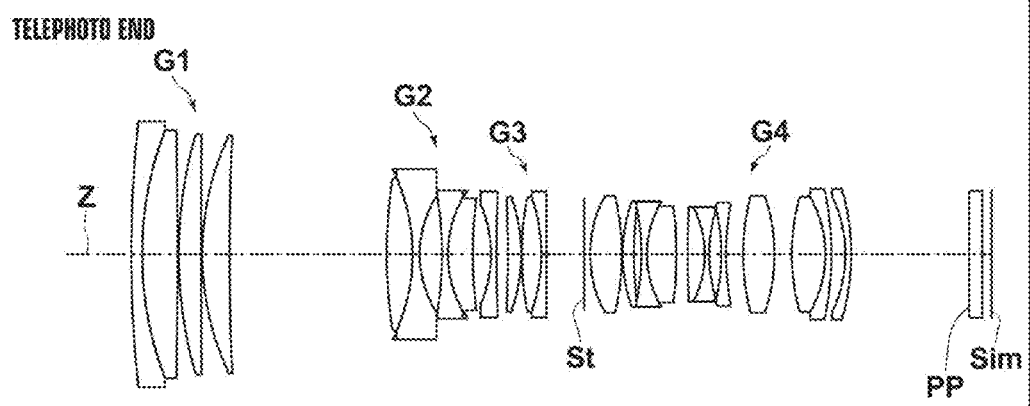

FIG.2
EXAMPLE 2
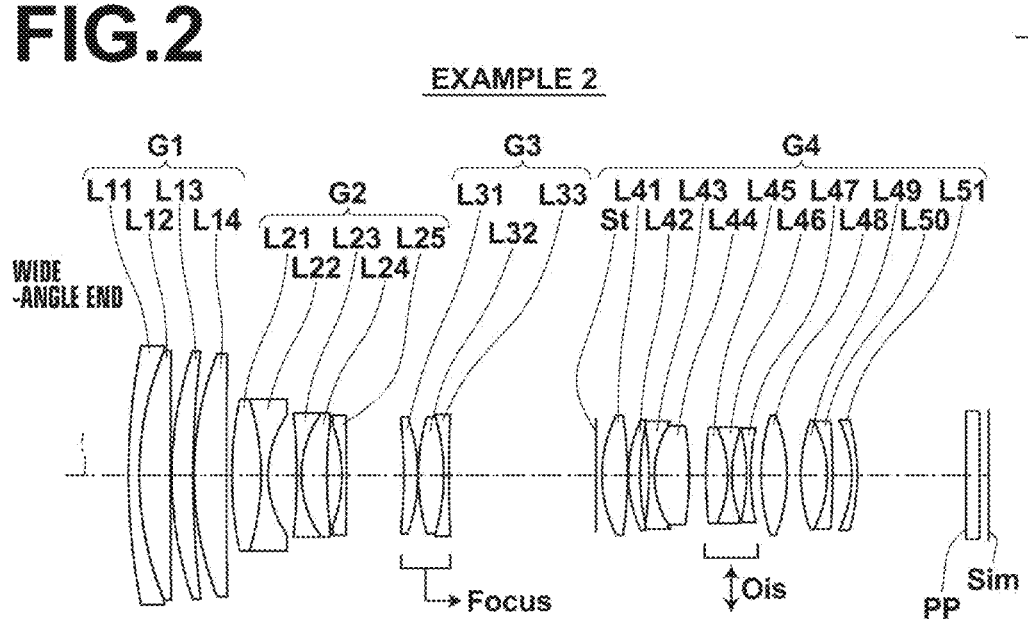
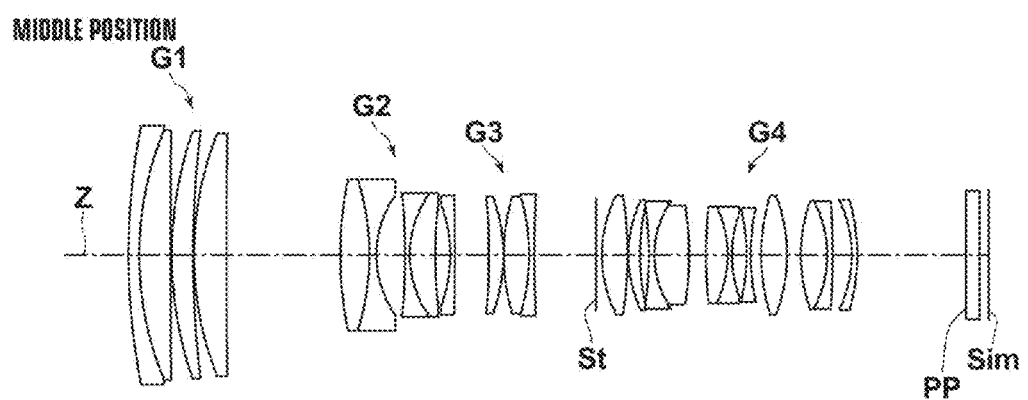
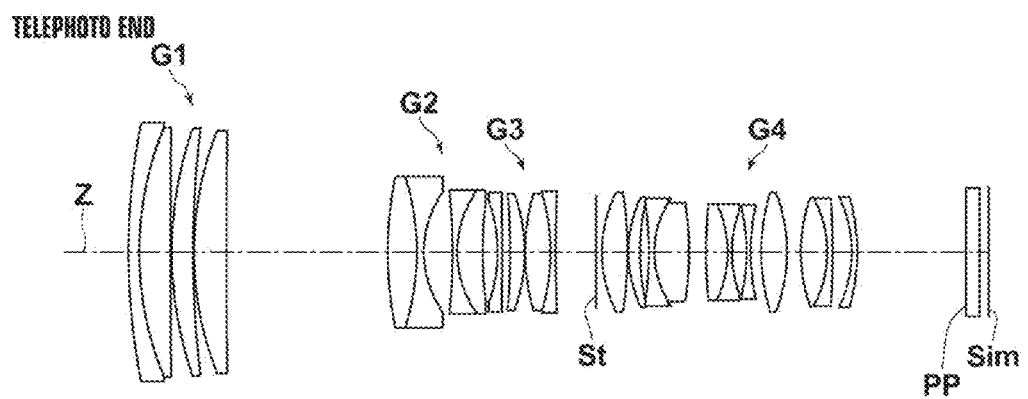

FIG.3
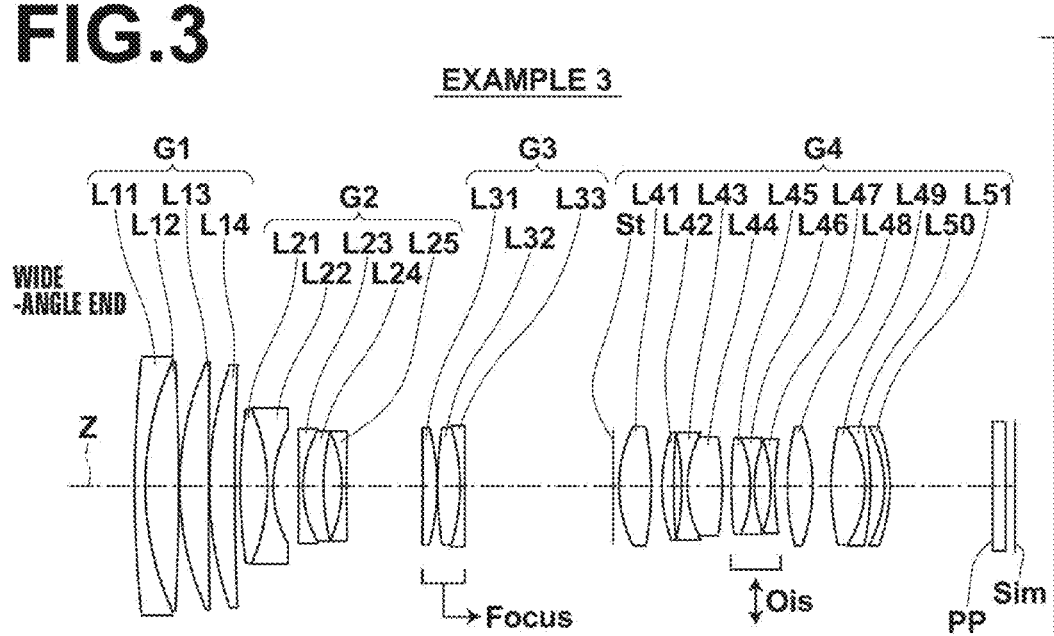
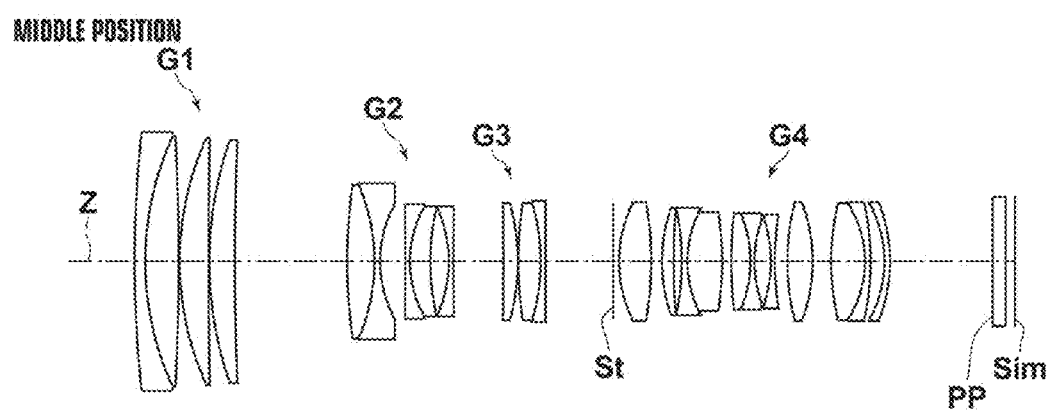
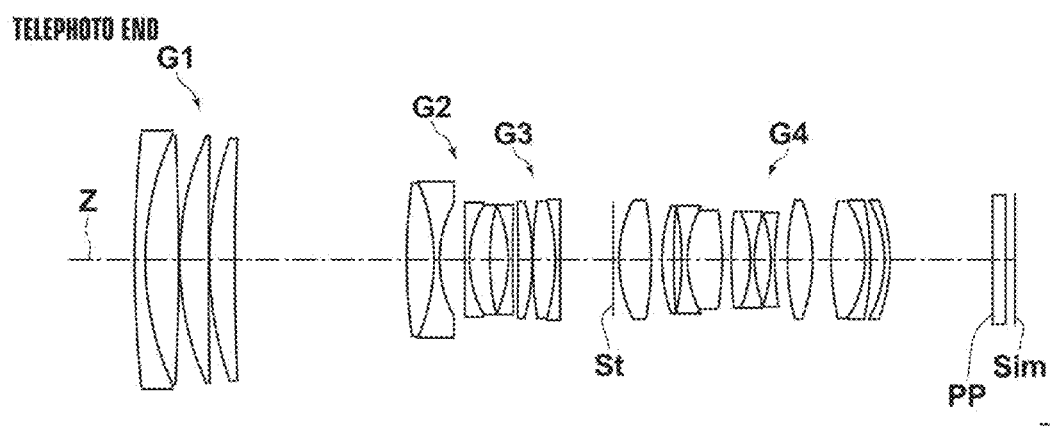

FIG.4
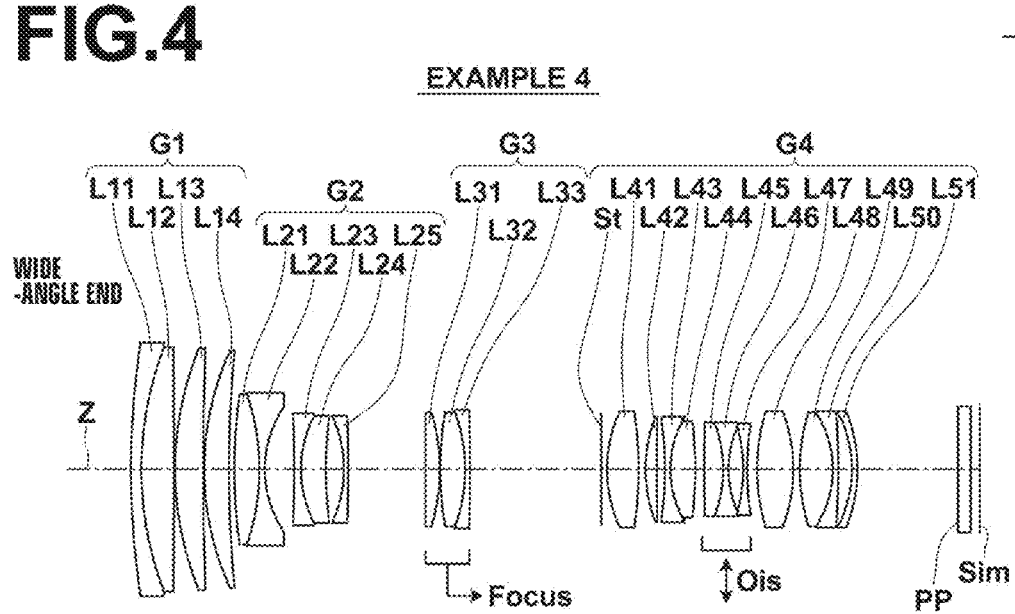
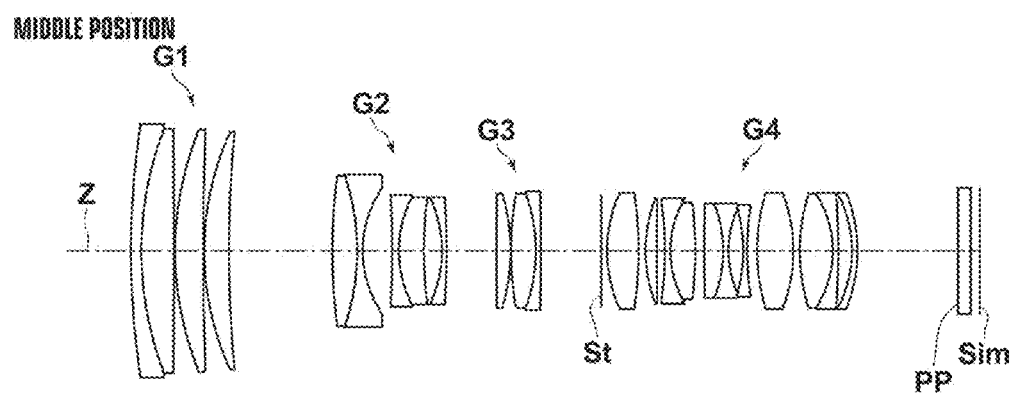
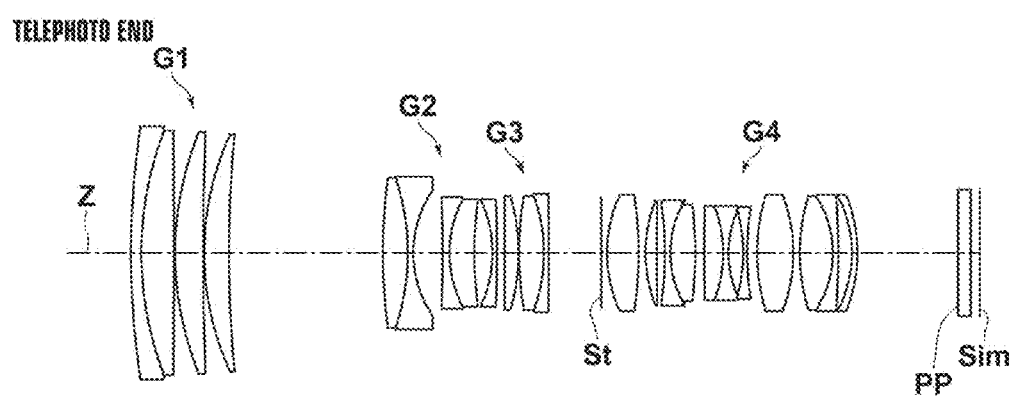

FIG.7
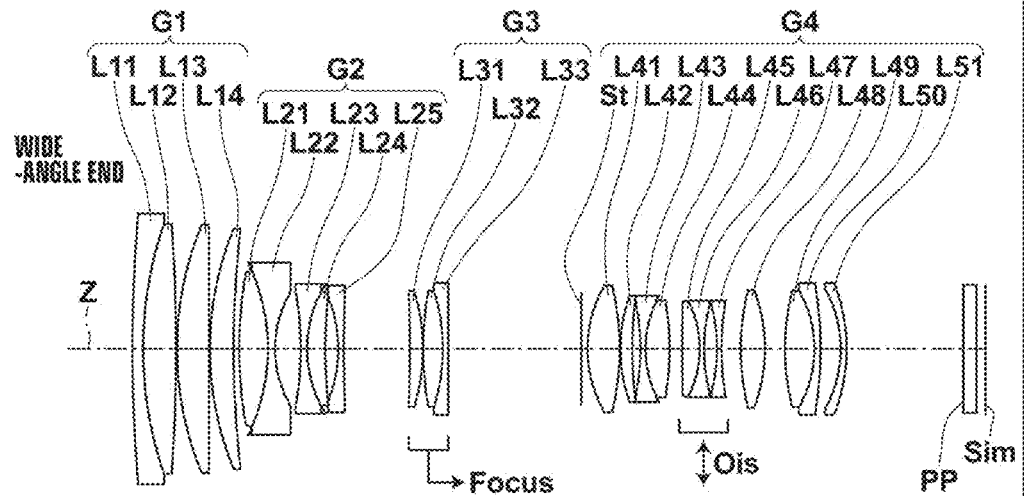
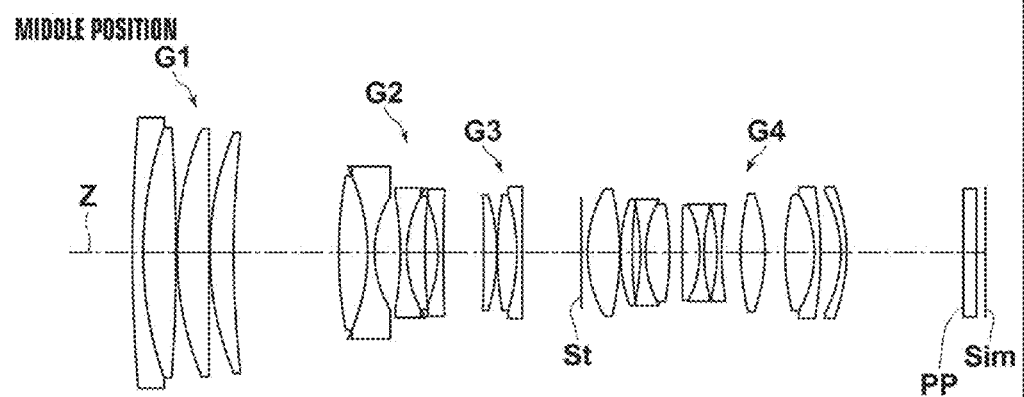
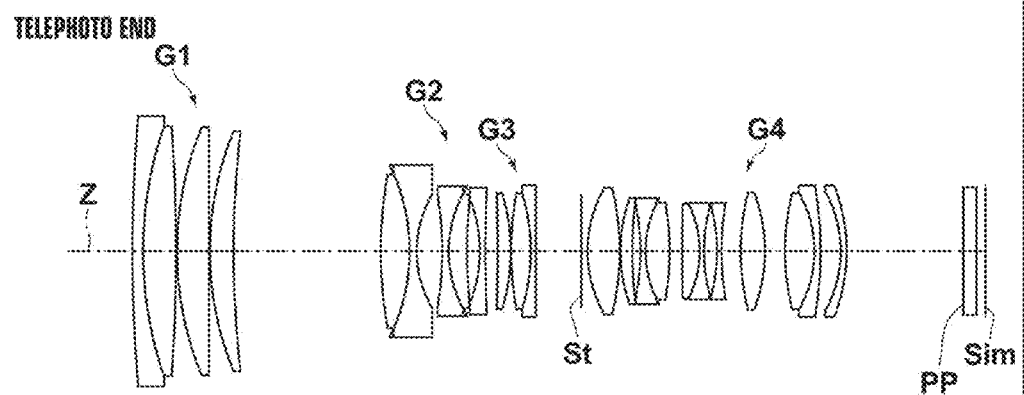

FIG.8
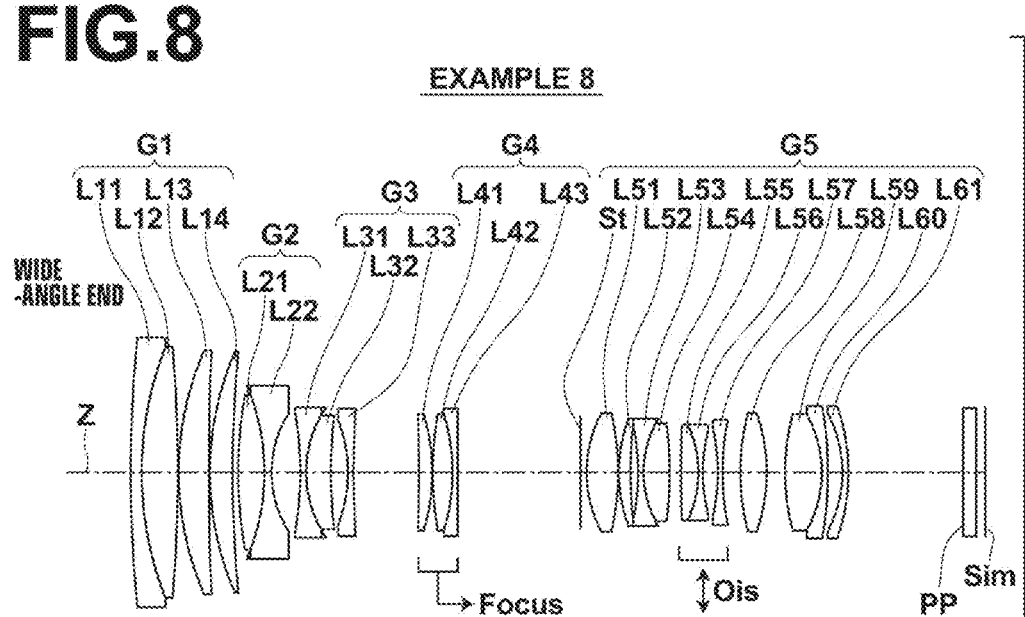
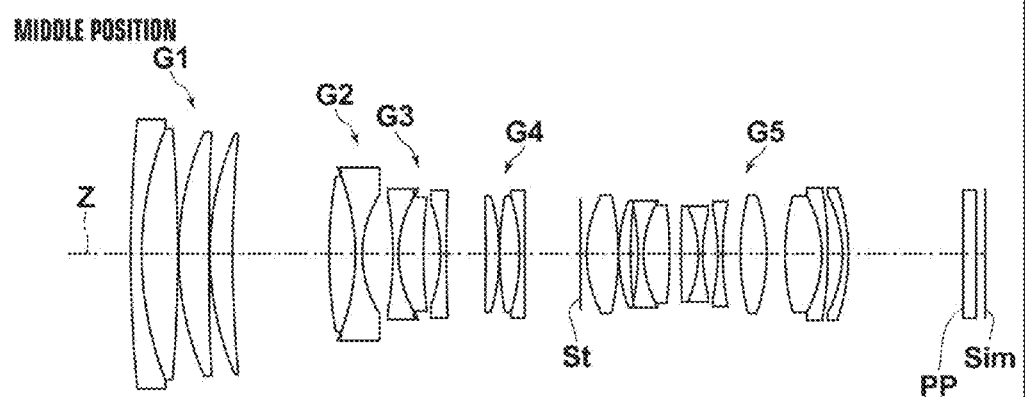
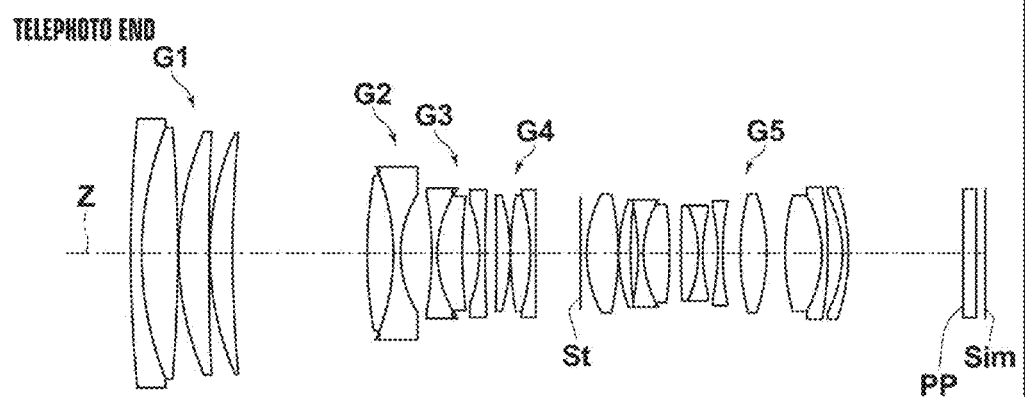

FIG.10
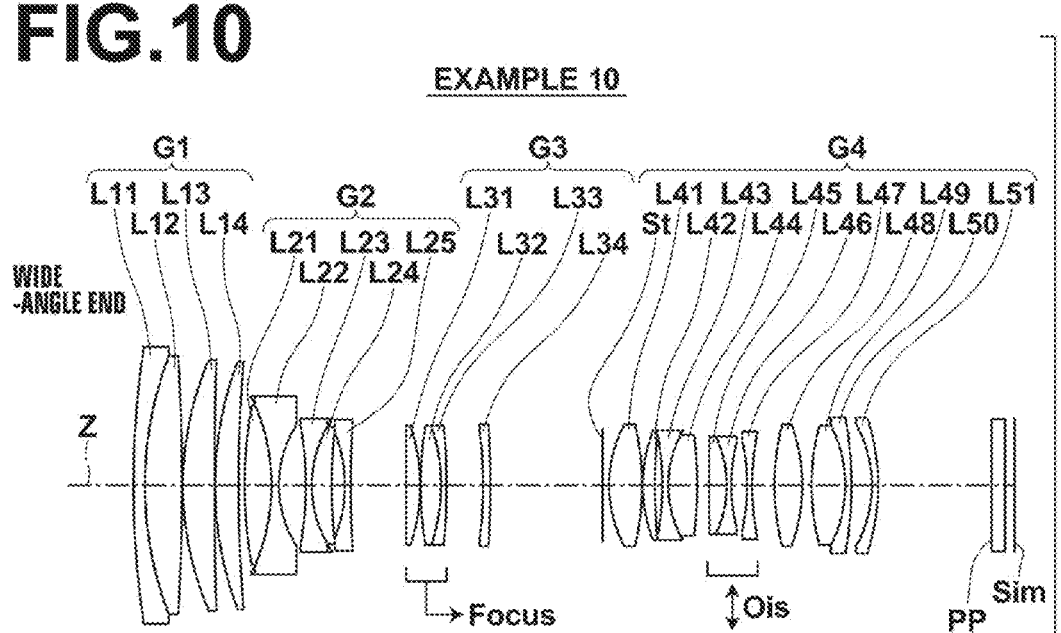
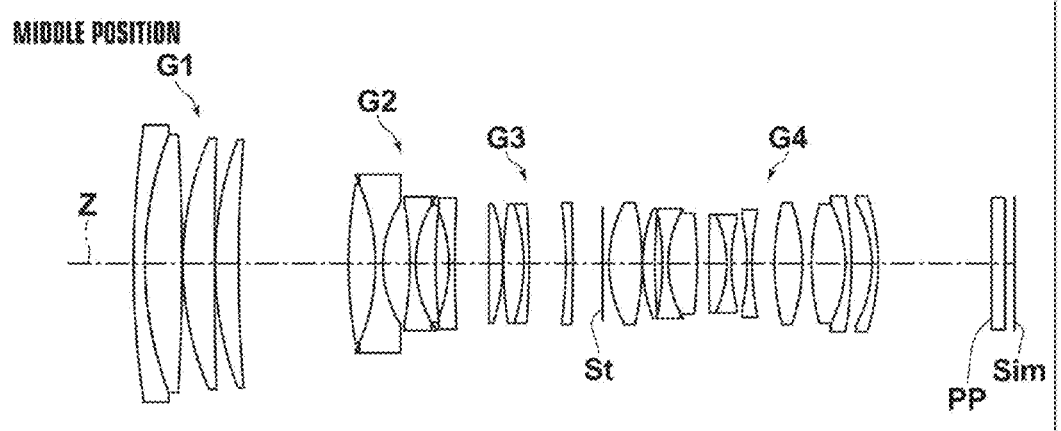
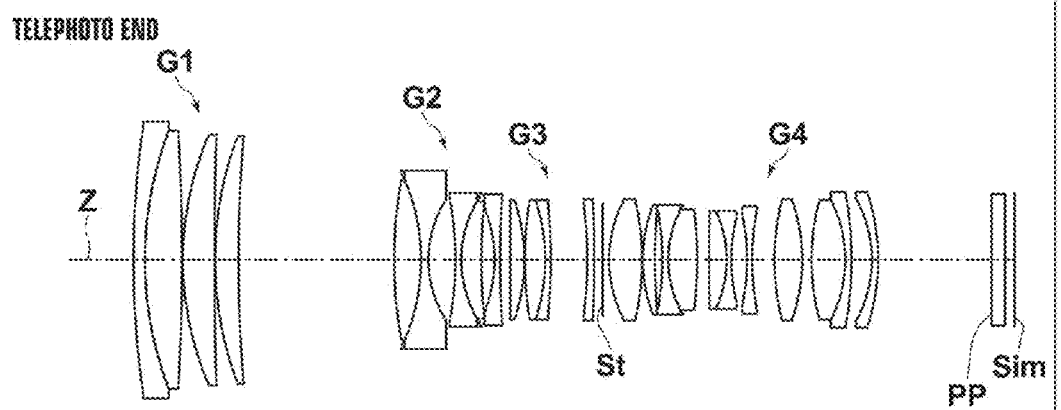

FIG.11
EXAMPLE 11
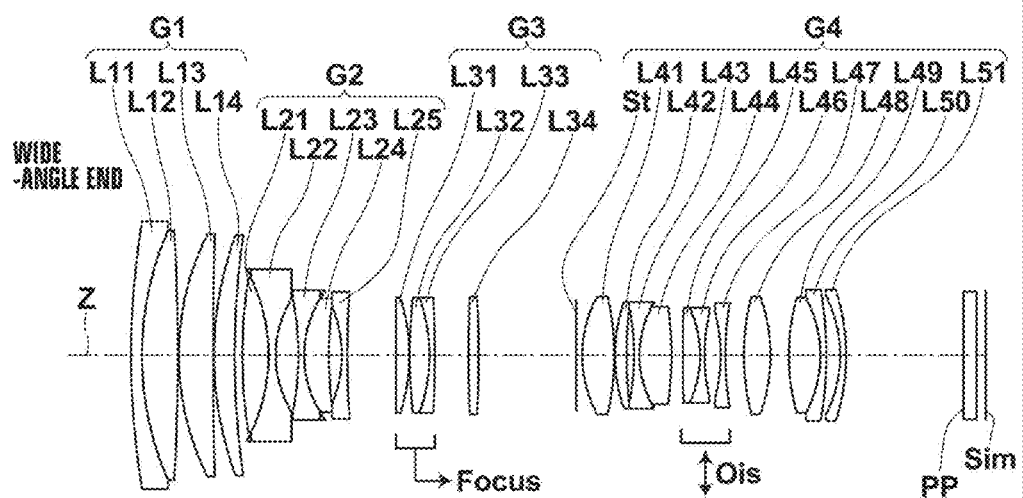
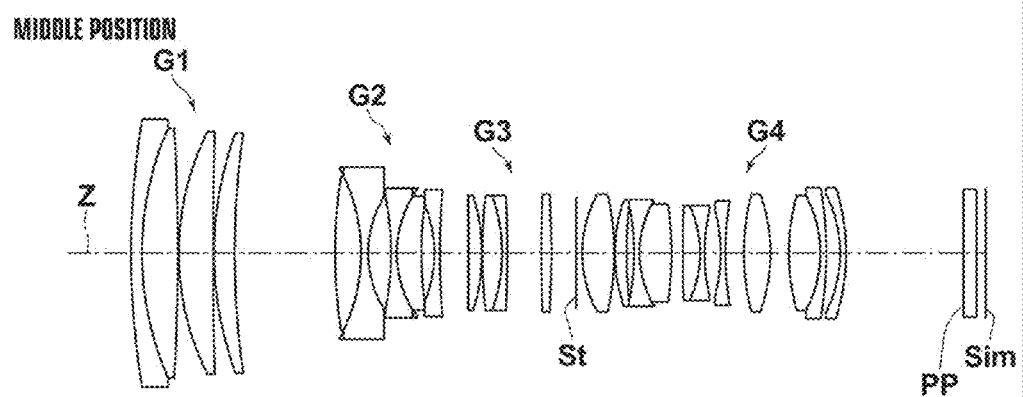
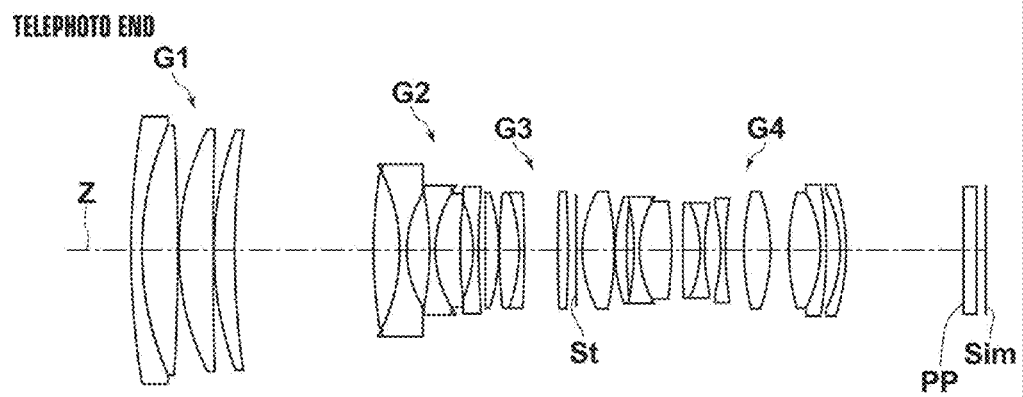

EXAMPLE 1
FIG.23
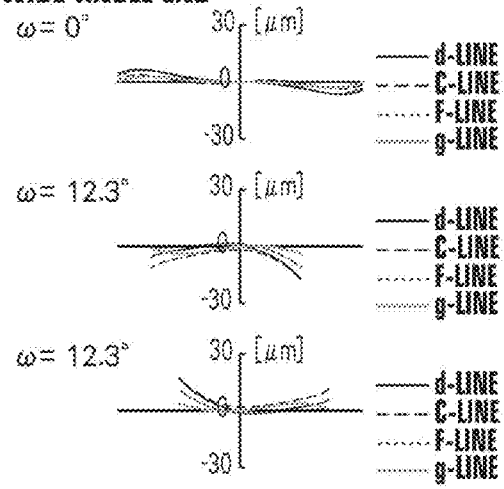
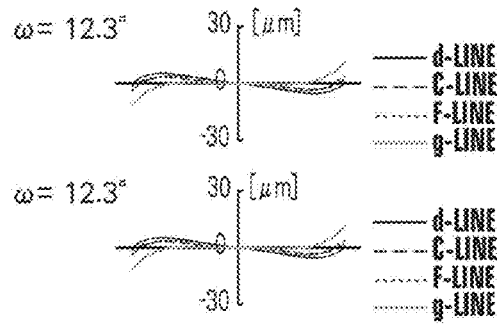
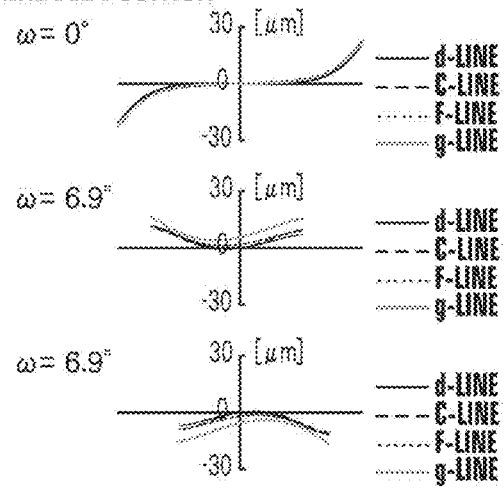
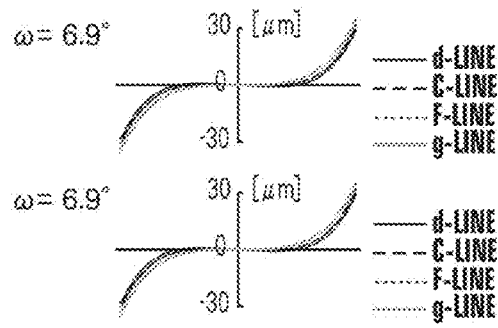
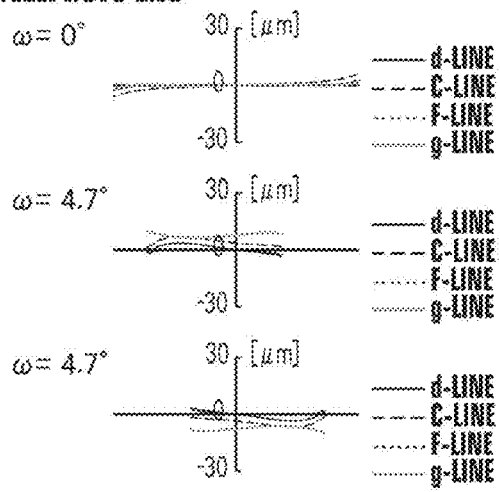
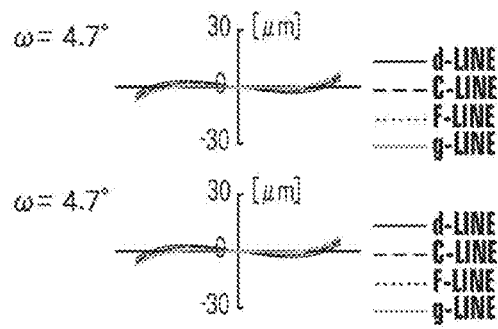

FIG.25
EXAMPLE 3
WIDE-ANGLE END
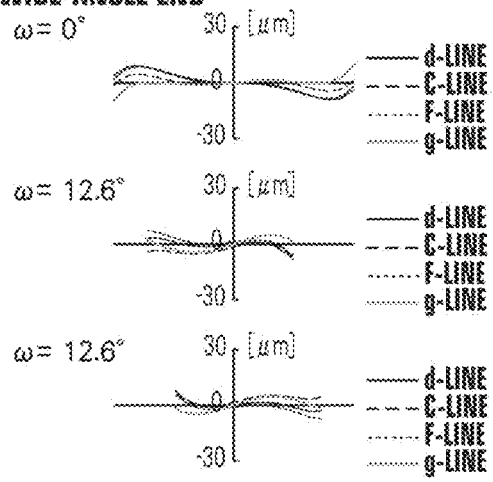
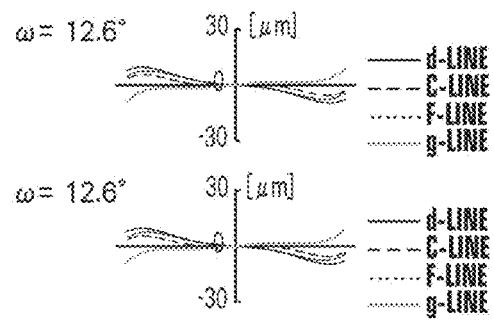
MIDDLE POSITION
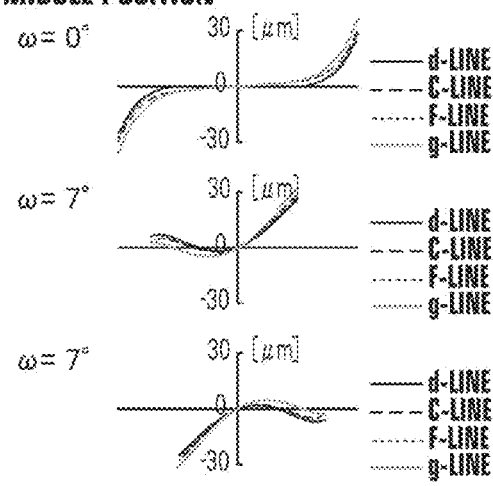
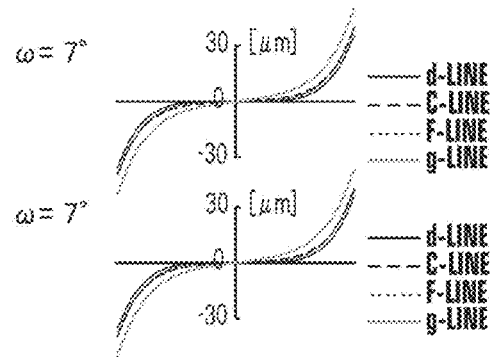
TELEPHOTO END
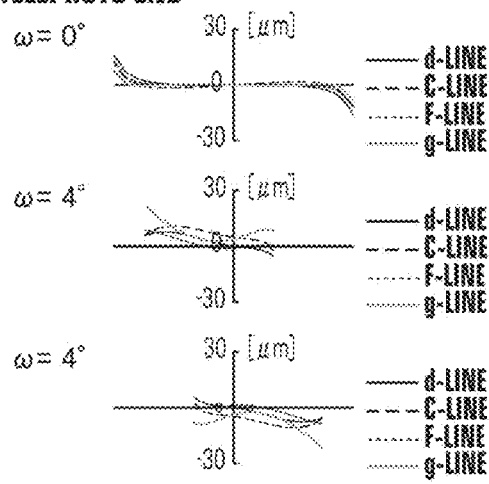
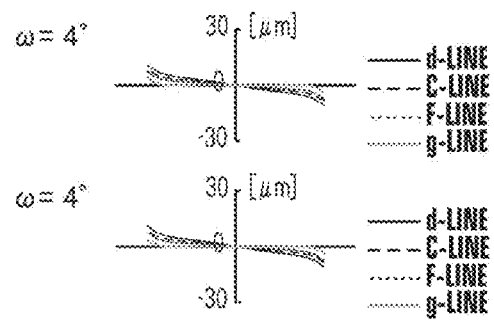

FIG.26
EXAMPLE 4
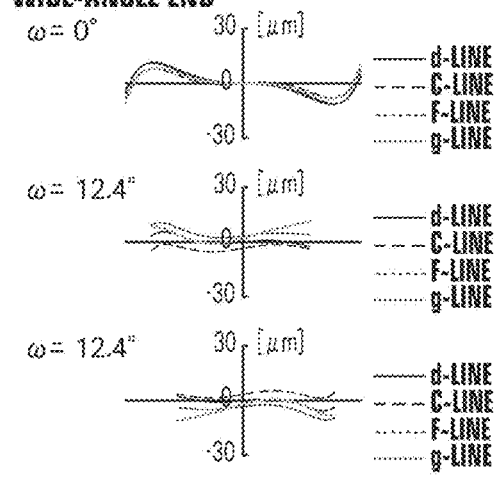
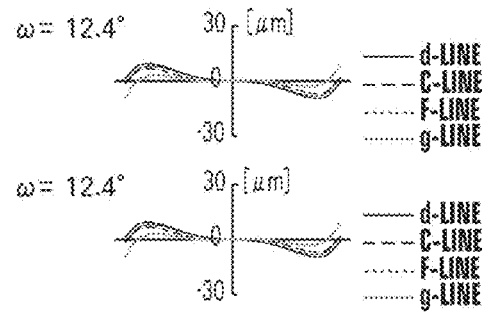
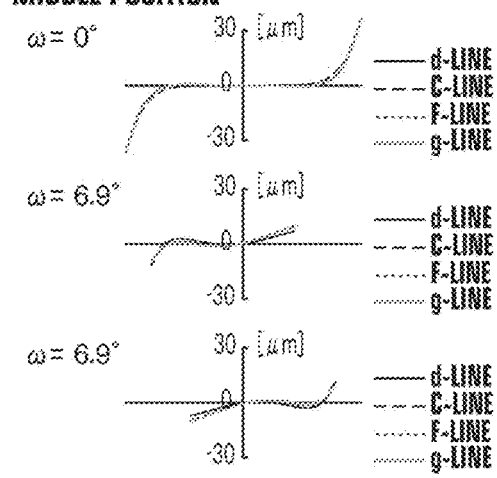
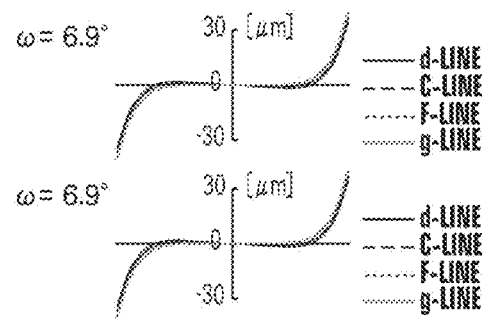
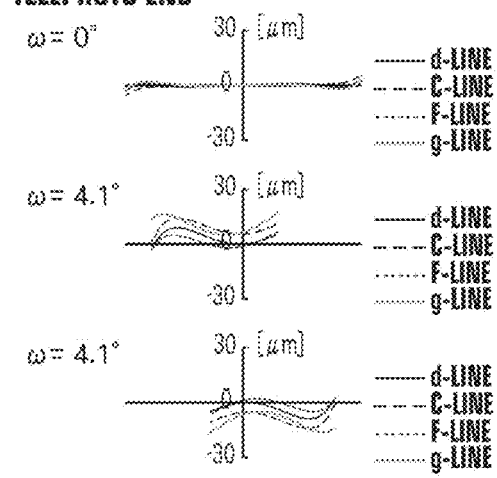
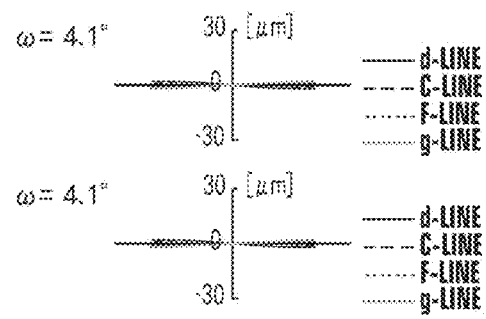

FIG.29
EXAMPLE 7
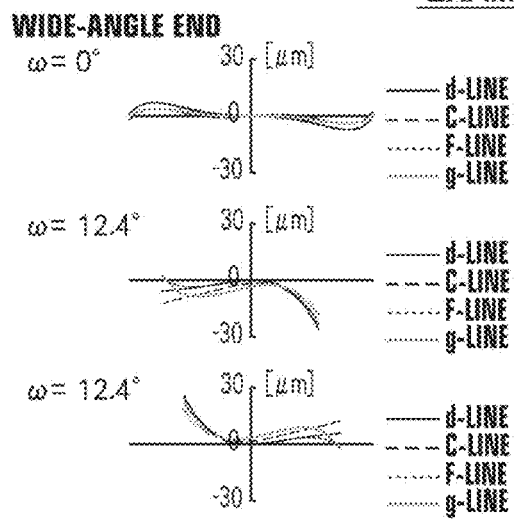
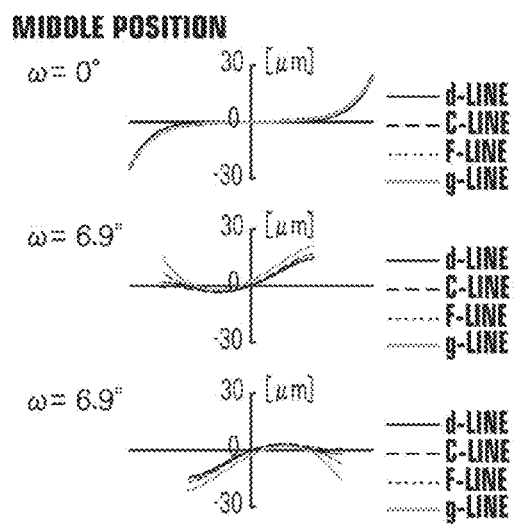
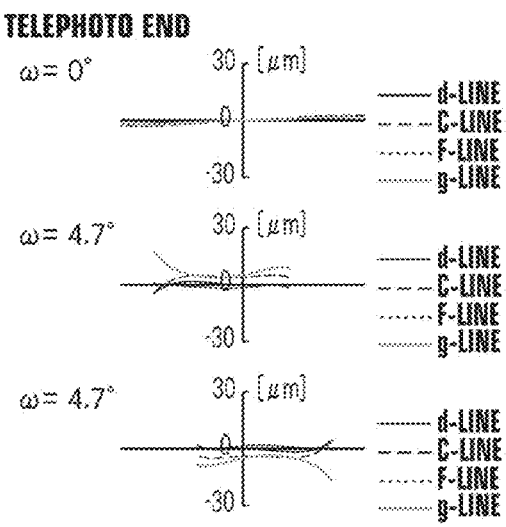
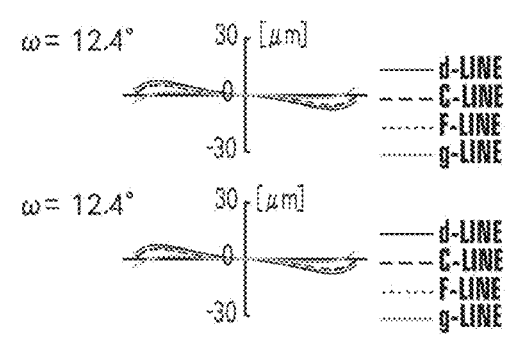
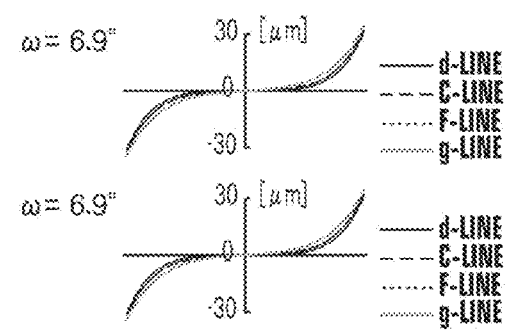
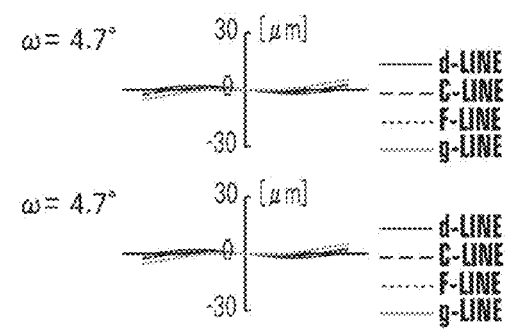

FIG.30
EXAMPLE 8
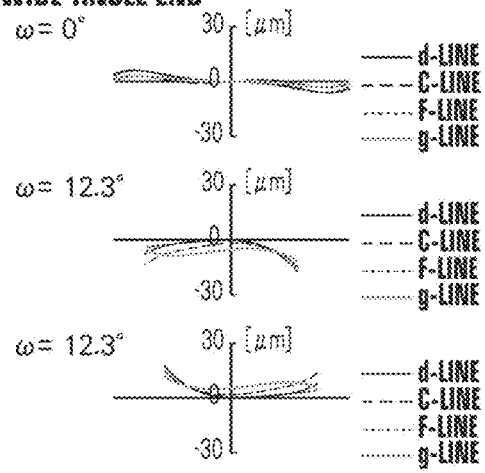
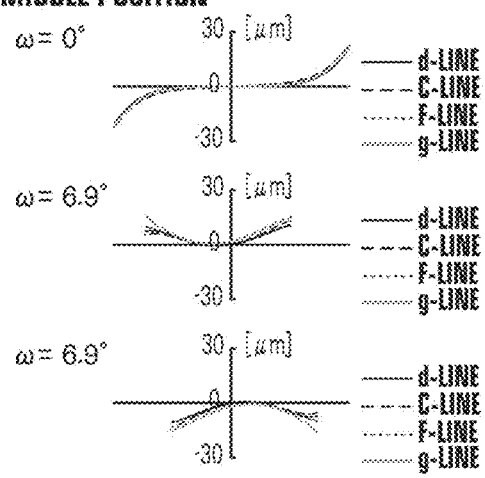
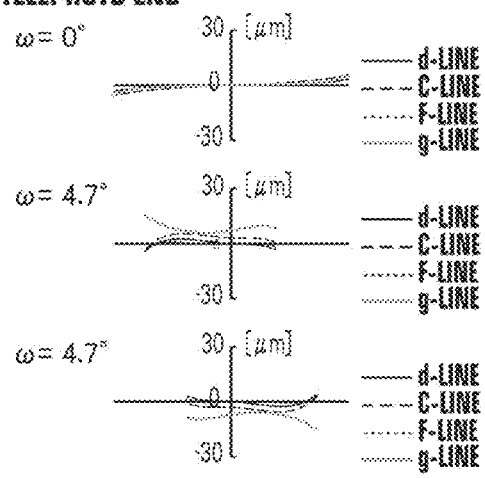

FIG.31 EXAMPLE 9
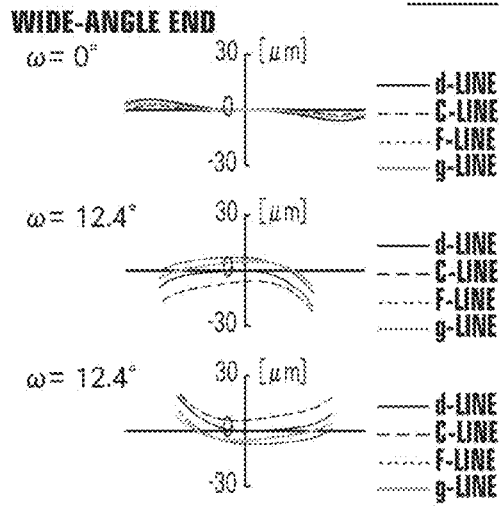
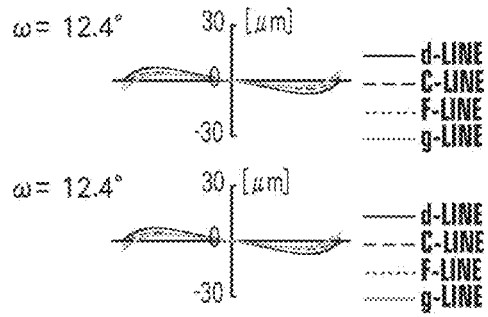
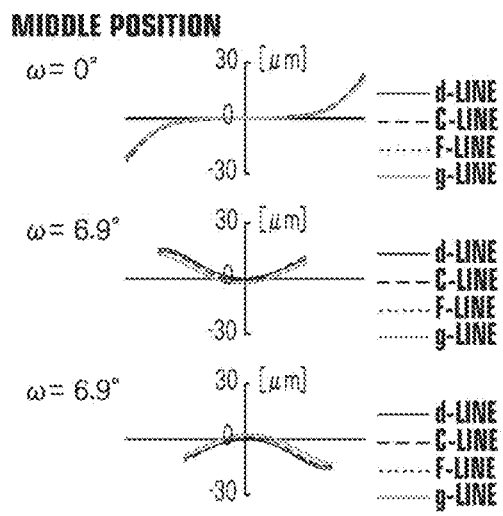
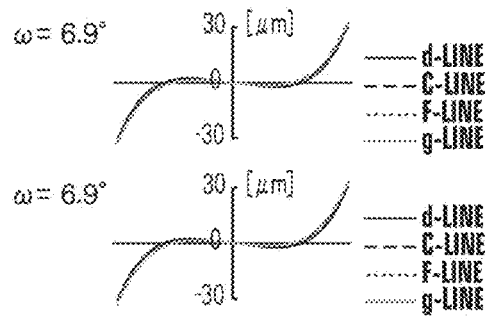
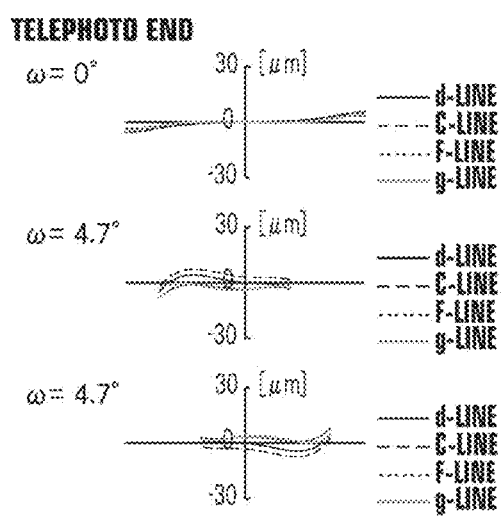
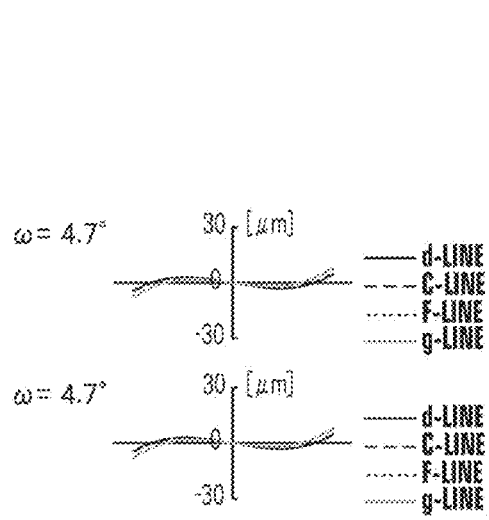

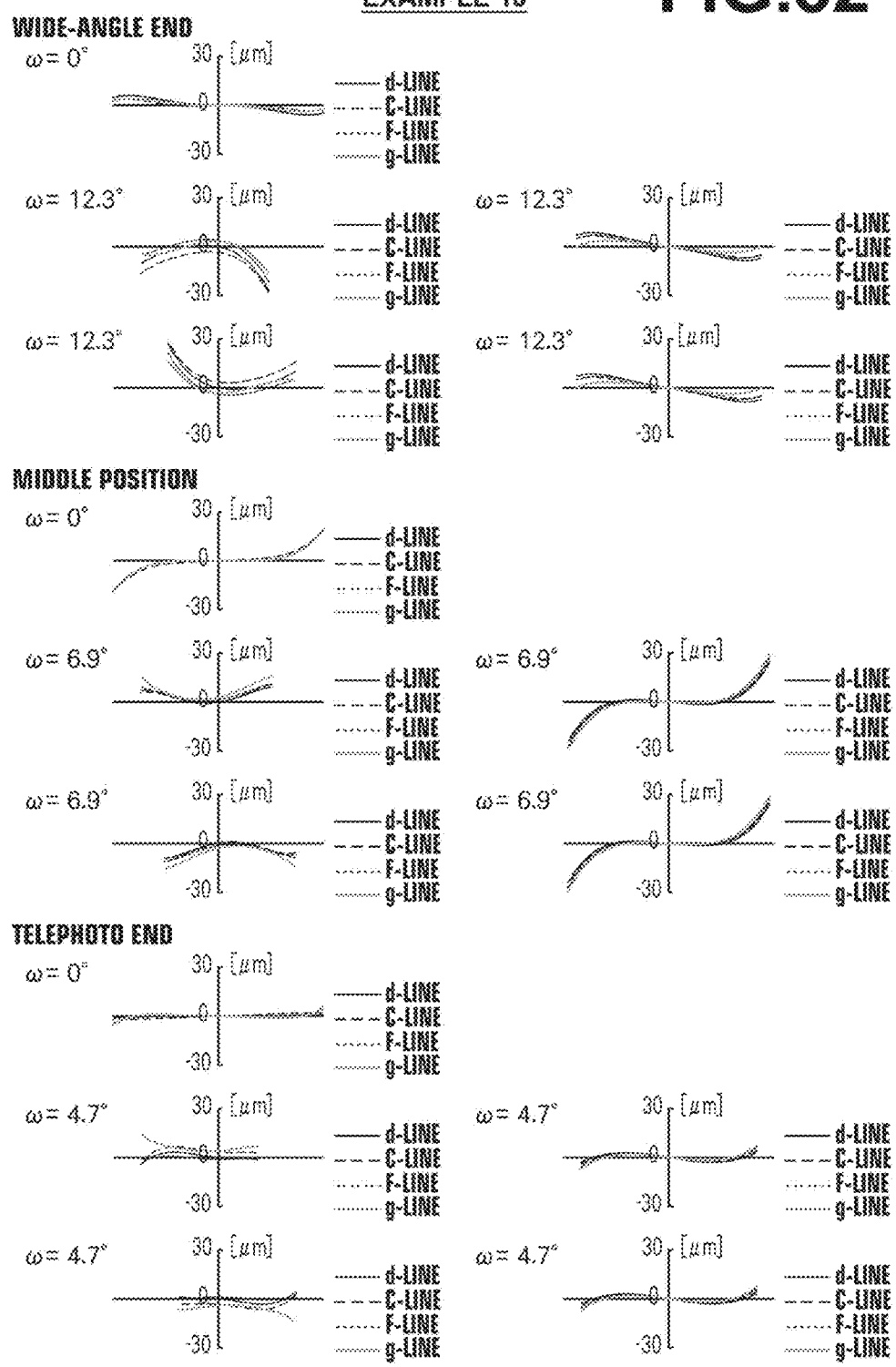

FIG.33 EXAMPLE 11
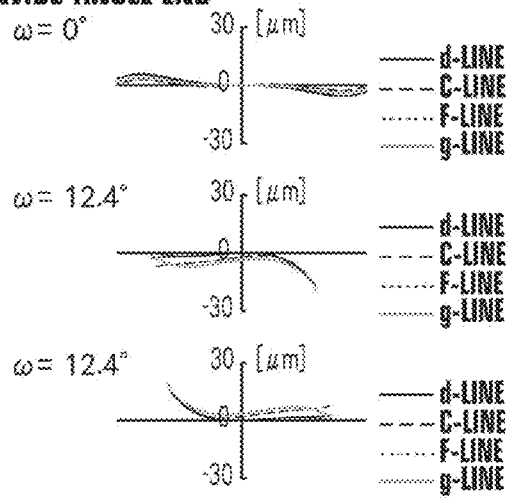
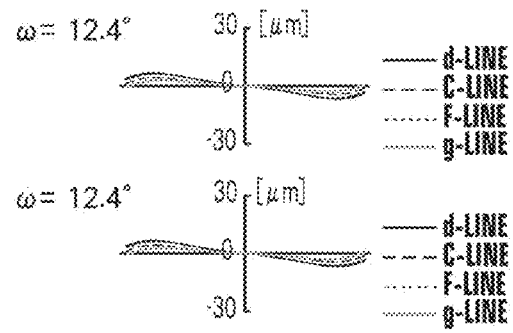
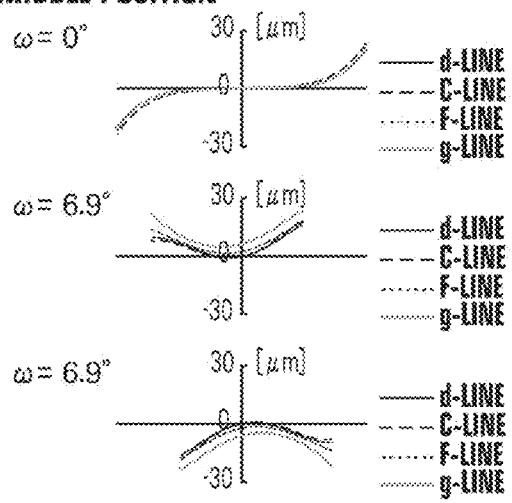
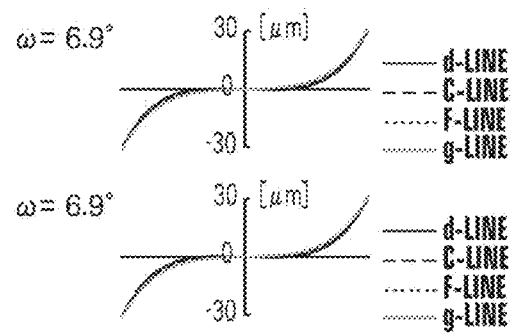
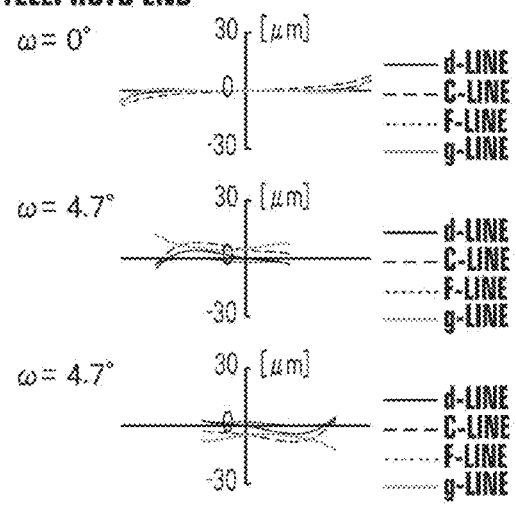
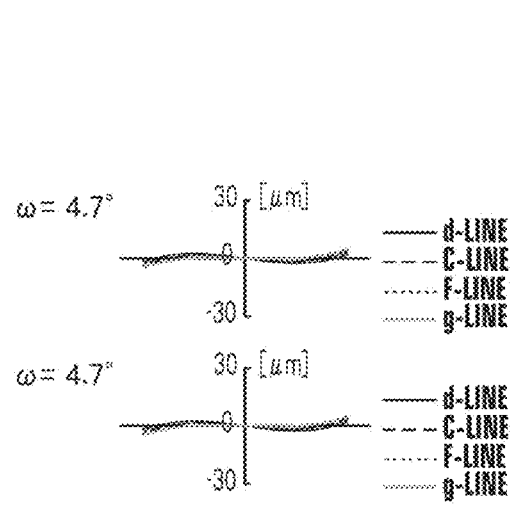

ZOOM LENS AND IMAGING APPARATUS

CROSS-REFERENCE TO RELATED APPLICATIONS

The present application claims priority under 35 U.S.C. §119 to Japanese Patent Application No. 2014-174106, filed on Aug. 28, 2014. The above application is hereby expressly incorporated by reference, in its entirety, into the present application.

BACKGROUND OF THE INVENTION

1. Field of the Invention

The present invention relates to a zoom lens which is suitable for use with, in particular, digital cameras, lens-replaceable digital cameras, etc., and an imaging apparatus provided with the zoom lens.

2. Description of the Related Art

So-called constant aperture zoom lenses having a zoom ratio of around 2.5 to 3.0, and a constant maximum aperture of around F2.8 or F4 across the entire zoom range are known.

Such a zoom lens has a four-group or five-group configuration including, for example, in order from the object side, a first lens group which has a positive refractive power and is fixed during magnification change, a second lens group which has a negative refractive power and has a strong magnification change effect, about one or two magnification change groups which are provided in addition to the second lens group and include a lens group having a positive refractive power, and a rearmost lens group which is fixed during magnification change.

As a zoom lens having the above-described configuration, those disclosed in Japanese Unexamined Patent Publication Nos. 2011-099964, 2013-174758, 2013-007878, 2012-027217, and 2011-158599 (hereinafter, Patent Documents 1 to 5, respectively) are known.

SUMMARY OF THE INVENTION

In Patent Document 1, a part of lens groups forming the first lens group is used to effect focusing, where the part of lens groups to effect focusing has a large lens diameter, and a very large load is applied to the focusing driving system.

In Patent Documents 2 to 5, the third lens group is used to effect focusing, and size reduction and weight reduction of the focusing lens group are achieved. However, the maximum aperture is F4.1 in Patent Documents 2 and 3, and thus Patent Documents 2 and 3 do not achieve a high aperture ratio. Patent Document 4 achieves a maximum aperture of F2.9; however, the refractive power of the focusing lens group is weak, and the amount of movement of the focusing lens group is large. In Patent Document 5, contrary to Patent Document 4, the refractive power of the focusing lens group is strong, and it is difficult to suppress variation of aberrations during focusing.

In view of the above-described circumstances, the present invention is directed to providing a zoom lens having a high aperture ratio and high optical performance, wherein the focusing lens group is compact and light weight, and the amount of movement of the focusing lens group is small, as well as an imaging apparatus provided with the zoom lens.

A zoom lens of the invention consists of four or five lens groups as a whole, which consist of, in order from the object side, a first lens group having a positive refractive power, a second lens group having a negative refractive power, one or two middle lens groups including a mp lens group having a positive refractive power, and a rearmost lens group disposed at the most image side position of the entire system and having a positive refractive power, wherein magnification change is effected by changing all distances between the adjacent lens groups, focusing from an object at infinity to a closest object is effected by moving only the entire mp lens group or only a part of lens groups forming the mp lens group along the optical axis, the lens group moved during focusing includes at least one positive lens and at least one negative lens and has a positive refractive power as a whole, and the condition expressions (1) and (2) below are satisfied:

$$1.67 < f1/fGf < 2.70 \qquad (1), \text{ and}$$

$$1.15 < f1/fGr < 1.85 \qquad (2),$$

where f1 is a focal length of the first lens group, fGf is a focal length of the lens group moved during focusing, and fGr is a focal length of the rearmost lens group.

It should be noted that the mp lens group is not a part of a lens group (a sub-lens group) and is one independent lens group. The "independent lens group" herein means such a lens group that the distance between the lens group and the adjacent lens group is changed during magnification change. In the case where the middle lens group consists of two lens groups, and both the two lens groups have a positive refractive power, the mp lens group may be either of the lens groups.

In the zoom lens of the invention, it is preferred that the condition expression (1-1) and/or (2-1) below be satisfied:

$$1.72 < f1/fGf < 2.60 \qquad (1-1)$$

$$1.20 < f1/fGr < 1.75 \qquad (2-1).$$

It is preferred that the first lens group be fixed relative to the image plane during magnification change.

It is preferred that the rearmost lens group be fixed relative to the image plane during magnification change.

It is preferred that the lens group moved during focusing consist of two positive lenses and one negative lens.

It is preferred that focusing from an object at infinity to a closest object be effected by moving only the entire mp lens group along the optical axis.

It is preferred that the condition expression (3) below be satisfied. It is more preferred that the condition expression (3-1) below be satisfied.

$$1.20 < ft/f1 < 2.20 \qquad (3),$$

$$1.23 < ft/f1 < 2.00 \qquad (3-1),$$

where ft is a focal length of the entire system when the lens is focused on an object at infinity at the telephoto end, and f1 is a focal length of the first lens group.

It is preferred that the condition expression (4) below be satisfied. It is more preferred that the condition expression (4-1) below be satisfied.

$$5.30 < ft/|f2| < 8.80 \qquad (4),$$

$$5.50 < ft/|f2| < 8.60 \qquad (4-1),$$

where ft is a focal length of the entire system when the lens is focused on an object at infinity at the telephoto end, and f2 is a focal length of the second lens group.

It is preferred that the condition expression (5) below be satisfied. It is more preferred that the condition expression (5-1), (5-2), or (5-3) below be satisfied.

$$57 < vdGmp \quad (5),$$

$$57 < vdGmp < 85 \quad (5\text{-}1),$$

$$59 < vdGmp \quad (5\text{-}2),$$

$$59 < vdGmp < 85 \quad (5\text{-}3),$$

where vdGmp is the largest Abbe number of the at least one positive lens in the lens group moved during focusing.

It is preferred that the first lens group consist of, in order from the object side, a negative lens, a positive lens, a positive lens, and a positive lens.

It is preferred that the second lens group include two positive lenses and two negative lenses.

It is preferred that the zoom lens consist of four lens groups which consist of, in order from the object side, the first lens group, the second lens group, the mp lens group, and the rearmost lens group.

It is preferred that a stop be disposed at the most object-side position of the rearmost lens group.

An imaging apparatus of the invention comprises the above-described zoom lens of the invention.

It should be noted that the expression "consisting/consist of" as used herein means that the zoom lens may include, besides the elements recited above: lenses substantially without any power; optical elements other than lenses, such as a stop, a mask, a cover glass, and filters; and mechanical components, such as a lens flange, a lens barrel, an image sensor, an image stabilization mechanism, etc.

The Abbe number is with respect to the d-line (the wavelength of 587.6 nm).

The sign (positive or negative) with respect to the surface shape and the refractive power of any lens including an aspheric surface are about the paraxial region.

The zoom lens of the invention consists of four or five lens groups as a whole, which consist of, in order from the object side, a first lens group having a positive refractive power, a second lens group having a negative refractive power, one or two middle lens groups including a mp lens group having a positive refractive power, and a rearmost lens group disposed at the most image side position of the entire system and having a positive refractive power, wherein magnification change is effected by changing all distances between the adjacent lens groups, focusing from an object at infinity to a closest object is effected by moving only the entire mp lens group or only a part of lens groups forming the mp lens group along the optical axis, the lens group moved during focusing includes a positive lens and a negative lens and has a positive refractive power as a whole, and the condition expressions (1) and (2) below are satisfied:

$$1.67 < f1/fGf < 2.70 \quad (1), \text{ and}$$

$$1.15 < f1/fGr < 1.85 \quad (2).$$

This configuration allows achieving a zoom lens having high aperture ratio and having high optical performance, wherein the focusing lens group is compact and light weight and the amount of movement of the focusing lens group is small.

The imaging apparatus of the invention, which is provided with the zoom lens of the invention, is compact and light weight, and allows obtaining high quality images.

BRIEF DESCRIPTION OF THE DRAWINGS

FIG. 1 is a sectional view illustrating the lens configuration of a zoom lens according to one embodiment of the present invention (a zoom lens of Example 1), FIG. 2 is a sectional view illustrating the lens configuration of a zoom lens of Example 2 of the invention, FIG. 3 is a sectional view illustrating the lens configuration of a zoom lens of Example 3 of the invention, FIG. 4 is a sectional view illustrating the lens configuration of a zoom lens of Example 4 of the invention, FIG. 7 is a sectional view illustrating the lens configuration of a zoom lens of Example 7 of the invention, FIG. 8 is a sectional view illustrating the lens configuration of a zoom lens of Example 8 of the invention, FIG. 10 is a sectional view illustrating the lens configuration of a zoom lens of Example 10 of the invention, FIG. 11 is a sectional view illustrating the lens configuration of a zoom lens of Example 11 of the invention, FIG. 23 shows lateral aberration diagrams of the zoom lens of Example 1 of the invention, FIG. 25 shows lateral aberration diagrams of the zoom lens of Example 3 of the invention, FIG. 26 shows lateral aberration diagrams of the zoom lens of Example 4 of the invention, FIG. 29 shows lateral aberration diagrams of the zoom lens of Example 7 of the invention, FIG. 30 shows lateral aberration diagrams of the zoom lens of Example 8 of the invention, FIG. 31 shows lateral aberration diagrams of the zoom lens of Example 9 of the invention, FIG. 32 shows lateral aberration diagrams of the zoom lens of Example 10 of the invention, FIG. 33 shows lateral aberration diagrams of the zoom lens of Example 11 of the invention.

DESCRIPTION OF THE PREFERRED EMBODIMENTS

Figure 5:
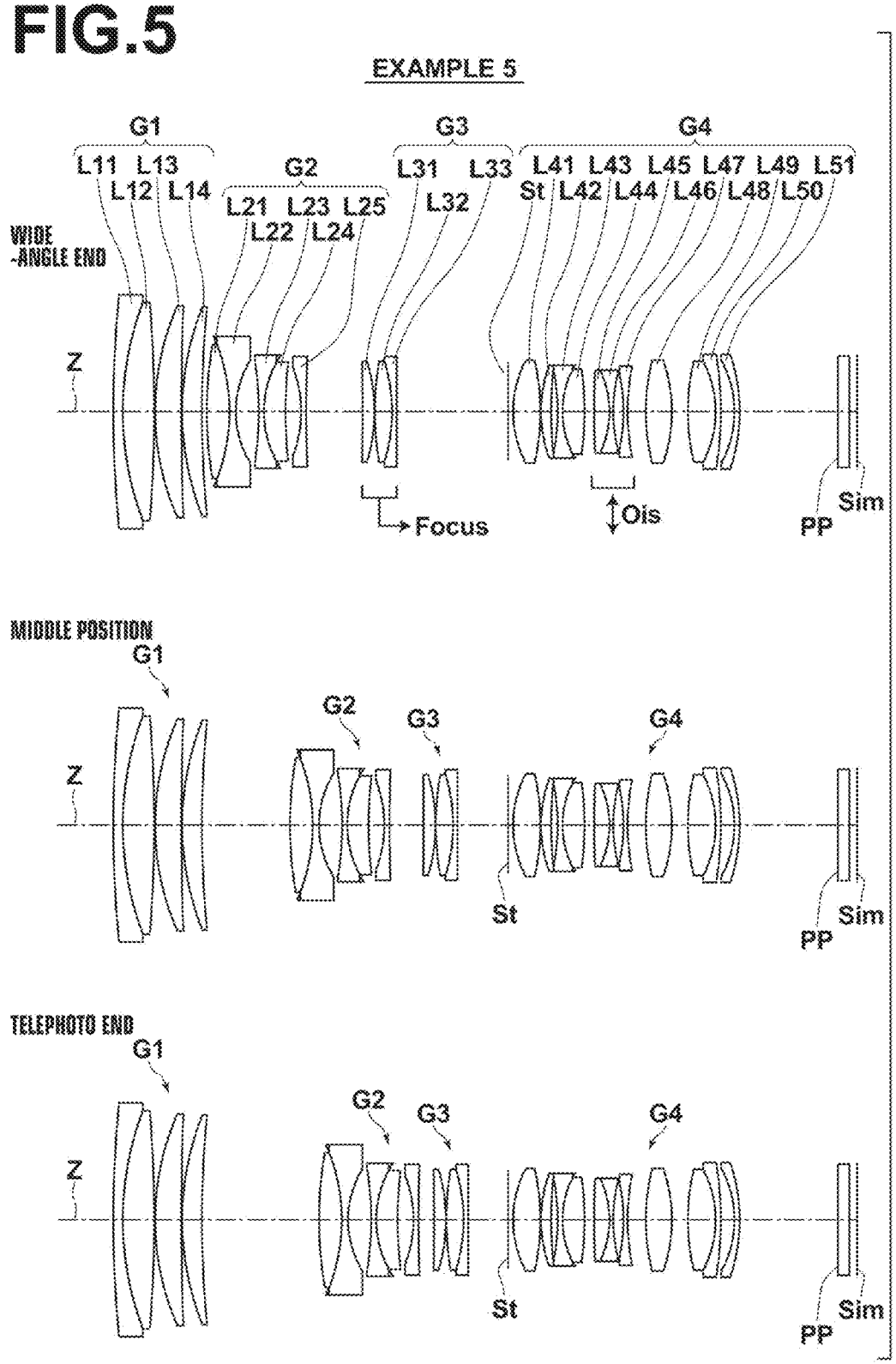
FIG. 5 is a sectional view illustrating the lens configuration of a zoom lens of Example 5 of the invention.

Hereinafter, an embodiment of the present invention will be described in detail with reference to the drawings. FIG. 1 is a sectional view illustrating the lens configuration of a zoom lens according to one embodiment of the invention. The configuration example shown in FIG. 1 is the same as the configuration of a zoom lens of Example 1, which will be described later. In FIG. 1, the left side is the object side and the right side is the image side. An aperture stop St shown in the drawing does not necessarily represent the size and the shape thereof, but represents the position thereof along the optical axis Z.

As shown in FIG. 1, this zoom lens consists of, in order from the object side, a first lens group G1 having a positive refractive power, a second lens group G2 having a negative refractive power, a third lens group G3 having a positive refractive power (which corresponds to an mp lens group of the invention), and a fourth lens group G4 having a positive refractive power (which corresponds to a rearmost lens group of the invention), wherein magnification change is effected by changing all the distances between the adjacent lens groups.

When this zoom lens is used with an imaging apparatus, it is preferred to provide a cover glass, a prism, and various filters, such as an infrared cutoff filter and a low-pass filter, etc., between the optical system and an image plane Sim depending on the configuration of the camera on which the lens is mounted. In the example shown in FIG. 1, an optical member PP in the form of a plane-parallel plate, which is assumed to represent such elements, is disposed between the lens system and the image plane Sim.

This zoom lens effects focusing from an object at infinity to a closest object by moving only the entire third lens group G3 (the mp lens group) along the optical axis. It should be noted that the lens group moved during focusing may be a part of lens groups forming the third lens group G3 (the mp lens group), rather than the entire third lens group G3 (the mp lens group). However, effecting focusing by moving only the third lens group G3 (the mp lens group) allows suppressing variation of aberrations during focusing. The lens group moved during focusing includes at least one positive lens and at least one negative lens, and has a positive refractive power as a whole.

Employing the above-described inner focusing system allows size reduction and weight reduction of the focusing lens group (the third lens group G3) to thereby allow speeding up the autofocus operation. The focusing lens group including a positive lens and a negative lens allows successfully suppressing variation of chromatic aberration during focusing.

Further, the zoom lens of the invention is configured to satisfy the condition expressions (1) and (2) below:

$$1.67 < f1/fGf < 2.70 \quad (1),$$

$$1.72 < f1/fGf < 2.60 \quad (1\text{-}1),$$

$$1.15 < f1/fGr < 1.85 \quad (2),$$

$$1.20 < f1/fGr < 1.75 \quad (2\text{-}1),$$

where f1 is a focal length of the first lens group, fGf is a focal length of the lens group moved during focusing, and fGr is a focal length of the rearmost lens group.

Satisfying the lower limit of the condition expression (1) allows preventing the refractive power of the focusing lens group from becoming excessively weak, and keeping the amount of movement of the focusing lens group during focusing relatively small, which are advantageous for achieving size reduction and weight reduction of the lens system and speeding up the focusing operation. Alternatively, satisfying the lower limit of the condition expression (1) allows preventing the refractive power of the first lens group G1 from becoming excessively strong, and this is advantageous for correcting spherical aberration, in particular, at the telephoto side. Satisfying the upper limit of the condition expression (1) allows preventing the refractive power of the focusing lens group from becoming excessively strong, and this allows suppressing variation of aberrations during focusing. Alternatively, satisfying the upper limit of the condition expression (1) allows preventing the refractive power of the first lens group G1 from becoming excessively weak, and this allows keeping the entire length of the lens relatively small. It should be noted that higher performance can be obtained when the condition expression (1-1) is satisfied.

Satisfying the lower limit of the condition expression (2) allows preventing the refractive power of the fourth lens group G4 (the rearmost lens group) from becoming excessively weak and this is advantageous for size reduction. Alternatively, satisfying the lower limit of the condition expression (2) allows preventing the refractive power of the first lens group G1 from becoming excessively strong, and this is advantageous for correcting spherical aberration, in particular, at the telephoto side. Satisfying the upper limit of the condition expression (2) allows preventing the refractive power of the fourth lens group G4 (the rearmost lens group) from becoming excessively strong, and this allows suppressing coma aberration at the fourth lens group G4 (the rearmost lens group). It should be noted that higher performance can be obtained when the condition expression (2-1) is satisfied.

In the zoom lens of this embodiment, it is preferred that the first lens group G1 be fixed relative to the image plane Sim during magnification change. Fixing the first lens group G1 in this manner allows simplifying the frame structure. Comparing to a configuration where the first lens group G1 is moved forward toward its telephoto end position, this configuration has advantages such as reducing influence of decentering of the lenses due to flexure of the lens frame, etc., and facilitating use of a dustproof, weather sealed structure.

It is preferred that the fourth lens group G4 (the rearmost lens group) be fixed relative to the image plane Sim during magnification change. Reducing the number of lens groups to be moved in this manner allows reducing influence of decentering. Also, this configuration allows suppressing variation of F-number during magnification change, and this is advantageous for forming a zoom lens having a constant aperture.

It is preferred that the lens group moved during focusing consist of two positive lenses and one negative lens. This configuration allows suppressing variation of aberrations during focusing.

It is preferred that the condition expression (3) below be satisfied. Satisfying the lower limit of the condition expression (3) allows preventing the refractive power of the first lens group G1 from becoming excessively weak, and this allows keeping the entire length of the lens relatively small. Satisfying the upper limit of the condition expression (3) is advantageous for correcting spherical aberration, in particular, at the telephoto side. It should be noted that higher performance can be obtained when the condition expression (3-1) is satisfied.

$$1.20 < ft/f1 < 2.20 \quad (3),$$

$$1.23 < ft/f1 < 2.00 \quad (3\text{-}1),$$

where ft is a focal length of the entire system when the lens is focused on an object at infinity at the telephoto end, and f1 is a focal length of the first lens group.

Further, it is preferred that the condition expression (4) below be satisfied. Satisfying the lower limit of the condition expression (4) allows preventing the refractive power of the second lens group G2 from becoming excessively weak, and this allows keeping the amount of movement of the second lens group G2 relatively small. Satisfying the upper limit of the condition expression (4) allows suppressing variation of spherical aberration and astigmatism, in particular, during magnification change. It should be noted that higher performance can be obtained when the condition expression (4-1) is satisfied.

$$5.30 < ft/|f2| < 8.80 \quad (4),$$

$$5.50 < ft/|f2| < 8.60 \quad (4\text{-}1),$$

where ft is a focal length of the entire system when the lens is focused on an object at infinity at the telephoto end, and f2 is a focal length of the second lens group.

Further, it is preferred that the condition expression (5) below be satisfied. Satisfying the condition expression (5) is advantageous for correcting longitudinal chromatic aberration. Also, satisfying the condition expression (5) allows suppressing variation of chromatic aberration at the wide-angle end and at the telephoto end, and variation of chromatic aberration during focusing. It should be noted that higher performance can be obtained when the condition expression (5-1), (5-2), or (5-3) is satisfied.

$$57 < vdGmp \quad (5),$$

$$57 < vdGmp < 85 \quad (5\text{-}1),$$

$$59 < vdGmp \quad (5\text{-}2),$$

$$59 < vdGmp < 85 \quad (5\text{-}3),$$

where vdGmp is the largest Abbe number of the at least one positive lens in the lens group moved during focusing.

It is preferred that the first lens group G1 consist of, in order from the object side, a negative lens, a positive lens, a positive lens, and a positive lens. The first lens group G1 including three positive lenses in this manner allows successfully correcting chromatic aberration and spherical aberration, in particular, at the telephoto side. Further, in a case where the first lens group G1 as a whole has a strong power for the purpose of size reduction, etc., the above-described configuration allows distributing the power among the lenses, resulting in smaller aberrations at each lens surface.

It is preferred that the second lens group G2 include two positive lenses and two negative lenses. The second lens group G2 having the above configuration allows smoothly correcting aberrations even when the second lens group G2 is provided with a strong power to achieve size reduction of the front lens element or to reduce the amount of movement of the second lens group G2, and allows successfully correcting coma aberration and chromatic aberration, in particular, at the wide-angle end.

It is preferred that that the zoom lens of the invention consists of four lens groups which consist of, in order from the object side, the first lens group G1, the second lens group G2, the mp lens group (the third lens group G3), and the rearmost lens group (the fourth lens group G4). Minimizing the number of lens groups and forming the zoom lens having the above-described four-group configuration allows simplifying the frame structure, and reducing influence of decentering.

It is preferred that the aperture stop St be disposed at the most object-side position of the fourth lens group G4 (the rearmost lens group). Disposing the aperture stop St at the most object-side position of the fourth lens group G4 (the rearmost lens group) in place of between lenses of the fourth lens group G4 allows simplifying the frame structure. Further, in the case where the fourth lens group G4 (the rearmost lens group) is fixed relative to the image plane Sim during magnification change, a constant aperture zoom lens can be formed without changing the so-called aperture stop diameter.

In a case where the zoom lens is used in a harsh environment, it is preferred that the zoom lens be provided with a protective multi-layer coating. Besides the protective coating, the zoom lens may be provided with an antireflection coating for reducing ghost light, etc., during use.

In the example shown in FIG. 1, the optical member PP is disposed between the lens system and the image plane Sim. However, in place of disposing the various filters, such as a low-pass filter and a filter that cuts off a specific wavelength range, between the lens system and the image plane Sim, the various filters may be disposed between the lenses, or coatings having the same functions as the various filters may be applied to the lens surfaces of some of the lenses.

Next, numerical examples of the zoom lens of the invention are described.

First, a zoom lens of Example 1 is described. FIG. 1 is a sectional view illustrating the lens configuration of the zoom lens of Example 1. It should be noted that, in FIG. 1, and FIGS. 2 to 11 corresponding to Examples 2 to 11, which will be described later, the left side is the object side and the right side is the image side. The aperture stop St shown in the drawings does not necessarily represent the size and the shape thereof, but represents the position thereof along the optical axis Z. The symbol "Focus" in the drawings denotes a lens group used to effect focusing, and the symbol "Ois" denotes a lens group used to effect image stabilization.

The zoom lens of Example 1 has a four-group configuration which consists of, in order from the object side, a first lens group G1 having a positive refractive power, a second lens group G2 having a negative refractive power, a third lens group G3 (the mp lens group) having a positive refractive power, and a fourth lens group G4 (the rearmost lens group) having a positive refractive power.

Table 1 shows basic lens data of the zoom lens of Example 1, Table 2 shows data about specifications of the zoom lens, and Table 3 shows data about distances between surfaces to be moved of the zoom lens. In the following description, meanings of symbols used in the tables are explained with respect to Example 1 as an example. The same explanations basically apply to those with respect to Examples 2 to 11.

In the lens data shown in Table 1, each value in the column of "Surface No." represents a surface number, where the object-side surface of the most object-side element is the 1st surface and the number is sequentially increased toward the image side, each value in the column of "Radius of Curvature" represents the radius of curvature of the corresponding surface, and each value in the column of "Surface Distance" represents the distance along the optical axis Z between the corresponding surface and the next surface. Each value in the column of "nd" represents the refractive index with respect to the d-line (the wavelength of 587.6 nm) of the corresponding optical element, each value in the column of "vd" represents the Abbe number with respect to the d-line (the wavelength of 587.6 nm) of the corresponding optical element, and each value in the column of "θgF" represents the partial dispersion ratio of the corresponding optical element.

It should be noted that the partial dispersion ratio θgF is expressed by the formula below:

$$\theta gF = (ng - nF)/(nF - nC),$$

where ng is a refractive index with respect to the g-line (the wavelength of 435.8 nm), nF is a refractive index with respect to the F-line (the wavelength of 486.1 nm), and nC is a refractive index with respect to the C-line (the wavelength of 656.3 nm).

The sign with respect to the radius of curvature is provided such that a positive radius of curvature indicates a surface shape that is convex toward the object side, and a negative radius of curvature indicates a surface shape that is convex toward the image side. The basic lens data also includes data of the aperture stop St and the optical member PP, and the surface number and the text "(stop)" are shown at the position in the column of the surface number corresponding to the aperture stop St. In the lens data shown in Table 1, the value of each surface distance that is changed during magnification change is represented by the symbol "DD[surface number]". The numerical values corresponding to each DD[surface number] at the wide-angle end, at the middle position, and at the telephoto end are shown in Table 3.

The data about specifications shown in Table 2 show values of zoom magnification, focal length f', back focus Bf', F-number FNo., and total angle of view 2ω at the wide-angle end, at the middle position, and at the telephoto end.

With respect to the basic lens data, the data about specifications, and the data about distances between surfaces to be moved, the unit of angle is degrees, and the unit of length is millimeters; however, any other suitable units may be used since optical systems are usable when they are proportionally enlarged or reduced.

TABLE 1

Example 1 - Lens Data

| Surface No. | Radius of Curvature | Surface Distance | nd | vd | θgF |
|---|---|---|---|---|---|
| 1 | 274.96102 | 2.390 | 1.80100 | 34.97 | 0.58642 |
| 2 | 77.90148 | 7.850 | 1.49700 | 81.54 | 0.53748 |
| 3 | −1203.47290 | 0.200 | | | |
| 4 | 97.12166 | 5.000 | 1.43875 | 94.94 | 0.53433 |
| 5 | 3892.40898 | 0.200 | | | |
| 6 | 62.76476 | 6.000 | 1.49700 | 81.54 | 0.53748 |
| 7 | 583.05158 | DD[7] | | | |
| 8 | 110.71627 | 5.710 | 1.72047 | 34.71 | 0.58350 |
| 9 | −42.66766 | 1.550 | 1.62230 | 53.17 | 0.55424 |
| 10 | 24.37958 | 4.958 | | | |
| 11 | −78.43069 | 1.260 | 1.49700 | 81.54 | 0.53748 |
| 12 | 25.54612 | 5.501 | 1.84661 | 23.88 | 0.62072 |
| 13 | 105.31259 | 4.001 | | | |
| 14 | −28.87373 | 1.250 | 1.91082 | 35.25 | 0.58224 |
| 15 | 391.32559 | DD[15] | | | |
| 16 | −349.16836 | 2.950 | 1.80100 | 34.97 | 0.58642 |
| 17 | −38.22034 | 0.100 | | | |
| 18 | 63.65733 | 4.310 | 1.61800 | 63.33 | 0.54414 |
| 19 | −39.25049 | 1.150 | 1.80518 | 25.42 | 0.61616 |
| 20 | ∞ | DD[20] | | | |
| 21 (stop) | ∞ | 1.300 | | | |
| 22 | 27.59915 | 6.985 | 1.49700 | 81.54 | 0.53748 |
| 23 | −58.46986 | 0.150 | | | |
| 24 | 34.60348 | 2.550 | 1.65412 | 39.68 | 0.57378 |

TABLE 1-continued

Example 1 - Lens Data

| Surface No. | Radius of Curvature | Surface Distance | nd | vd | θgF |
|---|---|---|---|---|---|
| 25 | 95.96990 | 1.610 | | | |
| 26 | −53.62431 | 1.210 | 1.90366 | 31.31 | 0.59481 |
| 27 | 22.84961 | 6.512 | 1.49700 | 81.54 | 0.53748 |
| 28 | −84.57206 | 2.500 | | | |
| 29 | 293.69564 | 3.771 | 1.80518 | 25.42 | 0.61616 |
| 30 | −23.04083 | 0.950 | 1.58913 | 61.13 | 0.54067 |
| 31 | 33.63593 | 2.693 | | | |
| 32 | −43.53615 | 1.050 | 1.80100 | 34.97 | 0.58642 |
| 33 | 62.25169 | 3.752 | | | |
| 34 | 51.53927 | 6.921 | 1.80000 | 29.84 | 0.60178 |
| 35 | −39.86271 | 3.848 | | | |
| 36 | 50.27571 | 7.368 | 1.48749 | 70.24 | 0.53007 |
| 37 | −26.02866 | 1.310 | 1.80518 | 25.42 | 0.61616 |
| 38 | −69.72800 | 3.069 | | | |
| 39 | −30.18711 | 1.310 | 1.91082 | 35.25 | 0.58224 |
| 40 | −51.30966 | 26.063 | | | |
| 41 | ∞ | 2.850 | 1.51633 | 64.14 | 0.53531 |
| 42 | ∞ | | | | |

TABLE 2

Example 1 - Specification (d-line)

| | Wide Angle End | Middle | Telephoto End |
|---|---|---|---|
| Zoom Magnification | 1.0 | 1.8 | 2.6 |
| f' | 51.517 | 92.224 | 135.968 |
| Bf' | 29.940 | 29.940 | 29.940 |
| FNo. | 2.88 | 2.89 | 2.88 |
| 2ω[°] | 30.4 | 17.0 | 11.6 |

TABLE 3

Example 1 - Distances Relating to Zoom

| | Wide Angle End | Middle | Telephoto End |
|---|---|---|---|
| DD[7] | 1.647 | 24.961 | 34.686 |
| DD[15] | 11.849 | 7.355 | 2.477 |
| DD[20] | 32.001 | 13.182 | 8.334 |

Figure 12:
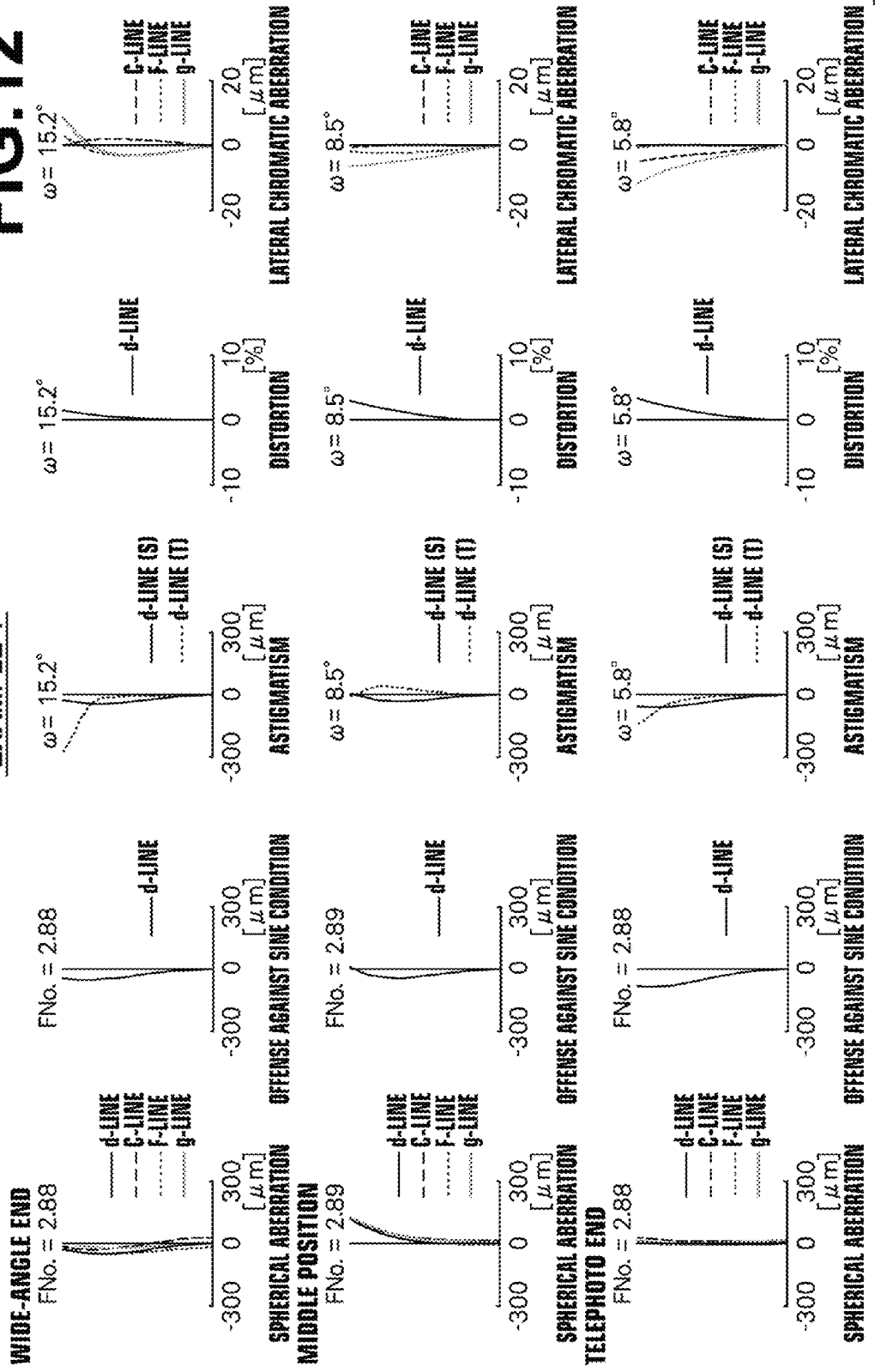
FIG. 12 shows aberration diagrams of the zoom lens of Example 1 of the invention.

FIG. 12 shows aberration diagrams of the zoom lens of Example 1. The aberration diagrams shown at the top of FIG. 12 are those of spherical aberration, offense against the sine condition, astigmatism, distortion, and lateral chromatic aberration at the wide-angle end in this order from the left side, the aberration diagrams shown at the middle of FIG. 12 are those of spherical aberration, offense against the sine condition, astigmatism, distortion, and lateral chromatic aberration at the middle position in this order from the left side, and the aberration diagrams shown at the bottom of FIG. 12 are those of spherical aberration, offense against the sine condition, astigmatism, distortion, and lateral chromatic aberration at the telephoto end in this order from the left side. The aberration diagrams of spherical aberration, offense against the sine condition, astigmatism, and distortion show those with respect to the d-line (the wavelength of 587.6 nm), which is used as a reference wavelength. The aberration diagrams of spherical aberration show those with respect to the d-line (the wavelength of 587.6 nm), the C-line (the wavelength of 656.3 nm), the F-line (the wavelength of 486.1 nm), and the g-line (the wavelength of 435.8 nm) in the solid line, the long dashed line, the short dashed line, and the gray line, respectively. The aberration diagrams of astigmatism show those in the sagittal direction and the tangential direction in the solid line and the short dashed line, respectively. The aberration diagrams of lateral chromatic aberration show those with respect to the C-line (the wavelength of 656.3 nm), the F-line (the wavelength of 486.1 nm), and the g-line (the wavelength of 435.8 nm) in the long dashed line, the short dashed line, and the gray line, respectively. It should be noted that these longitudinal aberration diagrams show aberrations when the lens is focused on an object at infinity. The symbol "FNo." in the aberration diagrams of spherical aberration and offense against the sine condition means "F-number", and the symbol "ω" in the other aberration diagrams means "half angle of view".

FIG. 23 shows lateral aberration diagrams of the zoom lens of Example 1. FIG. 23 shows, in order from the top, lateral aberration diagrams at the wide-angle end, at the middle position, and at the telephoto end. Among the lateral aberration diagrams shown in two columns, the lateral aberration diagrams on the left show those with respect to the tangential direction, and the lateral aberration diagrams on the right show those with respect to the sagittal direction. Among the lateral aberration diagrams, one at the top shows aberrations at the center of the image plane, two at the middle show aberrations at the position where the image height is 80% of the maximum image height on the positive (+) side, and two at the bottom show aberrations at the position where the image height is 80% of the maximum image height on the negative (−) side. It should be noted that, in FIG. 23, aberrations with respect to the d-line (the wavelength of 587.6 nm), the C-line (the wavelength of 656.3 nm), the F-line (the wavelength of 486.1 nm), and the g-line (the wavelength of 435.8 nm) are shown in the solid line, the long dashed line, the short dashed line, and the gray line, respectively. These lateral aberration diagrams show lateral aberrations when the lens is focused on an object at infinity. The symbol "ω" in the aberration diagrams means "half angle of view".

The above-described symbols, meanings and manners of description of the various data of Example 1 apply also to the examples described below, unless otherwise noted, and the same explanations are not repeated in the following description.

Figure 13:
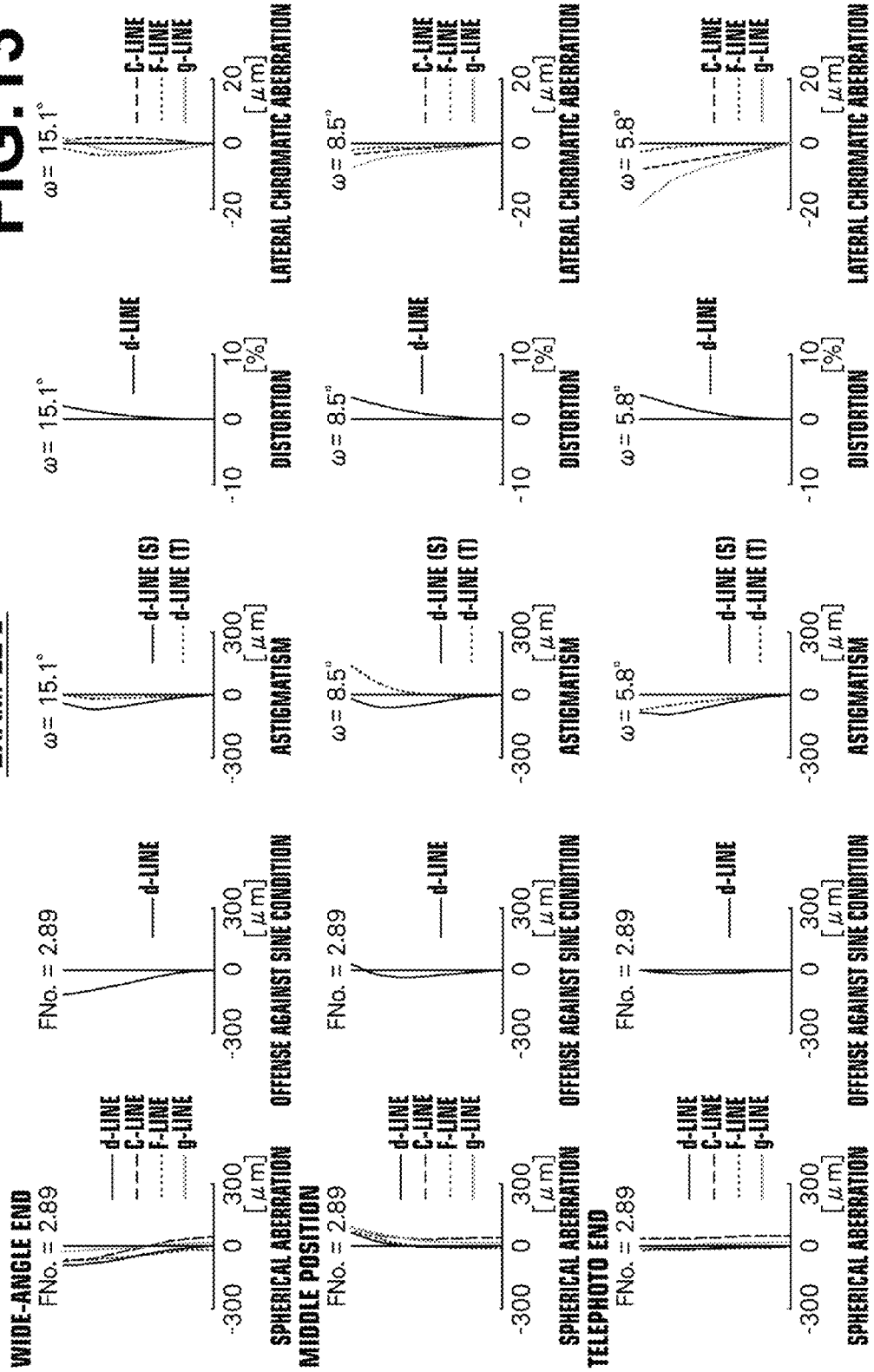
FIG. 13 shows aberration diagrams of the zoom lens of Example 2 of the invention.
Figure 24:
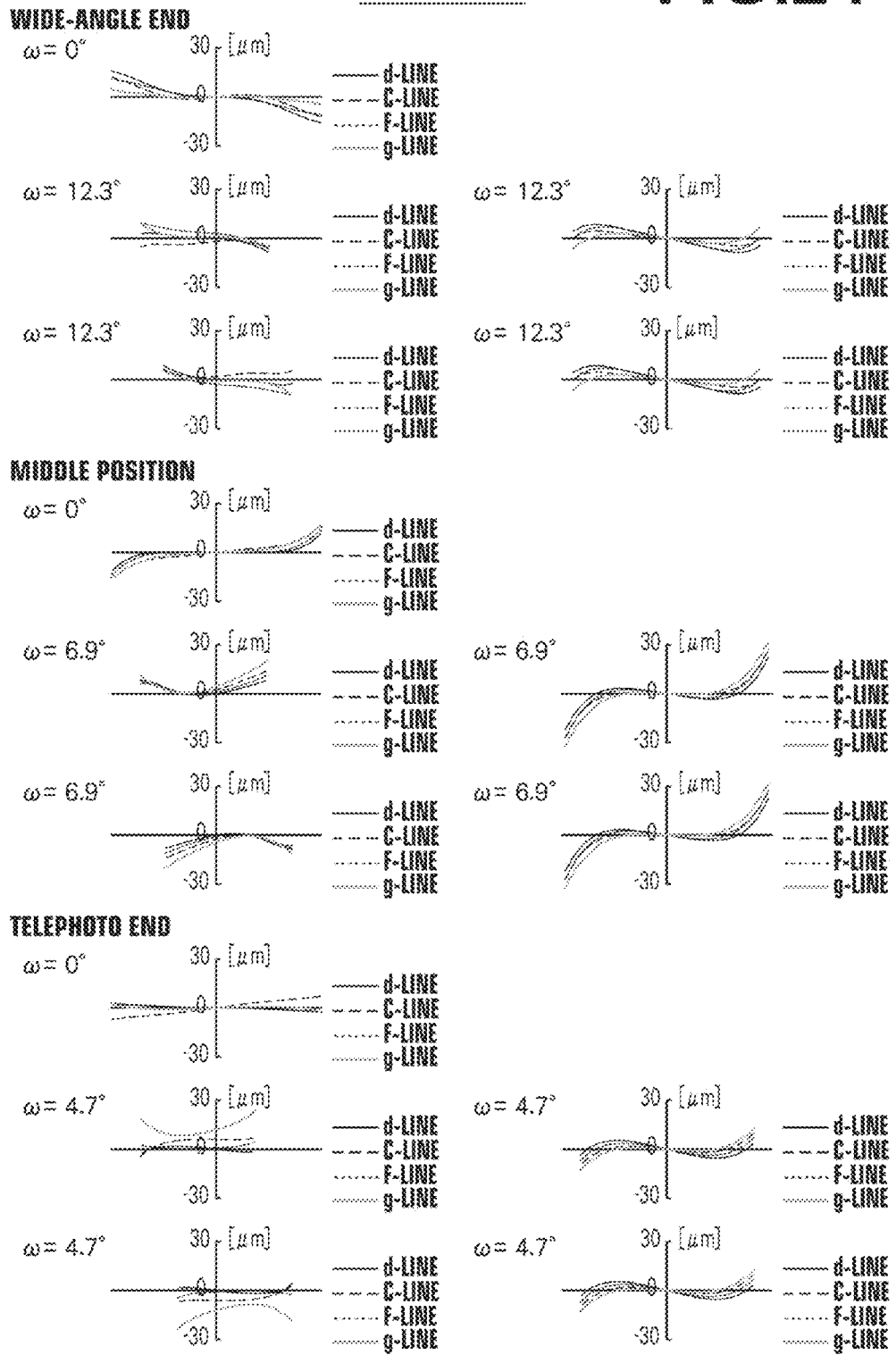
FIG. 24 shows lateral aberration diagrams of the zoom lens of Example 2 of the invention.

Next, a zoom lens of Example 2 is described. The zoom lens of Example 2 has a lens group configuration similar to that of the zoom lens of Example 1. FIG. 2 is a sectional view illustrating the lens configuration of the zoom lens of Example 2. Table 4 shows basic lens data of the zoom lens of Example 2, Table 5 shows data about specifications of the zoom lens, Table 6 shows data about distances between surfaces to be moved of the zoom lens, FIG. 13 shows aberration diagrams of the zoom lens, and FIG. 24 shows lateral aberration diagrams of the zoom lens.

TABLE 4

Example 2 - Lens Data

| Surface No. | Radius of Curvature | Surface Distance | nd | νd | θgF |
|---|---|---|---|---|---|
| 1 | 147.14684 | 2.312 | 1.90366 | 31.31 | 0.59481 |
| 2 | 71.34579 | 6.799 | 1.49700 | 81.54 | 0.53748 |
| 3 | 4466.14983 | 0.262 | | | |
| 4 | 82.92060 | 4.599 | 1.45562 | 91.31 | 0.53429 |
| 5 | 222.61947 | 0.209 | | | |
| 6 | 72.46651 | 7.001 | 1.48749 | 70.24 | 0.53007 |
| 7 | 2229.87611 | DD[7] | | | |
| 8 | 83.14047 | 6.305 | 1.64769 | 33.79 | 0.59393 |
| 9 | −54.99973 | 1.501 | 1.61772 | 49.81 | 0.56035 |
| 10 | 22.65737 | 6.228 | | | |
| 11 | −129.46710 | 1.009 | 1.53775 | 74.70 | 0.53936 |

TABLE 4-continued

Example 2 - Lens Data

| Surface No. | Radius of Curvature | Surface Distance | nd | νd | θgF |
|---|---|---|---|---|---|
| 12 | 23.41440 | 5.501 | 1.84661 | 23.88 | 0.62072 |
| 13 | 90.28797 | 3.246 | | | |
| 14 | −32.56444 | 0.999 | 1.91082 | 35.25 | 0.58224 |
| 15 | −754.10763 | DD[15] | | | |
| 16 | −139.28102 | 3.100 | 1.91082 | 35.25 | 0.58224 |
| 17 | −37.20322 | 0.100 | | | |
| 18 | 45.57357 | 5.511 | 1.48749 | 70.24 | 0.53007 |
| 19 | −45.00113 | 1.100 | 1.80518 | 25.42 | 0.61616 |
| 20 | 302.73331 | DD[20] | | | |
| 21 (stop) | ∞ | 1.300 | | | |
| 22 | 29.00638 | 5.564 | 1.53775 | 74.70 | 0.53936 |
| 23 | −83.12098 | 0.182 | | | |
| 24 | 28.22418 | 2.499 | 1.65412 | 39.68 | 0.57378 |
| 25 | 48.84185 | 1.900 | | | |
| 26 | −76.98887 | 1.210 | 1.90366 | 31.31 | 0.59481 |
| 27 | 20.91613 | 7.501 | 1.53775 | 74.70 | 0.53936 |
| 28 | −71.39743 | 3.663 | | | |
| 29 | 101.15891 | 4.706 | 1.80518 | 25.42 | 0.61616 |
| 30 | −24.63022 | 0.882 | 1.60300 | 65.44 | 0.54022 |
| 31 | 26.11599 | 3.199 | | | |
| 32 | −41.59530 | 0.899 | 1.80100 | 34.97 | 0.58642 |
| 33 | 49.70954 | 2.255 | | | |
| 34 | 43.72156 | 5.600 | 1.80000 | 29.84 | 0.60178 |
| 35 | −36.00246 | 2.992 | | | |
| 36 | 36.16338 | 5.708 | 1.48749 | 70.24 | 0.53007 |
| 37 | −25.22381 | 1.199 | 1.80518 | 25.42 | 0.61616 |
| 38 | −148.78795 | 4.102 | | | |
| 39 | −27.60609 | 1.199 | 1.91082 | 35.25 | 0.58224 |
| 40 | −43.25152 | 23.562 | | | |
| 41 | ∞ | 2.850 | 1.51633 | 64.14 | 0.53531 |
| 42 | ∞ | | | | |

TABLE 5

Example 2 - Specification (d-line)

| | Wide Angle End | Middle | Telephoto End |
|---|---|---|---|
| Zoom Magnification | 1.0 | 1.8 | 2.6 |
| f | 51.492 | 92.178 | 135.901 |
| Bf | 27.440 | 27.440 | 27.440 |
| FNo. | 2.89 | 2.89 | 2.89 |
| 2ω [°] | 30.2 | 17.0 | 11.6 |

TABLE 6

Example 2 - Distances Relating to Zoom

| | Wide Angle End | Middle | Telephoto End |
|---|---|---|---|
| DD[7] | 1.199 | 24.644 | 34.908 |
| DD[15] | 12.356 | 7.391 | 1.751 |
| DD[20] | 31.802 | 13.322 | 8.698 |

Figure 14:
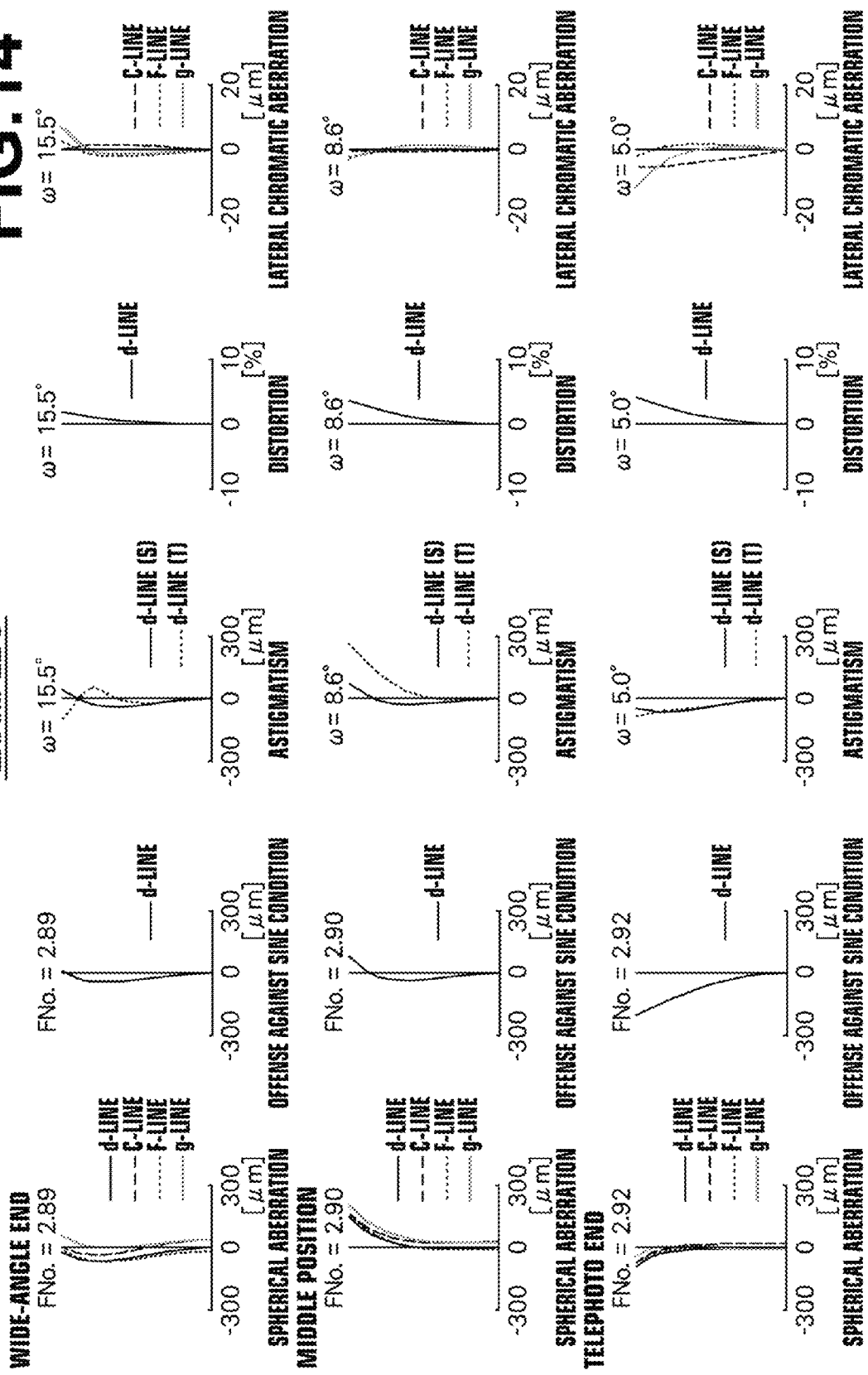
FIG. 14 shows aberration diagrams of the zoom lens of Example 3 of the invention.

Next, a zoom lens of Example 3 is described. The zoom lens of Example 3 has a lens group configuration similar to that of the zoom lens of Example 1. FIG. 3 is a sectional view illustrating the lens configuration of the zoom lens of Example 3. Table 7 shows basic lens data of the zoom lens of Example 3, Table 8 shows data about specifications of the zoom lens, Table 9 shows data about distances between surfaces to be moved of the zoom lens, FIG. 14 shows aberration diagrams of the zoom lens, and FIG. 25 shows lateral aberration diagrams of the zoom lens.

TABLE 7

Example 3 - Lens Data

| Surface No. | Radius of Curvature | Surface Distance | nd | vd | θgF |
|---|---|---|---|---|---|
| 1 | 263.09263 | 2.312 | 1.88100 | 40.14 | 0.57010 |
| 2 | 65.86876 | 7.199 | 1.49700 | 81.54 | 0.53748 |
| 3 | −571.64100 | 0.262 | | | |
| 4 | 65.97392 | 6.200 | 1.45562 | 91.31 | 0.53429 |
| 5 | 1175.27258 | 0.209 | | | |
| 6 | 81.36467 | 5.500 | 1.53775 | 74.70 | 0.53936 |
| 7 | 614.16494 | DD[7] | | | |
| 8 | 120.18724 | 5.912 | 1.72047 | 34.71 | 0.58350 |
| 9 | −42.77946 | 1.200 | 1.62230 | 53.17 | 0.55424 |
| 10 | 26.30170 | 5.468 | | | |
| 11 | −3031.67199 | 1.009 | 1.43875 | 94.94 | 0.53433 |
| 12 | 24.69032 | 4.403 | 1.84661 | 23.88 | 0.62072 |
| 13 | 52.10852 | 4.001 | | | |
| 14 | −29.01944 | 0.999 | 1.88300 | 40.76 | 0.56679 |
| 15 | 677.75184 | DD[15] | | | |
| 16 | −624.58221 | 3.099 | 1.91082 | 35.25 | 0.58224 |
| 17 | −48.99609 | 0.100 | | | |
| 18 | 84.61141 | 4.859 | 1.62041 | 60.29 | 0.54266 |
| 19 | −45.52887 | 1.100 | 1.84666 | 23.78 | 0.62054 |
| 20 | −11814.82817 | DD[20] | | | |
| 21 (stop) | ∞ | 1.300 | | | |
| 22 | 28.94841 | 7.001 | 1.49700 | 81.54 | 0.53748 |
| 23 | −70.94964 | 2.298 | | | |
| 24 | 35.48837 | 2.499 | 1.65412 | 39.68 | 0.57378 |
| 25 | 125.19811 | 1.799 | | | |
| 26 | −55.44889 | 1.210 | 1.90366 | 31.31 | 0.59481 |
| 27 | 24.47948 | 7.501 | 1.49700 | 81.54 | 0.53748 |
| 28 | −71.45146 | 2.001 | | | |
| 29 | 93.11345 | 4.160 | 1.80518 | 25.42 | 0.61616 |
| 30 | −26.87211 | 0.849 | 1.58313 | 59.37 | 0.54345 |
| 31 | 26.83474 | 3.501 | | | |
| 32 | −31.98401 | 0.901 | 1.80100 | 34.97 | 0.58642 |
| 33 | 64.79704 | 2.718 | | | |
| 34 | 52.34160 | 5.499 | 1.80000 | 29.84 | 0.60178 |
| 35 | −36.46191 | 4.001 | | | |
| 36 | 56.45949 | 7.310 | 1.48749 | 70.24 | 0.53007 |
| 37 | −23.44294 | 1.199 | 1.80518 | 25.42 | 0.61616 |
| 38 | −60.82914 | 2.999 | | | |
| 39 | −26.37941 | 1.199 | 1.91082 | 35.25 | 0.58224 |
| 40 | −35.96318 | 22.238 | | | |
| 41 | ∞ | 2.850 | 1.51633 | 64.14 | 0.53531 |
| 42 | ∞ | | | | |

TABLE 8

Example 3 - Specification (d-line)

| | Wide Angle End | Middle | Telephoto End |
|---|---|---|---|
| Zoom Magnification | 1.0 | 1.8 | 3.1 |
| f | 50.359 | 90.150 | 157.119 |
| Bf | 26.122 | 26.122 | 26.122 |
| FNo. | 2.89 | 2.90 | 2.92 |
| 2ω [°] | 31.0 | 17.2 | 10.0 |

TABLE 9

Example 3 - Distances Relating to Zoom

| | Wide Angle End | Middle | Telephoto End |
|---|---|---|---|
| DD[7] | 1.199 | 24.327 | 37.203 |
| DD[15] | 16.502 | 10.829 | 1.100 |
| DD[20] | 32.001 | 14.546 | 11.399 |

Figure 15:
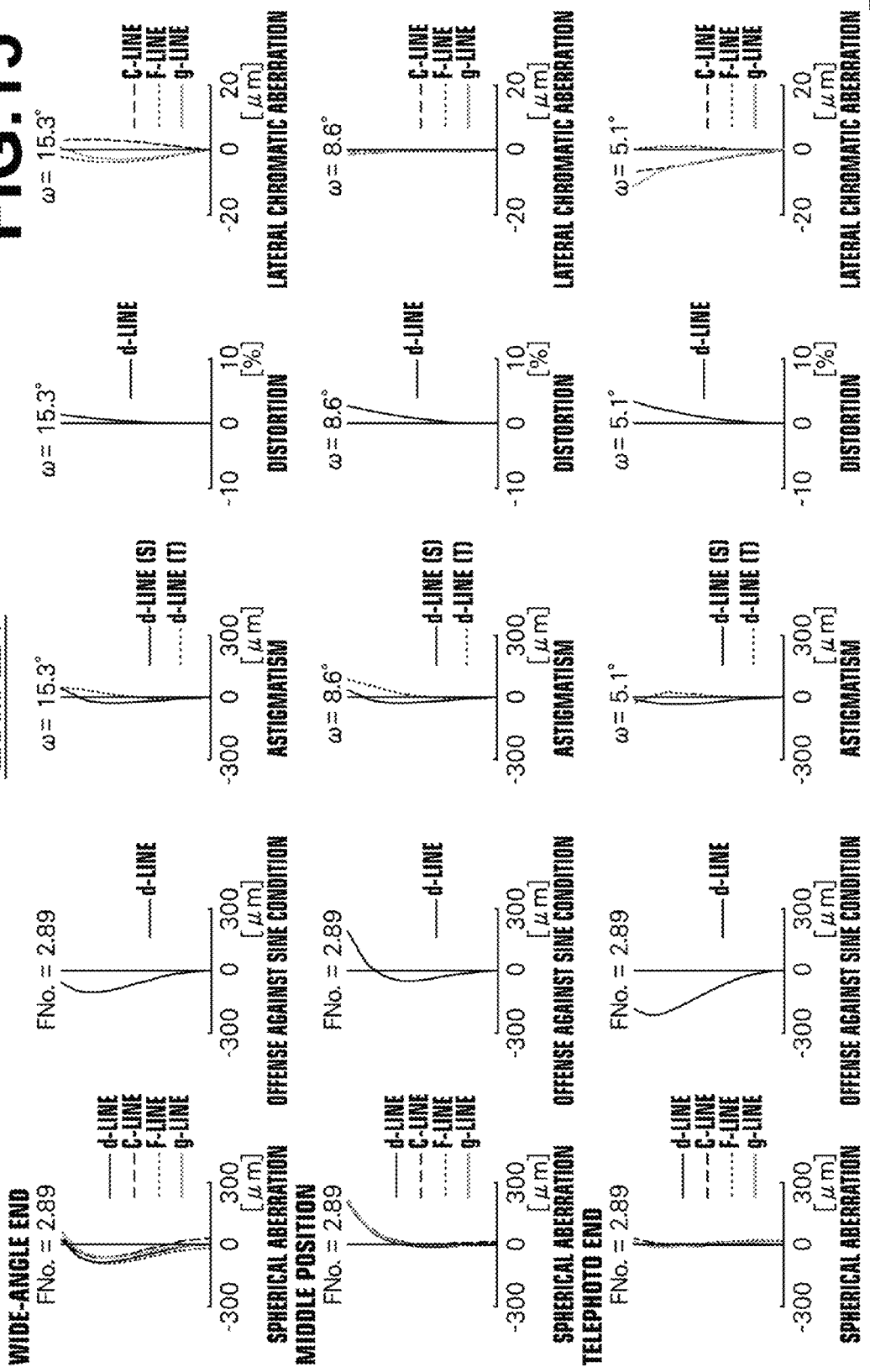
FIG. 15 shows aberration diagrams of the zoom lens of Example 4 of the invention.

Next, a zoom lens of Example 4 is described. The zoom lens of Example 4 has a lens group configuration similar to that of the zoom lens of Example 1. FIG. 4 is a sectional view illustrating the lens configuration of the zoom lens of Example 4. Table 10 shows basic lens data of the zoom lens of Example 4, Table 11 shows data about specifications of the zoom lens, Table 12 shows data about distances between surfaces to be moved of the zoom lens, FIG. 15 shows aberration diagrams of the zoom lens, and FIG. 26 shows lateral aberration diagrams of the zoom lens.

TABLE 10

Example 4 - Lens Data

| Surface No. | Radius of Curvature | Surface Distance | nd | vd | θgF |
|---|---|---|---|---|---|
| 1 | 188.13090 | 2.312 | 1.80610 | 33.27 | 0.58845 |
| 2 | 76.50883 | 7.200 | 1.49700 | 81.54 | 0.53748 |
| 3 | −3204.67292 | 0.262 | | | |
| 4 | 71.91851 | 6.200 | 1.43875 | 94.94 | 0.53433 |
| 5 | 718.81472 | 0.209 | | | |
| 6 | 63.83157 | 5.500 | 1.43875 | 94.94 | 0.53433 |
| 7 | 286.11890 | DD[7] | | | |
| 8 | 127.11673 | 5.510 | 1.72047 | 34.71 | 0.58350 |
| 9 | −52.90722 | 1.200 | 1.62230 | 53.17 | 0.55424 |
| 10 | 24.99227 | 6.501 | | | |
| 11 | −273.45110 | 1.511 | 1.59522 | 67.74 | 0.54426 |
| 12 | 26.07897 | 5.501 | 1.84661 | 23.88 | 0.62072 |
| 13 | 90.43692 | 4.000 | | | |
| 14 | −28.20939 | 1.001 | 1.88300 | 40.76 | 0.56679 |
| 15 | −219.42843 | DD[15] | | | |
| 16 | 4368.42118 | 3.099 | 1.91082 | 35.25 | 0.58224 |
| 17 | −45.70178 | 0.100 | | | |
| 18 | 75.53670 | 5.511 | 1.49700 | 81.54 | 0.53748 |
| 19 | −37.32451 | 1.100 | 1.80518 | 25.42 | 0.61616 |
| 20 | −582.89400 | DD[20] | | | |
| 21 (stop) | ∞ | 1.300 | | | |
| 22 | 31.57617 | 7.001 | 1.49700 | 81.54 | 0.53748 |
| 23 | −84.25408 | 1.501 | | | |
| 24 | 32.66369 | 2.500 | 1.65412 | 39.68 | 0.57378 |
| 25 | 452.11337 | 1.799 | | | |
| 26 | −77.71874 | 1.210 | 1.90366 | 31.31 | 0.59481 |
| 27 | 23.15115 | 5.500 | 1.49700 | 81.54 | 0.53748 |
| 28 | −93.31207 | 2.001 | | | |
| 29 | 664.84163 | 4.161 | 1.80518 | 25.42 | 0.61616 |
| 30 | −28.96139 | 1.201 | 1.58313 | 59.37 | 0.54345 |
| 31 | 23.87736 | 3.200 | | | |
| 32 | −37.84433 | 0.899 | 1.80100 | 34.97 | 0.58642 |
| 33 | 66.37072 | 2.215 | | | |
| 34 | 45.41616 | 8.001 | 1.80518 | 25.42 | 0.61616 |
| 35 | −36.36637 | 1.453 | | | |
| 36 | 44.07982 | 7.310 | 1.48749 | 70.24 | 0.53007 |
| 37 | −23.31946 | 1.200 | 1.80518 | 25.42 | 0.61616 |
| 38 | −147.09849 | 2.999 | | | |
| 39 | −27.43891 | 1.200 | 1.91082 | 35.25 | 0.58224 |
| 40 | −35.75126 | 22.213 | | | |
| 41 | ∞ | 2.850 | 1.51633 | 64.14 | 0.53531 |
| 42 | ∞ | | | | |

TABLE 11

Example 4 - Specification (d-line)

| | Wide Angle End | Middle | Telephoto End |
|---|---|---|---|
| Zoom Magnification | 1.0 | 1.8 | 3.0 |
| f | 51.153 | 91.572 | 154.995 |
| Bf | 26.096 | 26.096 | 26.096 |
| FNo. | 2.89 | 2.89 | 2.89 |
| 2ω [°] | 30.6 | 17.2 | 10.2 |

TABLE 12

Example 4 - Distances Relating to Zoom

| | Wide Angle End | Middle | Telephoto End |
|---|---|---|---|
| DD[7] | 1.199 | 22.851 | 34.047 |
| DD[15] | 17.079 | 11.080 | 1.673 |
| DD[20] | 28.994 | 13.341 | 11.552 |

Figure 16:
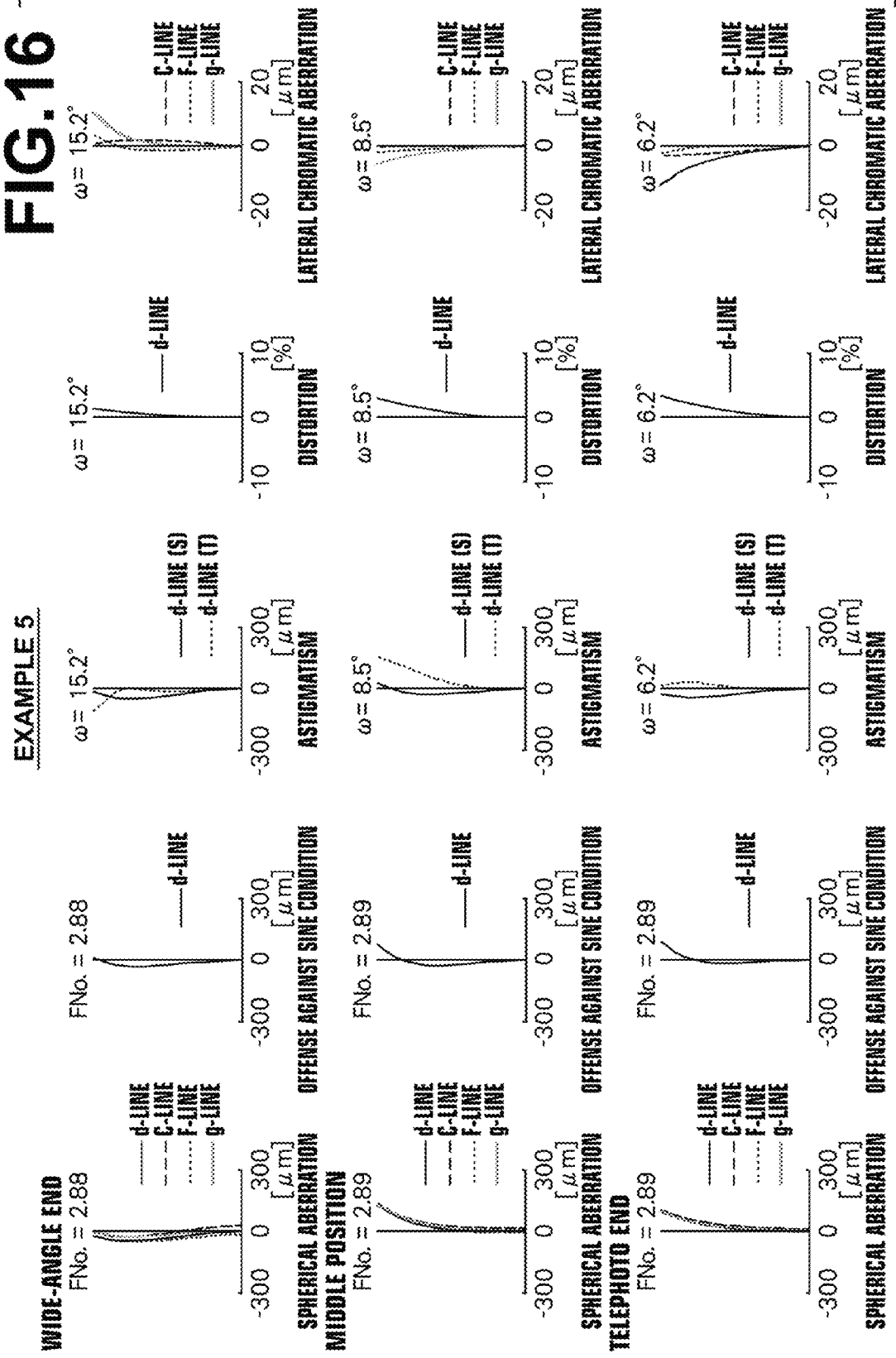
FIG. 16 shows aberration diagrams of the zoom lens of Example 5 of the invention.
Figure 27:
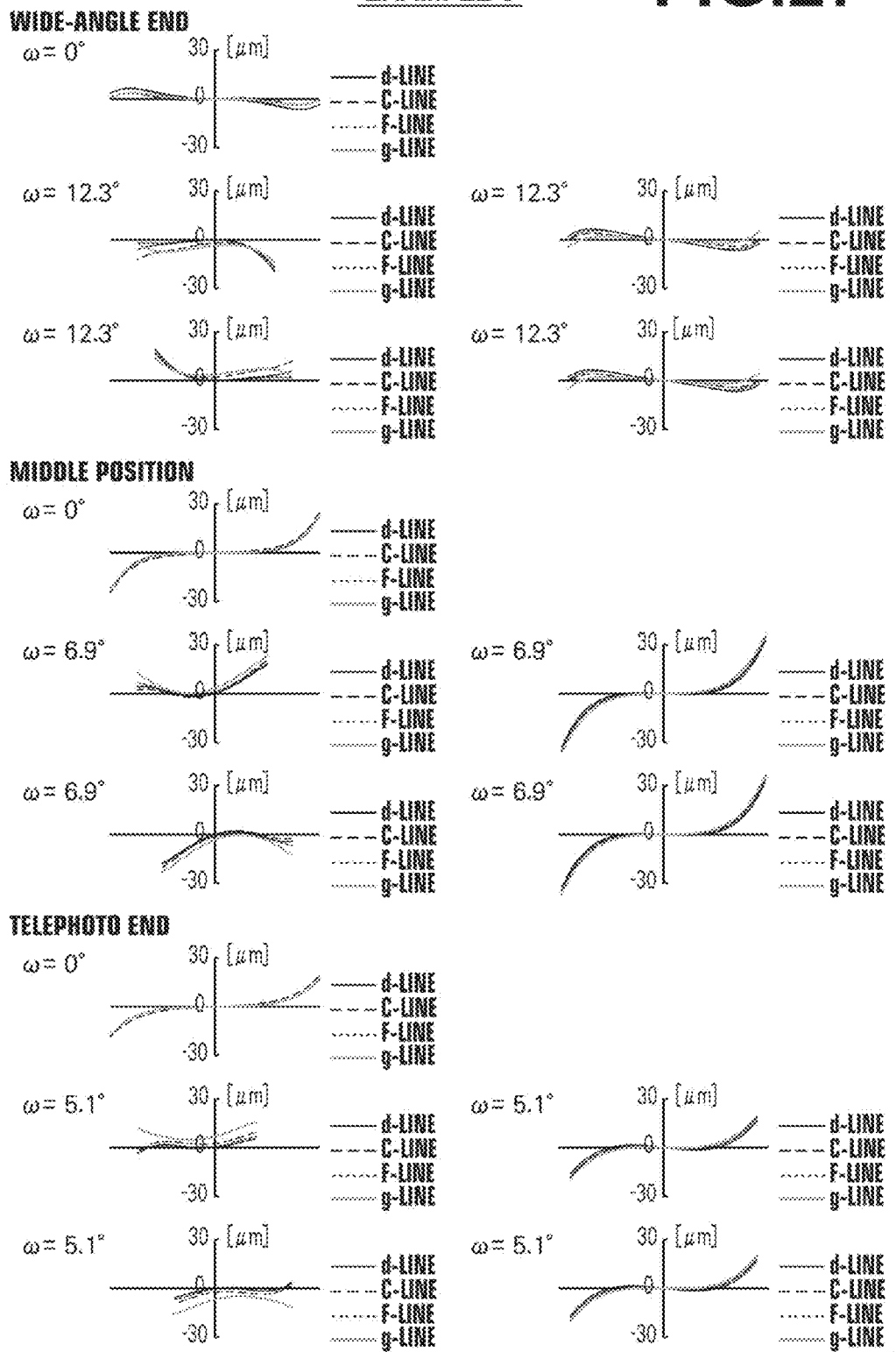
FIG. 27 shows lateral aberration diagrams of the zoom lens of Example 5 of the invention.

Next, a zoom lens of Example 5 is described. The zoom lens of Example 5 has a lens group configuration similar to that of the zoom lens of Example 1. FIG. 5 is a sectional view illustrating the lens configuration of the zoom lens of Example 5. Table 13 shows basic lens data of the zoom lens of Example 5, Table 14 shows data about specifications of the zoom lens, Table 15 shows data about distances between surfaces to be moved of the zoom lens, FIG. 16 shows aberration diagrams of the zoom lens, and FIG. 27 shows lateral aberration diagrams of the zoom lens.

TABLE 13

Example 5 - Lens Data

| Surface No. | Radius of Curvature | Surface Distance | nd | vd | θgF |
|---|---|---|---|---|---|
| 1 | 308.24145 | 2.390 | 1.80100 | 34.97 | 0.58642 |
| 2 | 78.18266 | 7.850 | 1.49700 | 81.54 | 0.53748 |
| 3 | −340.82791 | 0.200 | | | |
| 4 | 66.71039 | 6.600 | 1.43875 | 94.94 | 0.53433 |
| 5 | 720.82813 | 0.200 | | | |
| 6 | 71.57189 | 4.950 | 1.49700 | 81.54 | 0.53748 |
| 7 | 271.98720 | DD[7] | | | |
| 8 | 100.51474 | 5.710 | 1.72047 | 34.71 | 0.58350 |
| 9 | −47.31525 | 1.550 | 1.62230 | 53.17 | 0.55424 |
| 10 | 25.05895 | 5.799 | | | |
| 11 | −81.14905 | 1.260 | 1.49700 | 81.54 | 0.53748 |
| 12 | 26.42066 | 5.385 | 1.84661 | 23.88 | 0.62072 |
| 13 | 110.30764 | 3.945 | | | |
| 14 | −30.83422 | 1.250 | 1.91082 | 35.25 | 0.58224 |
| 15 | 339.66055 | DD[15] | | | |
| 16 | −578.30556 | 2.950 | 1.80100 | 34.97 | 0.58642 |
| 17 | −44.53935 | 0.100 | | | |
| 18 | 76.28815 | 4.310 | 1.61800 | 63.33 | 0.54414 |
| 19 | −43.38154 | 1.150 | 1.80518 | 25.42 | 0.61616 |
| 20 | ∞ | DD[20] | | | |
| 21 (stop) | ∞ | 1.300 | | | |
| 22 | 27.81766 | 6.849 | 1.49700 | 81.54 | 0.53748 |
| 23 | −58.16078 | 0.150 | | | |
| 24 | 34.51417 | 2.550 | 1.65412 | 39.68 | 0.57378 |
| 25 | 107.98255 | 1.610 | | | |
| 26 | −54.74993 | 1.210 | 1.90366 | 31.31 | 0.59481 |
| 27 | 23.44507 | 5.499 | 1.49700 | 81.54 | 0.53748 |
| 28 | −83.55949 | 2.500 | | | |
| 29 | 343.99918 | 3.771 | 1.80518 | 25.42 | 0.61616 |
| 30 | −24.56535 | 0.950 | 1.58913 | 61.13 | 0.54067 |
| 31 | 39.79185 | 2.559 | | | |
| 32 | −45.16452 | 1.050 | 1.80100 | 34.97 | 0.58642 |
| 33 | 60.11939 | 4.533 | | | |
| 34 | 51.91667 | 6.541 | 1.80000 | 29.84 | 0.60178 |
| 35 | −39.70261 | 4.000 | | | |
| 36 | 54.95056 | 6.950 | 1.48749 | 70.24 | 0.53007 |
| 37 | −27.73386 | 1.310 | 1.80518 | 25.42 | 0.61616 |
| 38 | −89.67633 | 3.413 | | | |
| 39 | −27.15780 | 1.310 | 1.91082 | 35.25 | 0.58224 |
| 40 | −45.53256 | 24.577 | | | |
| 41 | ∞ | 2.850 | 1.51633 | 64.14 | 0.53531 |
| 42 | ∞ | | | | |

TABLE 14

Example 5 - Specification (d-line)

| | Wide Angle End | Middle | Telephoto End |
|---|---|---|---|
| Zoom Magnification | 1.0 | 1.8 | 2.4 |
| f | 51.515 | 92.219 | 125.696 |
| Bf | 28.455 | 28.455 | 28.455 |
| FNo. | 2.88 | 2.89 | 2.89 |
| 2ω [°] | 30.4 | 17.0 | 12.4 |

TABLE 15

Example 5 - Distances Relating to Zoom

| | Wide Angle End | Middle | Telephoto End |
|---|---|---|---|
| DD[7] | 1.199 | 22.040 | 29.321 |
| DD[15] | 14.144 | 8.593 | 3.929 |
| DD[20] | 27.855 | 12.565 | 9.948 |

Figure 6:
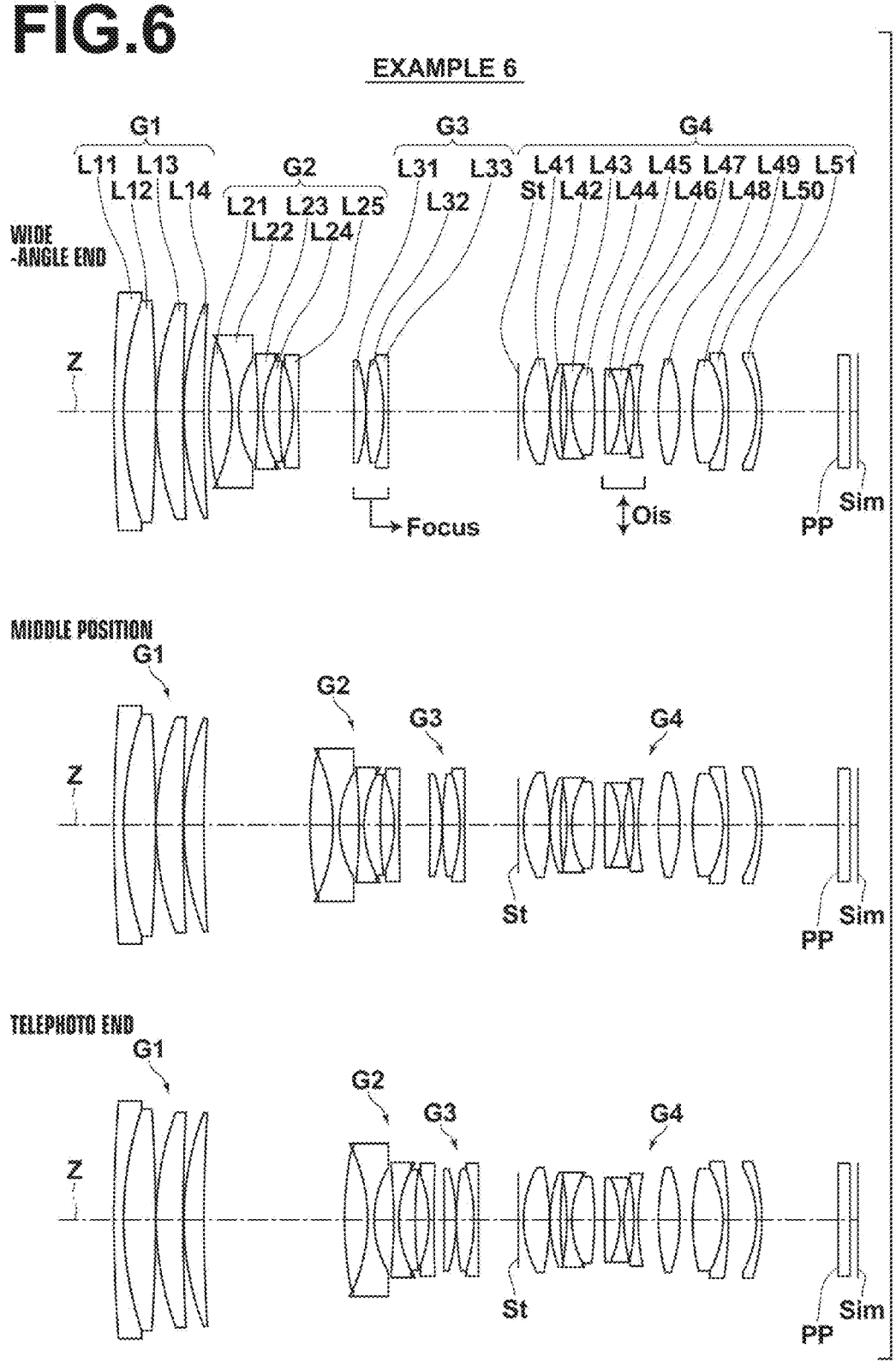
FIG. 6 is a sectional view illustrating the lens configuration of a zoom lens of Example 6 of the invention.
Figure 17:
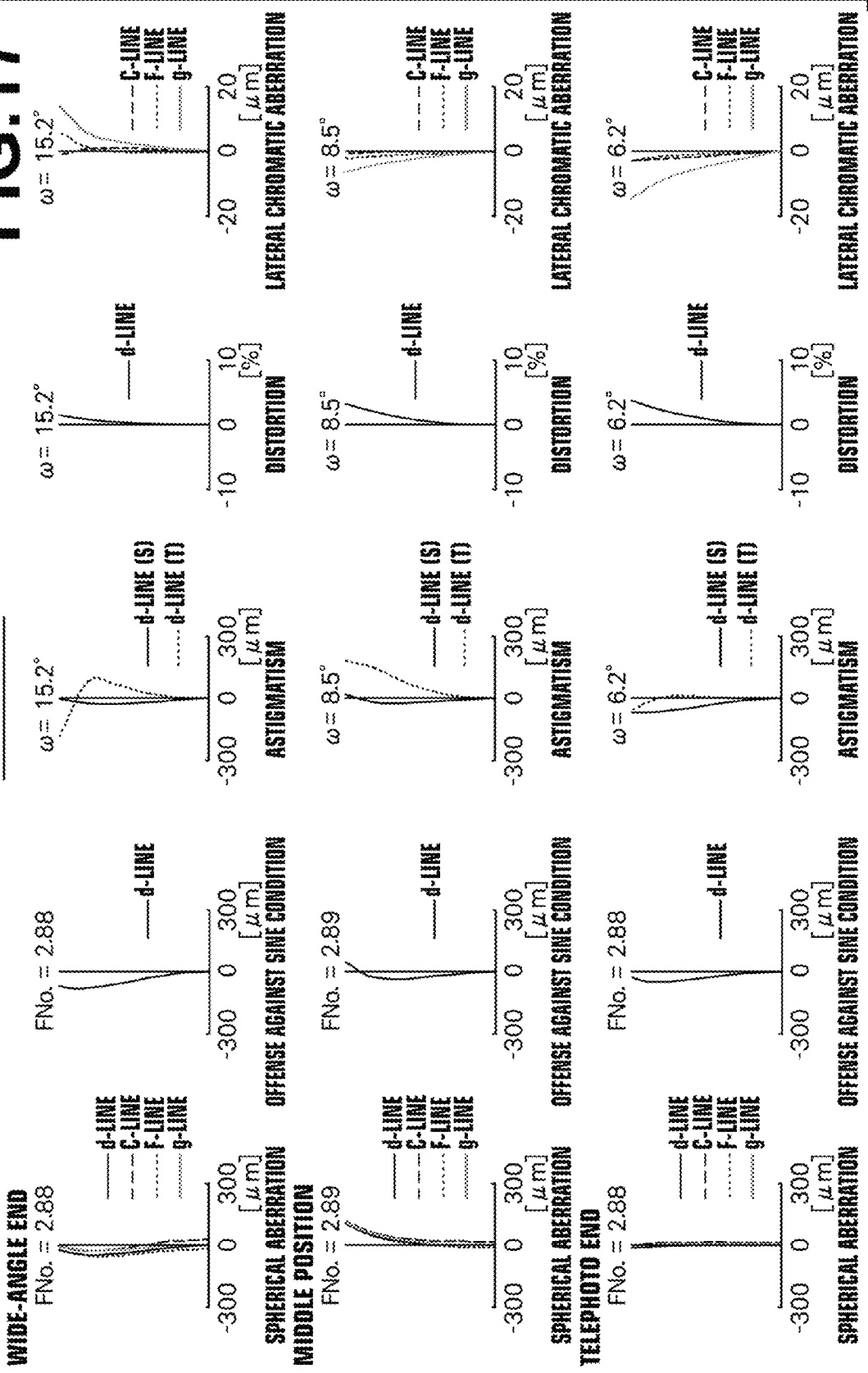
FIG. 17 shows aberration diagrams of the zoom lens of Example 6 of the invention.
Figure 28:
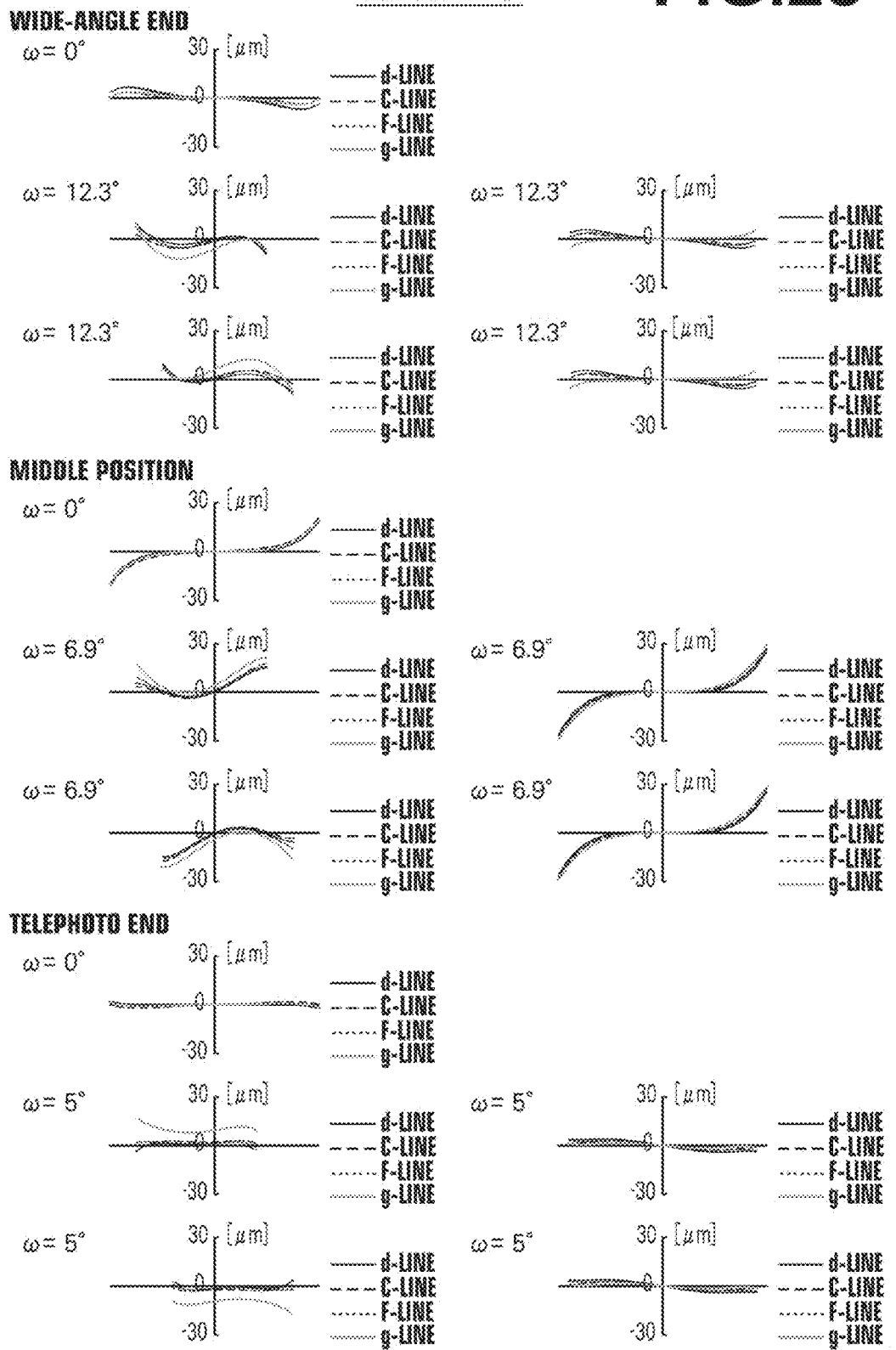
FIG. 28 shows lateral aberration diagrams of the zoom lens of Example 6 of the invention.

Next, a zoom lens of Example 6 is described. The zoom lens of Example 6 has a lens group configuration similar to that of the zoom lens of Example 1. FIG. 6 is a sectional view illustrating the lens configuration of the zoom lens of Example 6. Table 16 shows basic lens data of the zoom lens of Example 6, Table 17 shows data about specifications of the zoom lens, Table 18 shows data about distances between surfaces to be moved of the zoom lens, FIG. 17 shows aberration diagrams of the zoom lens, and FIG. 28 shows lateral aberration diagrams of the zoom lens.

TABLE 16

Example 6 - Lens Data

| Surface No. | Radius of Curvature | Surface Distance | nd | vd | θgF |
|---|---|---|---|---|---|
| 1 | 379.59503 | 2.390 | 1.80100 | 34.97 | 0.58642 |
| 2 | 87.06343 | 7.850 | 1.49700 | 81.54 | 0.53748 |
| 3 | −423.40525 | 0.200 | | | |
| 4 | 77.08956 | 6.600 | 1.43875 | 94.94 | 0.53433 |
| 5 | 505.15031 | 0.200 | | | |
| 6 | 74.14509 | 4.950 | 1.49700 | 81.54 | 0.53748 |
| 7 | 428.65265 | DD[7] | | | |
| 8 | 95.00168 | 5.710 | 1.72047 | 34.71 | 0.58350 |
| 9 | −42.18184 | 1.550 | 1.62230 | 53.17 | 0.55424 |
| 10 | 25.82252 | 4.852 | | | |
| 11 | −127.50772 | 1.260 | 1.49700 | 81.54 | 0.53748 |
| 12 | 27.56506 | 4.000 | 1.84661 | 23.88 | 0.62072 |
| 13 | 102.12490 | 3.395 | | | |
| 14 | −31.04306 | 1.250 | 1.91082 | 35.25 | 0.58224 |
| 15 | 593.08219 | DD[15] | | | |
| 16 | −587.37289 | 2.950 | 1.80100 | 34.97 | 0.58642 |
| 17 | −43.88242 | 0.100 | | | |
| 18 | 78.12881 | 4.310 | 1.61800 | 63.33 | 0.54414 |
| 19 | −42.34007 | 1.150 | 1.80518 | 25.42 | 0.61616 |
| 20 | ∞ | DD[20] | | | |
| 21 (stop) | ∞ | 1.300 | | | |
| 22 | 27.72433 | 6.373 | 1.49700 | 81.54 | 0.53748 |
| 23 | −59.65321 | 0.150 | | | |
| 24 | 34.01198 | 2.550 | 1.65412 | 39.68 | 0.57378 |
| 25 | 93.88248 | 1.610 | | | |
| 26 | −54.41210 | 1.210 | 1.90366 | 31.31 | 0.59481 |
| 27 | 23.35543 | 5.569 | 1.49700 | 81.54 | 0.53748 |
| 28 | −77.98799 | 2.500 | | | |
| 29 | 394.61491 | 3.771 | 1.80518 | 25.42 | 0.61616 |
| 30 | −24.49939 | 0.950 | 1.58913 | 61.13 | 0.54067 |
| 31 | 37.65964 | 2.511 | | | |
| 32 | −48.39346 | 1.050 | 1.80100 | 34.97 | 0.58642 |
| 33 | 60.29812 | 4.948 | | | |
| 34 | 52.39389 | 5.299 | 1.80000 | 29.84 | 0.60178 |
| 35 | −39.28541 | 3.134 | | | |
| 36 | 53.75550 | 7.501 | 1.48749 | 70.24 | 0.53007 |
| 37 | −26.62926 | 1.310 | 1.80518 | 25.42 | 0.61616 |
| 38 | −98.73317 | 6.921 | | | |
| 39 | −26.89205 | 1.310 | 1.91082 | 35.25 | 0.58224 |
| 40 | −46.99846 | 18.856 | | | |
| 41 | ∞ | 2.850 | 1.51633 | 64.14 | 0.53531 |
| 42 | ∞ | | | | |

TABLE 17

Example 6 - Specification (d-line)

| | Wide Angle End | Middle | Telephoto End |
|---|---|---|---|
| Zoom Magnification | 1.0 | 1.8 | 2.4 |
| f | 51.515 | 92.219 | 125.696 |
| Bf | 22.736 | 22.736 | 22.736 |
| FNo. | 2.88 | 2.89 | 2.88 |
| 2ω [°] | 30.4 | 17.0 | 12.4 |

TABLE 18

Example 6 - Distances Relating to Zoom

| | Wide Angle End | Middle | Telephoto End |
|---|---|---|---|
| DD[7] | 1.199 | 26.087 | 34.640 |
| DD[15] | 13.697 | 7.573 | 2.495 |
| DD[20] | 32.001 | 13.236 | 9.762 |

Figure 18:
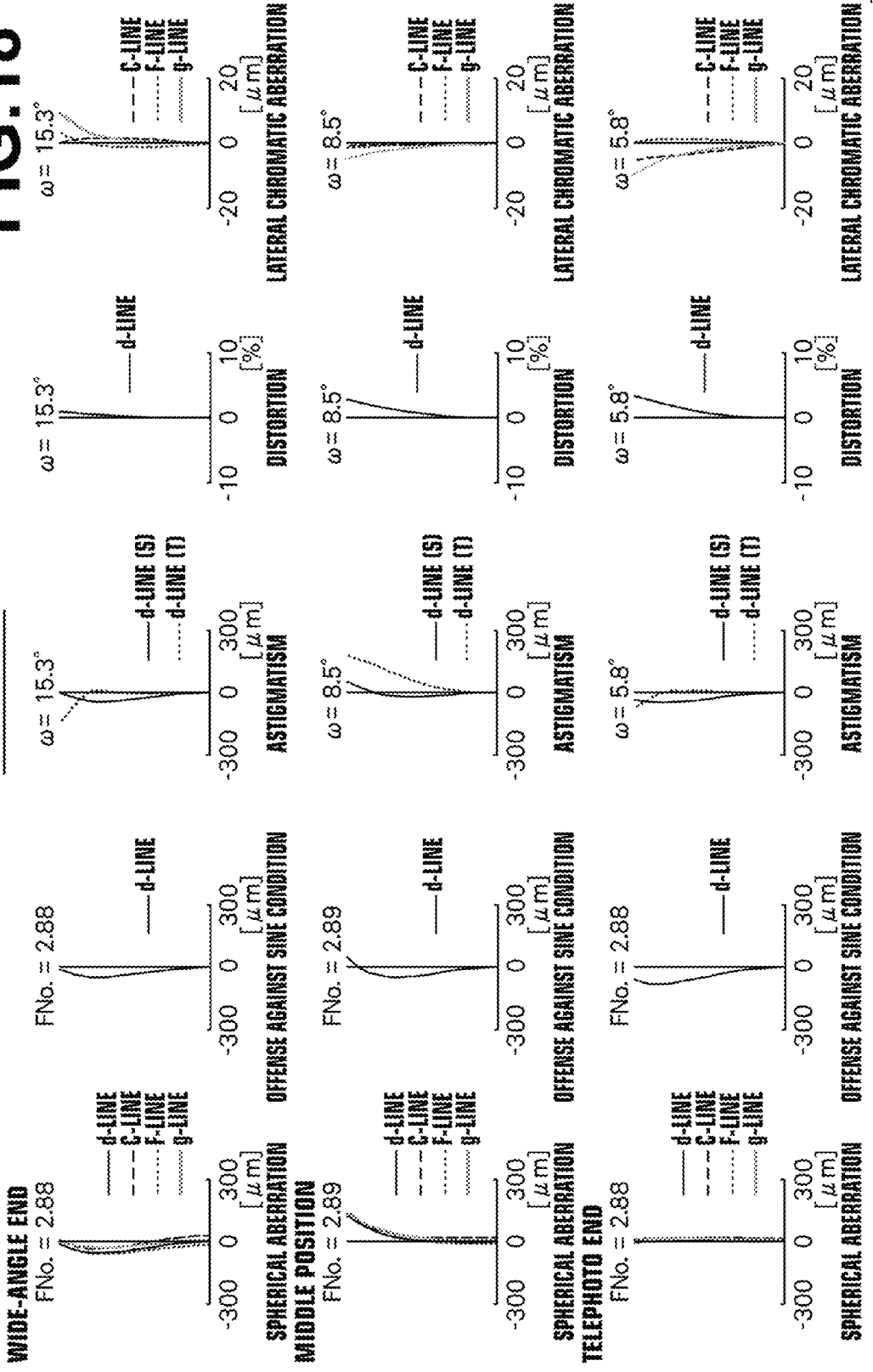
FIG. 18 shows aberration diagrams of the zoom lens of Example 7 of the invention.

Next, a zoom lens of Example 7 is described. The zoom lens of Example 7 has a lens group configuration similar to that of the zoom lens of Example 1. FIG. 7 is a sectional view illustrating the lens configuration of the zoom lens of Example 7. Table 19 shows basic lens data of the zoom lens of Example 7, Table 20 shows data about specifications of the zoom lens, Table 21 shows data about distances between surfaces to be moved of the zoom lens, FIG. 18 shows aberration diagrams of the zoom lens, and FIG. 29 shows lateral aberration diagrams of the zoom lens.

TABLE 19

Example 7 - Lens Data

| Surface No. | Radius of Curvature | Surface Distance | nd | vd | θgF |
|---|---|---|---|---|---|
| 1 | 358.57195 | 2.320 | 1.80100 | 34.97 | 0.58642 |
| 2 | 85.09780 | 7.200 | 1.49700 | 81.54 | 0.53748 |
| 3 | −386.19076 | 0.200 | | | |
| 4 | 72.25745 | 6.972 | 1.43875 | 94.94 | 0.53433 |
| 5 | ∞ | 0.200 | | | |
| 6 | 69.93587 | 5.200 | 1.49700 | 81.54 | 0.53748 |
| 7 | 235.70554 | DD[7] | | | |
| 8 | 96.21157 | 6.291 | 1.72047 | 34.71 | 0.58350 |
| 9 | −43.59489 | 1.530 | 1.62230 | 53.17 | 0.55424 |
| 10 | 24.59706 | 5.600 | | | |
| 11 | −73.29120 | 1.410 | 1.49700 | 81.54 | 0.53748 |
| 12 | 27.09637 | 4.000 | 1.84661 | 23.88 | 0.62072 |
| 13 | 123.98633 | 2.799 | | | |
| 14 | −30.96977 | 1.200 | 1.91082 | 35.25 | 0.58224 |
| 15 | 353.74684 | DD[15] | | | |
| 16 | −406.80952 | 2.850 | 1.80100 | 34.97 | 0.58642 |
| 17 | −43.60631 | 0.100 | | | |
| 18 | 74.86402 | 4.260 | 1.61800 | 63.33 | 0.54414 |
| 19 | −43.68363 | 1.170 | 1.80518 | 25.42 | 0.61616 |
| 20 | ∞ | DD[20] | | | |
| 21 (stop) | ∞ | 1.300 | | | |
| 22 | 28.04424 | 7.050 | 1.49700 | 81.54 | 0.53748 |
| 23 | −59.60296 | 0.150 | | | |
| 24 | 34.77250 | 2.570 | 1.65412 | 39.68 | 0.57378 |
| 25 | 89.21437 | 1.800 | | | |
| 26 | −51.39895 | 1.110 | 1.90366 | 31.31 | 0.59481 |
| 27 | 24.25217 | 5.266 | 1.49700 | 81.54 | 0.53748 |
| 28 | −60.88125 | 2.800 | | | |
| 29 | 733.80887 | 3.771 | 1.80518 | 25.42 | 0.61616 |
| 30 | −23.29690 | 0.950 | 1.58913 | 61.13 | 0.54067 |
| 31 | 39.10301 | 2.801 | | | |
| 32 | −39.71546 | 1.000 | 1.80100 | 34.97 | 0.58642 |
| 33 | 62.34880 | 4.199 | | | |
| 34 | 54.23606 | 5.285 | 1.80000 | 29.84 | 0.60178 |
| 35 | −37.12789 | 4.367 | | | |
| 36 | 51.75623 | 6.461 | 1.48749 | 70.24 | 0.53007 |

TABLE 19-continued

Example 7 - Lens Data

| Surface No. | Radius of Curvature | Surface Distance | nd | vd | θgF |
|---|---|---|---|---|---|
| 37 | −25.77385 | 1.310 | 1.80518 | 25.42 | 0.61616 |
| 38 | −86.83396 | 4.400 | | | |
| 39 | −27.43970 | 1.260 | 1.91082 | 35.25 | 0.58224 |
| 40 | −40.98080 | 25.514 | | | |
| 41 | ∞ | 2.850 | 1.51633 | 64.14 | 0.53531 |
| 42 | ∞ | | | | |

TABLE 20

Example 7 - Specification (d-line)

| | Wide Angle End | Middle | Telephoto End |
|---|---|---|---|
| Zoom Magnification | 1.0 | 1.8 | 2.6 |
| f | 51.516 | 92.222 | 135.965 |
| Bf | 29.393 | 29.393 | 29.393 |
| FNo. | 2.88 | 2.89 | 2.88 |
| 2ω[°] | 30.6 | 17.0 | 11.6 |

TABLE 21

Example 7 - Distances Relating to Zoom

| | Wide Angle End | Middle | Telephoto End |
|---|---|---|---|
| DD[7] | 1.191 | 22.931 | 32.107 |
| DD[15] | 14.409 | 8.821 | 2.687 |
| DD[20] | 29.090 | 12.939 | 9.896 |

Figure 19:
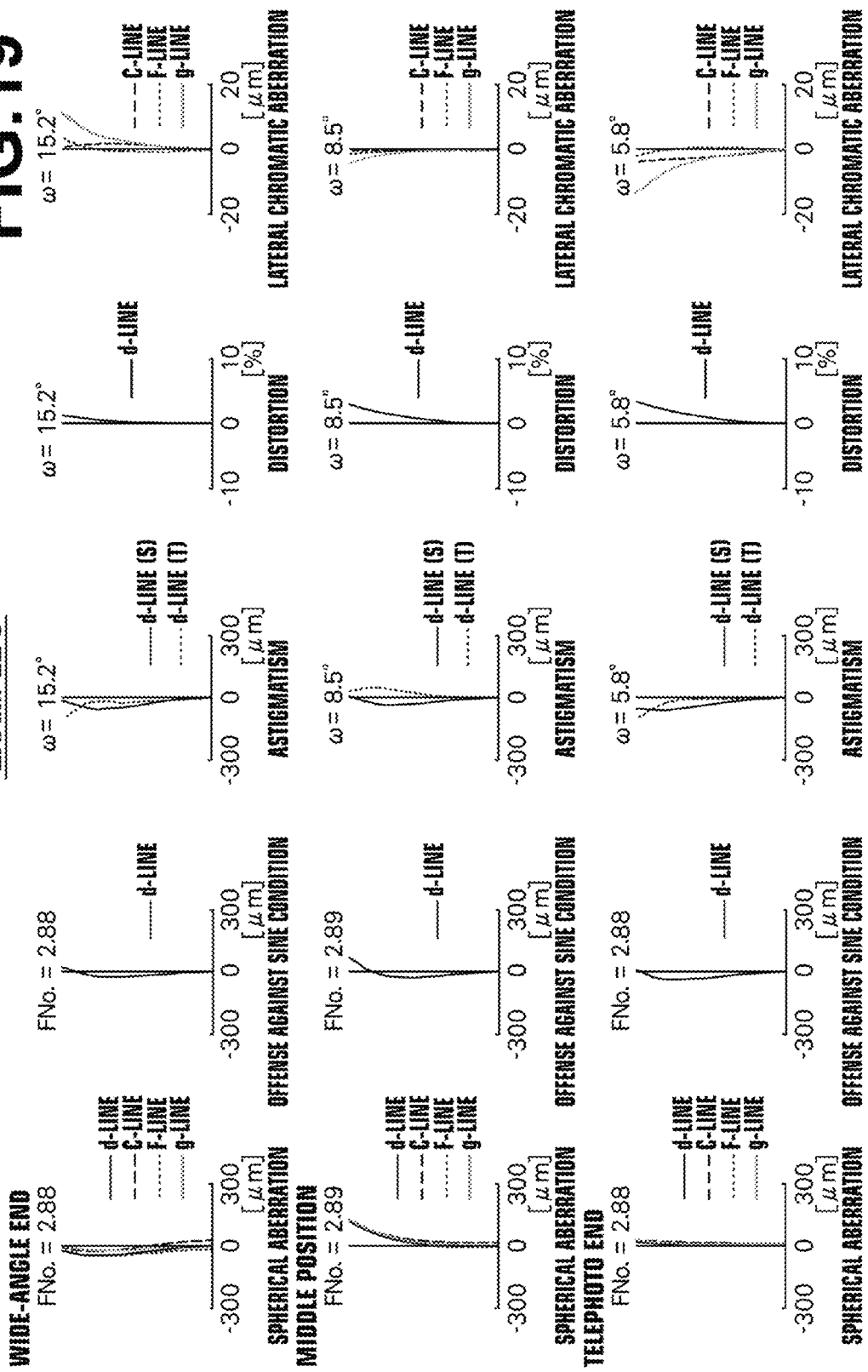
FIG. 19 shows aberration diagrams of the zoom lens of Example 8 of the invention.

Next, a zoom lens of Example 8 is described. The zoom lens of Example 8 has a five-group configuration which consists of, in order from the object side, a first lens group G1 having a positive refractive power, a second lens group G2 having a negative refractive power, a third lens group G3 having a negative refractive power, a fourth lens group G4 (the mp lens group) having a positive refractive power, and a fifth lens group G5 (the rearmost lens group) having a positive refractive power. FIG. 8 is a sectional view illustrating the lens configuration of the zoom lens of Example 8. Table 22 shows basic lens data of the zoom lens of Example 8, Table 23 shows data about specifications of the zoom lens, Table 24 shows data about distances between surfaces to be moved of the zoom lens, FIG. 19 shows aberration diagrams of the zoom lens, and FIG. 30 shows lateral aberration diagrams of the zoom lens.

TABLE 22

Example 8 - Lens Data

| Surface No. | Radius of Curvature | Surface Distance | nd | vd | θgF |
|---|---|---|---|---|---|
| 1 | 303.47850 | 2.390 | 1.80100 | 34.97 | 0.58642 |
| 2 | 75.71759 | 7.850 | 1.49700 | 81.54 | 0.53748 |
| 3 | −338.62836 | 0.200 | | | |
| 4 | 67.27723 | 6.600 | 1.43875 | 94.94 | 0.53433 |
| 5 | 706.55071 | 0.200 | | | |
| 6 | 67.16666 | 4.950 | 1.49700 | 81.54 | 0.53748 |
| 7 | 287.46150 | DD[7] | | | |
| 8 | 98.18370 | 5.710 | 1.72047 | 34.71 | 0.58350 |
| 9 | −49.05401 | 1.550 | 1.62230 | 53.17 | 0.55424 |
| 10 | 24.62771 | DD[10] | | | |
| 11 | −75.51985 | 1.260 | 1.49700 | 81.54 | 0.53748 |
| 12 | 25.58057 | 5.388 | 1.84661 | 23.88 | 0.62072 |

TABLE 22-continued

Example 8 - Lens Data

| Surface No. | Radius of Curvature | Surface Distance | nd | νd | θgF |
|---|---|---|---|---|---|
| 13 | 106.72525 | 3.704 | | | |
| 14 | −31.24101 | 1.250 | 1.91082 | 35.25 | 0.58224 |
| 15 | 268.03486 | DD[15] | | | |
| 16 | −521.95122 | 2.950 | 1.80100 | 34.97 | 0.58642 |
| 17 | −44.70833 | 0.100 | | | |
| 18 | 73.37158 | 4.310 | 1.61800 | 63.33 | 0.54414 |
| 19 | −43.22381 | 1.150 | 1.80518 | 25.42 | 0.61616 |
| 20 | ∞ | DD[20] | | | |
| 21 (stop) | ∞ | 1.300 | | | |
| 22 | 27.81729 | 6.868 | 1.49700 | 81.54 | 0.53748 |
| 23 | −57.84476 | 0.150 | | | |
| 24 | 34.09999 | 2.550 | 1.65412 | 39.68 | 0.57378 |
| 25 | 102.68991 | 1.610 | | | |
| 26 | −54.83237 | 1.210 | 1.90366 | 31.31 | 0.59481 |
| 27 | 23.14151 | 5.662 | 1.49700 | 81.54 | 0.53748 |
| 28 | −87.93105 | 2.500 | | | |
| 29 | 372.91281 | 3.771 | 1.80518 | 25.42 | 0.61616 |
| 30 | −24.31863 | 0.950 | 1.58913 | 61.13 | 0.54067 |
| 31 | 36.29877 | 3.256 | | | |
| 32 | −44.08151 | 1.050 | 1.80100 | 34.97 | 0.58642 |
| 33 | 60.80519 | 3.831 | | | |
| 34 | 50.53032 | 5.748 | 1.80000 | 29.84 | 0.60178 |
| 35 | −39.43779 | 4.000 | | | |
| 36 | 48.86127 | 8.012 | 1.48749 | 70.24 | 0.53007 |
| 37 | −26.40743 | 1.310 | 1.80518 | 25.42 | 0.61616 |
| 38 | −86.68447 | 3.157 | | | |
| 39 | −27.70770 | 1.310 | 1.91082 | 35.25 | 0.58224 |
| 40 | −44.10429 | 24.901 | | | |
| 41 | ∞ | 2.850 | 1.51633 | 64.14 | 0.53531 |
| 42 | ∞ | | | | |

TABLE 23

Example 8- Specification (d-line)

| | Wide Angle End | Middle | Telephoto End |
|---|---|---|---|
| Zoom Magnification | 1.0 | 1.8 | 2.6 |
| f | 51.514 | 92.218 | 135.960 |
| Bf | 28.781 | 28.781 | 28.781 |
| FNo. | 2.88 | 2.89 | 2.88 |
| 2ω[°] | 30.4 | 17.0 | 11.6 |

TABLE 24

Example 8 - Distances Relating to Zoom

| | Wide Angle End | Middle | Telephoto End |
|---|---|---|---|
| DD[7] | 1.199 | 20.933 | 29.242 |
| DD[10] | 6.235 | 6.638 | 6.783 |
| DD[15] | 14.153 | 8.593 | 2.488 |
| DD[20] | 26.710 | 12.132 | 9.785 |

Figure 9:
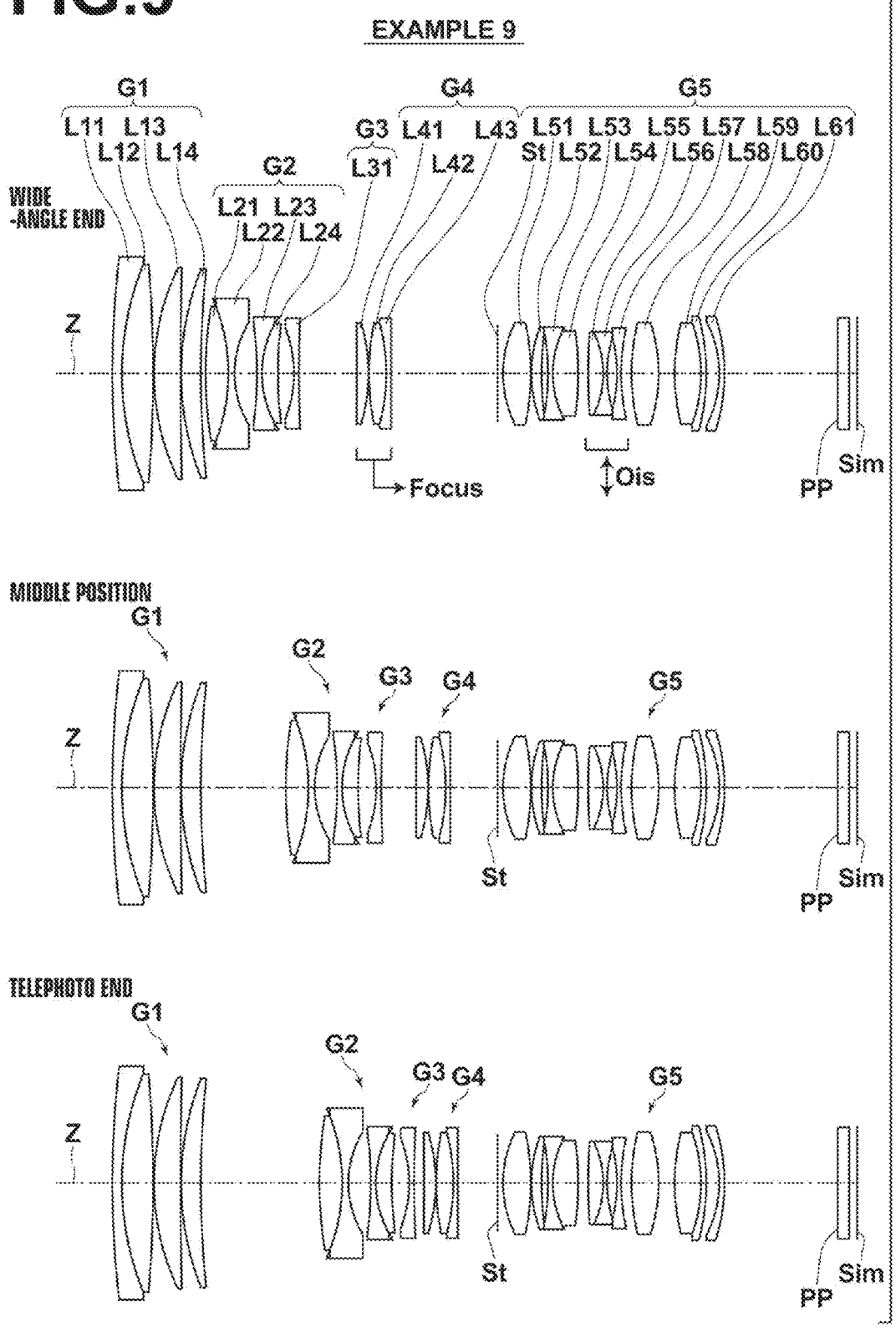
FIG. 9 is a sectional view illustrating the lens configuration of a zoom lens of Example 9 of the invention.
Figure 20:
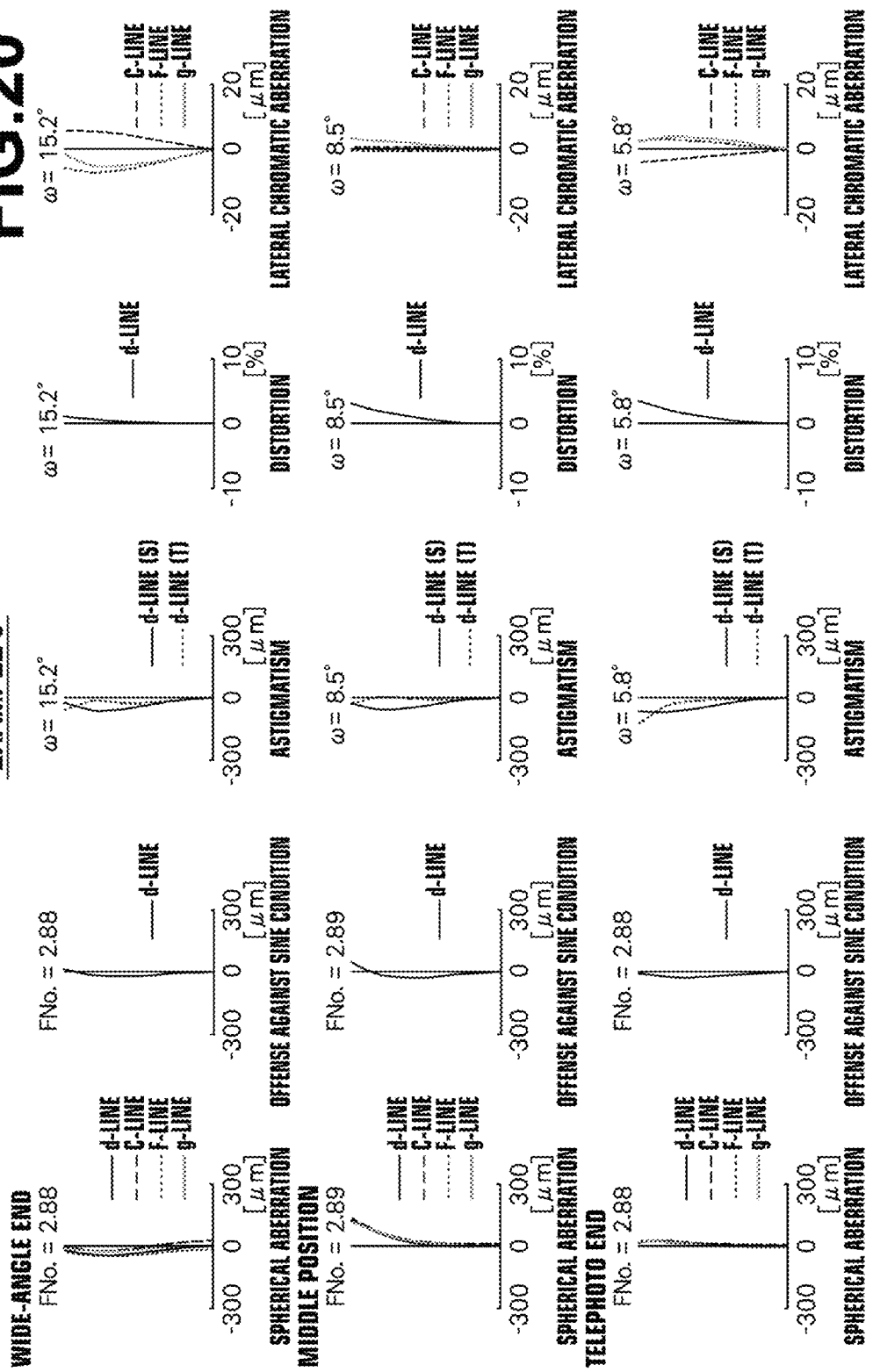
FIG. 20 shows aberration diagrams of the zoom lens of Example 9 of the invention.

Next, a zoom lens of Example 9 is described. The zoom lens of Example 9 has a lens group configuration similar to that of the zoom lens of Example 8. FIG. 9 is a sectional view illustrating the lens configuration of the zoom lens of Example 9. Table 25 shows basic lens data of the zoom lens of Example 9, Table 26 shows data about specifications of the zoom lens, Table 27 shows data about distances between surfaces to be moved of the zoom lens, FIG. 20 shows aberration diagrams of the zoom lens, and FIG. 31 shows lateral aberration diagrams of the zoom lens.

TABLE 25

Example 9 - Lens Data

| Surface No. | Radius of Curvature | Surface Distance | nd | νd | θgF |
|---|---|---|---|---|---|
| 1 | 257.91881 | 2.390 | 1.83400 | 37.16 | 0.57759 |
| 2 | 73.18612 | 7.850 | 1.49700 | 81.54 | 0.53748 |
| 3 | −329.42308 | 0.200 | | | |
| 4 | 62.30117 | 6.600 | 1.43700 | 95.10 | 0.53364 |
| 5 | 849.43043 | 0.200 | | | |
| 6 | 72.87230 | 4.950 | 1.49700 | 81.54 | 0.53748 |
| 7 | 263.78540 | DD[7] | | | |
| 8 | 107.78333 | 5.710 | 1.72047 | 34.71 | 0.58350 |
| 9 | −47.76821 | 1.550 | 1.62230 | 53.17 | 0.55424 |
| 10 | 25.18309 | 5.631 | | | |
| 11 | −93.23488 | 1.260 | 1.49700 | 81.54 | 0.53748 |
| 12 | 26.34063 | 3.999 | 1.84661 | 23.88 | 0.62072 |
| 13 | 99.67576 | DD[13] | | | |
| 14 | −31.09640 | 1.250 | 1.91082 | 35.25 | 0.58224 |
| 15 | 318.83279 | DD[15] | | | |
| 16 | −974.57258 | 2.950 | 1.80100 | 34.97 | 0.58642 |
| 17 | −43.76266 | 0.100 | | | |
| 18 | 65.14269 | 4.310 | 1.53775 | 74.70 | 0.53936 |
| 19 | −49.97731 | 1.150 | 1.80518 | 25.42 | 0.61616 |
| 20 | ∞ | DD[20] | | | |
| 21 (stop) | ∞ | 1.300 | | | |
| 22 | 28.69392 | 7.001 | 1.49700 | 81.54 | 0.53748 |
| 23 | −59.87797 | 0.150 | | | |
| 24 | 34.09590 | 2.550 | 1.65412 | 39.68 | 0.57378 |
| 25 | 85.63948 | 1.610 | | | |
| 26 | −54.93056 | 1.210 | 1.90366 | 31.31 | 0.59481 |
| 27 | 24.95033 | 6.359 | 1.49700 | 81.54 | 0.53748 |
| 28 | −76.31225 | 2.500 | | | |
| 29 | 141.63653 | 3.771 | 1.80518 | 25.42 | 0.61616 |
| 30 | −23.83965 | 0.950 | 1.58913 | 61.13 | 0.54067 |
| 31 | 30.73799 | 2.499 | | | |
| 32 | −37.50492 | 1.050 | 1.80100 | 34.97 | 0.58642 |
| 33 | 53.05759 | 2.617 | | | |
| 34 | 55.65453 | 6.802 | 1.83400 | 37.16 | 0.57759 |
| 35 | −41.09507 | 4.001 | | | |
| 36 | 52.54294 | 6.611 | 1.48749 | 70.24 | 0.53007 |
| 37 | −38.16059 | 1.310 | 1.80518 | 25.42 | 0.61616 |
| 38 | −57.00236 | 3.270 | | | |
| 39 | −28.19030 | 1.310 | 1.91082 | 35.25 | 0.58224 |
| 40 | −47.93144 | 28.451 | | | |
| 41 | ∞ | 2.850 | 1.51633 | 64.14 | 0.53531 |
| 42 | ∞ | | | | |

TABLE 26

Example 9- Specification (d-line)

| | Wide Angle End | Middle | Telephoto End |
|---|---|---|---|
| Zoom Magnification | 1.0 | 1.8 | 2.6 |
| f | 51.526 | 92.240 | 135.992 |
| Bf | 32.332 | 32.332 | 32.332 |
| FNo. | 2.88 | 2.89 | 2.88 |
| 2ω[°] | 30.4 | 17.0 | 11.6 |

TABLE 27

Example 9 - Distances Relating to Zoom

| | Wide Angle End | Middle | Telephoto End |
|---|---|---|---|
| DD[7] | 1.199 | 21.287 | 29.769 |
| DD[13] | 4.000 | 4.585 | 4.348 |
| DD[15] | 14.542 | 8.794 | 2.472 |
| DD[20] | 26.846 | 11.921 | 9.998 |

Figure 21:
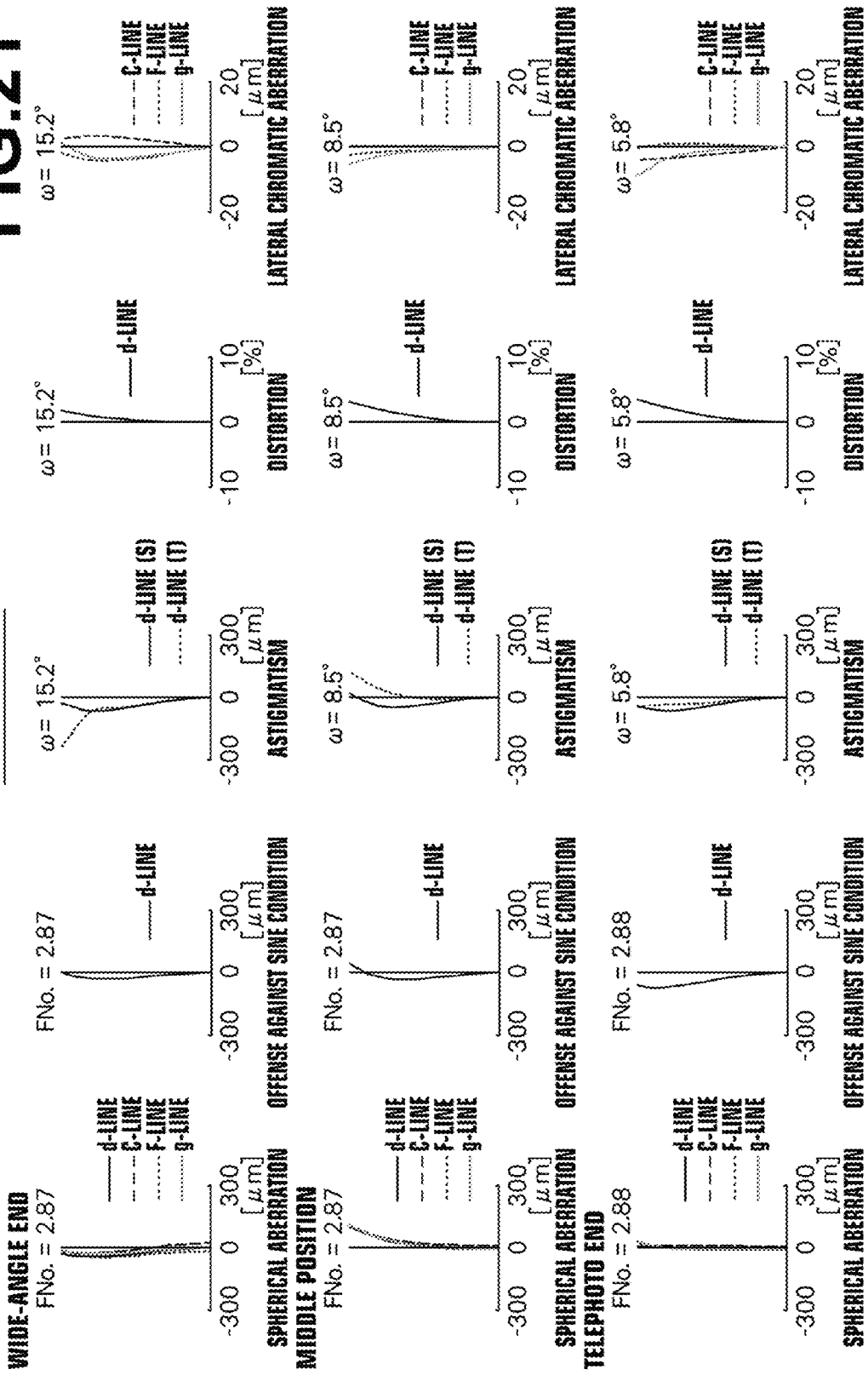
FIG. 21 shows aberration diagrams of the zoom lens of Example 10 of the invention.

Next, a zoom lens of Example 10 is described. The zoom lens of Example 10 has a lens group configuration similar to that of the zoom lens of Example 1. FIG. 10 is a sectional view illustrating the lens configuration of the zoom lens of Example 10. Table 28 shows basic lens data of the zoom lens of Example 10, Table 29 shows data about specifications of the zoom lens, Table 30 shows data about distances between surfaces to be moved of the zoom lens, FIG. 21 shows aberration diagrams of the zoom lens, and FIG. 32 shows lateral aberration diagrams of the zoom lens.

TABLE 28

Example 10 - Lens Data

| Surface No. | Radius of Curvature | Surface Distance | nd | νd | θgF |
|---|---|---|---|---|---|
| 1 | 206.18300 | 2.390 | 1.80100 | 34.97 | 0.58642 |
| 2 | 77.37033 | 7.850 | 1.43875 | 94.94 | 0.53433 |
| 3 | −468.12933 | 0.200 | | | |
| 4 | 68.18946 | 6.600 | 1.43875 | 94.94 | 0.53433 |
| 5 | 665.76128 | 0.200 | | | |
| 6 | 75.70042 | 4.950 | 1.49700 | 81.54 | 0.53748 |
| 7 | 318.83987 | DD[7] | | | |
| 8 | 97.24407 | 5.710 | 1.72047 | 34.71 | 0.58350 |
| 9 | −43.72645 | 1.550 | 1.62230 | 53.17 | 0.55424 |
| 10 | 24.36854 | 5.706 | | | |
| 11 | −73.08228 | 1.260 | 1.49700 | 81.54 | 0.53748 |
| 12 | 25.31089 | 4.204 | 1.84661 | 23.88 | 0.62072 |
| 13 | 107.97061 | 2.799 | | | |
| 14 | −30.56048 | 1.250 | 1.91082 | 35.25 | 0.58224 |
| 15 | 253.08206 | DD[15] | | | |
| 16 | −16125.23228 | 2.950 | 1.80100 | 34.97 | 0.58642 |
| 17 | −40.12049 | 0.100 | | | |
| 18 | 80.78359 | 4.310 | 1.59282 | 68.62 | 0.54414 |
| 19 | −40.99835 | 1.150 | 1.84666 | 23.78 | 0.62054 |
| 20 | −145.20798 | 7.757 | | | |
| 21 | −92.18977 | 1.500 | 1.80000 | 29.84 | 0.60178 |
| 22 | −254.53436 | DD[22] | | | |
| 23 (stop) | ∞ | 1.300 | | | |
| 24 | 27.68095 | 7.001 | 1.49700 | 81.54 | 0.53748 |
| 25 | −56.35341 | 0.150 | | | |
| 26 | 32.42093 | 2.550 | 1.65412 | 39.68 | 0.57378 |
| 27 | 119.28847 | 1.610 | | | |
| 28 | −55.80214 | 1.210 | 1.90366 | 31.31 | 0.59481 |
| 29 | 23.16845 | 6.126 | 1.49700 | 81.54 | 0.53748 |
| 30 | −90.54469 | 2.500 | | | |
| 31 | 590.71987 | 3.771 | 1.80518 | 25.42 | 0.61616 |
| 32 | −24.23391 | 0.950 | 1.58913 | 61.13 | 0.54067 |
| 33 | 37.50164 | 3.358 | | | |
| 34 | −43.90672 | 1.050 | 1.80100 | 34.97 | 0.58642 |
| 35 | 57.93149 | 4.715 | | | |
| 36 | 51.33459 | 5.893 | 1.80000 | 29.84 | 0.60178 |
| 37 | −38.45068 | 1.953 | | | |
| 38 | 50.11025 | 7.136 | 1.48749 | 70.24 | 0.53007 |
| 39 | −28.43175 | 1.310 | 1.80518 | 25.42 | 0.61616 |
| 40 | −83.91857 | 4.329 | | | |
| 41 | −26.99010 | 1.310 | 1.91082 | 35.25 | 0.58224 |
| 42 | −47.11637 | 24.016 | | | |
| 43 | ∞ | 2.850 | 1.51633 | 64.14 | 0.53531 |
| 44 | ∞ | | | | |

TABLE 29

Example 10 - Specification (d-line)

| | Wide Angle End | Middle | Telephoto End |
|---|---|---|---|
| Zoom Magnification | 1.0 | 1.8 | 2.6 |
| f | 51.519 | 92.228 | 135.974 |
| Bf | 27.894 | 27.894 | 27.894 |
| FNo. | 2.87 | 2.87 | 2.88 |
| 2ω[°] | 30.4 | 17.0 | 11.6 |

TABLE 30

Example 10 - Distances Relating to Zoom

| | Wide Angle End | Middle | Telephoto End |
|---|---|---|---|
| DD[7] | 1.279 | 23.274 | 32.917 |
| DD[15] | 11.721 | 7.221 | 2.117 |
| DD[22] | 23.835 | 6.340 | 1.801 |

Figure 22:
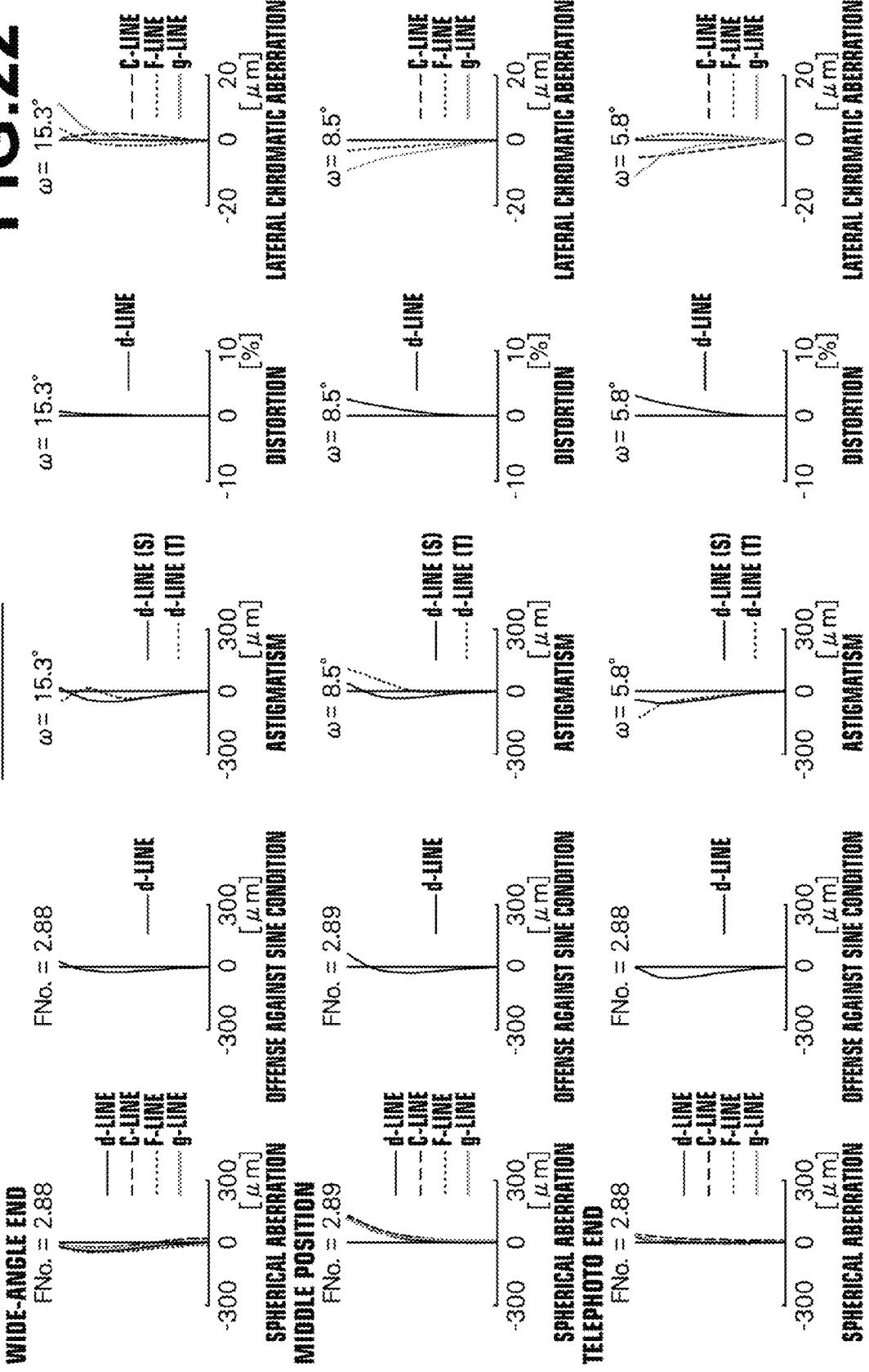
FIG. 22 shows aberration diagrams of the zoom lens of Example 11 of the invention.

Next, a zoom lens of Example 11 is described. The zoom lens of Example 11 has a lens group configuration similar to that of the zoom lens of Example 1. FIG. 11 is a sectional view illustrating the lens configuration of the zoom lens of Example 11. Table 31 shows basic lens data of the zoom lens of Example 11, Table 32 shows data about specifications of the zoom lens, Table 33 shows data about distances between surfaces to be moved of the zoom lens, FIG. 22 shows aberration diagrams of the zoom lens, and FIG. 33 shows lateral aberration diagrams of the zoom lens.

TABLE 31

Example 11 - Lens Data

| Surface No. | Radius of Curvature | Surface Distance | nd | νd | θgF |
|---|---|---|---|---|---|
| 1 | 180.37474 | 2.390 | 1.80100 | 34.97 | 0.58642 |
| 2 | 69.14868 | 7.850 | 1.49700 | 81.54 | 0.53748 |
| 3 | −481.66507 | 0.200 | | | |
| 4 | 60.15068 | 7.500 | 1.43875 | 94.94 | 0.53433 |
| 5 | 1142.76498 | 0.200 | | | |
| 6 | 76.86117 | 4.500 | 1.49700 | 81.54 | 0.53748 |
| 7 | 187.53228 | DD[7] | | | |
| 8 | 111.60159 | 5.710 | 1.72047 | 34.71 | 0.58350 |
| 9 | −39.89381 | 1.550 | 1.62230 | 53.17 | 0.55424 |
| 10 | 24.07077 | 4.980 | | | |
| 11 | −64.75230 | 1.260 | 1.49700 | 81.54 | 0.53748 |
| 12 | 24.25512 | 5.408 | 1.84661 | 23.88 | 0.62072 |
| 13 | 94.37171 | 2.799 | | | |
| 14 | −28.39083 | 1.250 | 1.91082 | 35.25 | 0.58224 |
| 15 | 193.35819 | DD[15] | | | |
| 16 | −2763.02905 | 2.950 | 1.80100 | 34.97 | 0.58642 |
| 17 | −42.42344 | 0.100 | | | |
| 18 | 118.96564 | 4.310 | 1.59282 | 68.62 | 0.54414 |
| 19 | −37.94715 | 1.150 | 1.84666 | 23.78 | 0.62054 |
| 20 | −229.69252 | 7.412 | | | |
| 21 | 389.16162 | 2.200 | 1.68893 | 31.07 | 0.60041 |
| 22 | −215.34129 | DD[22] | | | |
| 23 (stop) | ∞ | 1.300 | | | |
| 24 | 27.53581 | 7.001 | 1.49700 | 81.54 | 0.53748 |
| 25 | −57.95147 | 0.150 | | | |
| 26 | 36.50795 | 2.550 | 1.65412 | 39.68 | 0.57378 |
| 27 | 105.69164 | 1.610 | | | |
| 28 | −54.28866 | 1.210 | 1.90366 | 31.31 | 0.59481 |
| 29 | 22.84035 | 6.968 | 1.49700 | 81.54 | 0.53748 |
| 30 | −80.66013 | 2.500 | | | |
| 31 | 381.31349 | 3.771 | 1.80518 | 25.42 | 0.61616 |
| 32 | −25.25989 | 0.950 | 1.58913 | 61.13 | 0.54067 |
| 33 | 39.74943 | 3.501 | | | |
| 34 | −39.07424 | 1.050 | 1.80100 | 34.97 | 0.58642 |
| 35 | 67.59646 | 4.073 | | | |
| 36 | 53.40416 | 5.837 | 1.80000 | 29.84 | 0.60178 |
| 37 | −38.04851 | 4.001 | | | |
| 38 | 47.49724 | 6.893 | 1.48749 | 70.24 | 0.53007 |
| 39 | −27.13146 | 1.310 | 1.80518 | 25.42 | 0.61616 |
| 40 | −85.37597 | 3.001 | | | |
| 41 | −29.19153 | 1.310 | 1.91082 | 35.25 | 0.58224 |
| 42 | −47.66122 | 25.665 | | | |
| 43 | ∞ | 2.850 | 1.51633 | 64.14 | 0.53531 |
| 44 | ∞ | | | | |

TABLE 32

| Example 11- Specification (d-line) | | | |
|---|---|---|---|
| | Wide Angle End | Middle | Telephoto End |
| Zoom Magnification | 1.0 | 1.8 | 2.6 |
| f | 51.511 | 92.212 | 135.951 |
| Bf | 29.545 | 29.545 | 29.545 |
| FNo. | 2.88 | 2.89 | 2.88 |
| 2ω[°] | 30.6 | 17.0 | 11.6 |

TABLE 33

| Example 11 - Distances Relating to Zoom | | | |
|---|---|---|---|
| | Wide Angle End | Middle | Telephoto End |
| DD[7] | 1.697 | 21.960 | 30.401 |
| DD[15] | 10.593 | 6.211 | 1.452 |
| DD[22] | 21.360 | 5.480 | 1.796 |

Table 34 shows values corresponding to the condition expressions (1) to (5) of the zoom lenses of Examples 1 to 11. In all the examples, the d-line is used as a reference wavelength, and the values shown in Table 34 below are with respect to the reference wavelength.

TABLE 34

| No. | Condition Expression | Example 1 | Example 2 | Example 3 | Example 4 | Example 5 | Example 6 |
|---|---|---|---|---|---|---|---|
| (1) | f1/fGf | 2.214 | 1.996 | 1.870 | 1.844 | 1.842 | 2.043 |
| (2) | f1/fGr | 1.375 | 1.631 | 1.393 | 1.272 | 1.384 | 1.530 |
| (3) | ft/f1 | 1.477 | 1.380 | 1.678 | 1.722 | 1.413 | 1.277 |
| (4) | ft/|f2| | 7.637 | 6.780 | 7.857 | 7.041 | 6.628 | 5.890 |
| (5) | vdGmp | 63.33 | 70.23 | 60.29 | 63.33 | 63.33 | 63.33 |
| No. | Condition Expression | Example 7 | Example 8 | Example 9 | Example 10 | Example 11 | |
| (1) | f1/fGf | 1.880 | 1.787 | 1.799 | 2.470 | 1.770 | |
| (2) | f1/fGr | 1.394 | 1.339 | 1.326 | 1.548 | 1.282 | |
| (3) | ft/f1 | 1.498 | 1.583 | 1.572 | 1.477 | 1.592 | |
| (4) | ft/|f2| | 7.009 | 7.342 | 7.204 | 7.331 | 8.313 | |
| (5) | vdGmp | 63.33 | 63.33 | 67.73 | 68.62 | 68.62 | |

As can be seen from the above-described data, each of the zoom lenses of Examples 1 to 11 satisfies the condition expressions (1) to (5), and is a telephoto zoom lens having an angle of view of about 10 to 13 degrees at the telephoto end, a zoom ratio of about 2.4 to 3.1, a high aperture ratio with a maximum aperture of about F2.8 across the entire zoom range, and having high optical performance, wherein the focusing lens group is compact and light weight, and the amount of movement of the focusing lens group is small.

Figure 34:
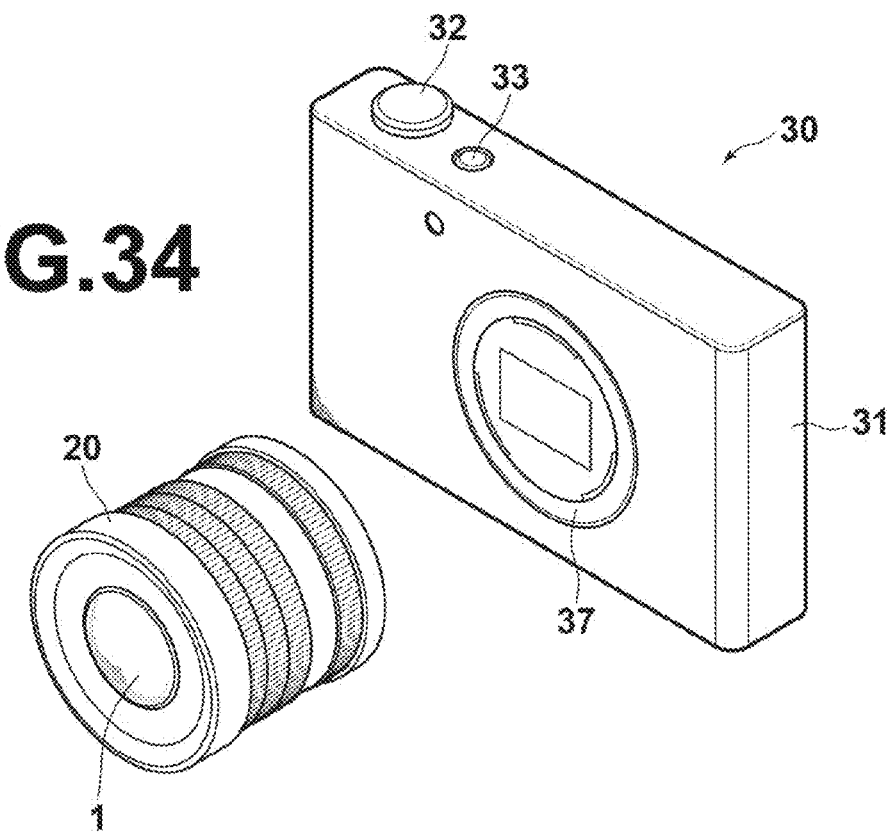
FIG. 34 is a perspective view showing the front side of an imaging apparatus according to one embodiment of the invention.
Figure 35:
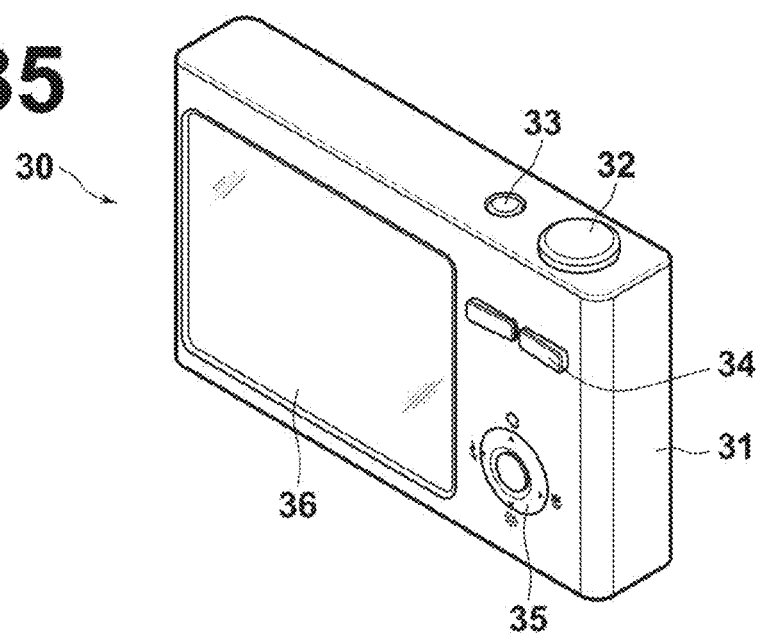
FIG. 35 is a perspective view showing the rear side of the imaging apparatus shown in FIG. 34.

Next, one embodiment of an imaging apparatus according to the invention is described with reference to FIGS. 34 and 35. FIGS. 34 and 35 are perspective views showing the front side and the rear side, respectively, of a camera 30. The camera 30 is a non-reflex digital camera, to which a replaceable lens 20 formed by a zoom lens 1 according to the embodiment of the invention housed in a lens barrel is removably mounted.

The camera 30 includes a camera body 31, and a shutter button 32 and a power button 33 are disposed on the top side of the camera body 31. On the rear side of the camera body 31, operation sections 34 and 35, and a display section 36 are disposed. The display section 36 displays a taken image, and an image within the angle of view before an imaging operation is performed.

At the center of the front side of the camera body 31, an imaging aperture, through which light from the subject enters, is formed, and a mount 37 is disposed at the position corresponding to the imaging aperture. The replaceable lens 20 is mounted on the camera body 31 via the mount 37.

In the camera body 31, an image sensor (not shown), such as a CCD, for receiving an image of the subject formed by the replaceable lens 20 and outputting an image signal according to the image of the subject, a signal processing circuit for processing the image signal outputted from the image sensor to generate an image, a recording medium for recording the generated image, etc., are disposed. With this camera 30, a still image or a moving image can be taken when the shutter button 32 is pressed, and the image data obtained by the imaging operation is recorded in the recording medium.

The camera 30 of this embodiment, which is provided with the zoom lens 1 of the invention, is compact and light weight, and allows obtaining high quality images.

The present invention has been described with reference to the embodiments and the examples. However, the invention is not limited to the above-described embodiments and examples, and various modifications may be made to the invention. For example, the values of the radius of curvature, the surface distance, the refractive index, the Abbe number, the aspheric coefficients, etc., of each lens are not limited to the values shown in the above-described examples and may take different values.

While the embodiment of the imaging apparatus is described and shown in the drawings as a non-reflex (so-called mirrorless) digital camera as an example, this is not intended to limit the imaging apparatus of the invention. For example, the invention is also applicable to imaging apparatuses, such as video cameras, digital cameras, motion picture cameras, and broadcasting cameras.

What is claimed is:

1. A zoom lens consisting of four or five lens groups as a whole, which consist of, in order from an object side, a first lens group having a positive refractive power, a second lens group having a negative refractive power, one or two middle lens groups including a mp lens group having a positive refractive power, and a rearmost lens group disposed at the most image side position of the entire system and having a positive refractive power, wherein magnification change is effected by changing all distances between the adjacent lens groups, focusing from an object at infinity to a closest object is effected by moving only the entire mp lens group or only a part of lens groups forming the mp lens group along an optical axis, the lens group moved during focusing includes at least one positive lens and at least one negative lens and has a positive refractive power as a whole, and the condition expressions (1) and (2) below are satisfied:

$$1.67 < f1/fGf < 2.70 \quad (1), \text{ and}$$

$$1.15 < f1/fGr < 1.85 \quad (2),$$

where f1 is a focal length of the first lens group, fGf is a focal length of the lens group moved during focusing, and fGr is a focal length of the rearmost lens group.

2. The zoom lens as claimed in claim 1, wherein the first lens group is fixed relative to an image plane during magnification change.

3. The zoom lens as claimed in claim 1, wherein the rearmost lens group is fixed relative to an image plane during magnification change.

4. The zoom lens as claimed in claim 1, wherein the lens group moved during focusing consists of two positive lenses and one negative lens.

5. The zoom lens as claimed in claim 1, wherein focusing from an object at infinity to a closest object is effected by moving only the entire mp lens group along the optical axis.

6. The zoom lens as claimed in claim 1, wherein the condition expression (3) below is satisfied:

$$1.20 < ft/f1 < 2.20 \quad (3),$$

where ft is a focal length of the entire system when the lens is focused on an object at infinity at a telephoto end.

7. The zoom lens as claimed in claim 1, wherein the condition expression (4) below is satisfied:

$$5.30 < ft/|f2| < 8.80 \quad (4),$$

where ft is a focal length of the entire system when the lens is focused on an object at infinity at a telephoto end, and f2 is a focal length of the second lens group.

8. The zoom lens as claimed in claim 1, wherein the condition expression (5) below is satisfied:

$$57 < vdGmp \quad (5),$$

where vdGmp is the largest Abbe number of the at least one positive lens in the lens group moved during focusing.

9. The zoom lens as claimed in claim 1, wherein the first lens group consists of, in order from the object side, a negative lens, a positive lens, a positive lens, and a positive lens.

10. The zoom lens as claimed in claim 1, wherein the second lens group includes two positive lenses and two negative lenses.

11. The zoom lens as claimed in claim 1, consisting of four lens groups which consist of, in order from the object side, the first lens group, the second lens group, the mp lens group, and the rearmost lens group.

12. The zoom lens as claimed in claim 1, wherein a stop is disposed at the most object-side position of the rearmost lens group.

13. The zoom lens as claimed in claim 1, wherein the condition expression (1-1) below is satisfied:

$$1.72 < f1/fGf < 2.60 \quad (1\text{-}1).$$

14. The zoom lens as claimed in claim 1, wherein the condition expression (2-1) below is satisfied:

$$1.20 < f1/fGr < 1.75 \quad (2\text{-}1).$$

15. The zoom lens as claimed in claim 1, wherein the condition expression (3-1) below is satisfied:

$$1.23 < ft/f1 < 2.00 \quad (3\text{-}1),$$

where ft is a focal length of the entire system when the lens is focused on an object at infinity at a telephoto end.

16. The zoom lens as claimed in claim 1, wherein the condition expression (4-1) below is satisfied:

$$5.50 < ft/|f2| < 8.60 \quad (4\text{-}1),$$

where ft is a focal length of the entire system when the lens is focused on an object at infinity at a telephoto end, and f2 is a focal length of the second lens group.

17. The zoom lens as claimed in claim 1, wherein the condition expression (5-1) below is satisfied:

$$57 < vdGmp < 85 \quad (5\text{-}1),$$

where vdGmp is the largest Abbe number of the at least one positive lens in the lens group moved during focusing.

18. The zoom lens as claimed in claim 1, wherein the condition expression (5-2) below is satisfied:

$$59 < vdGmp \quad (5\text{-}2),$$

where vdGmp is the largest Abbe number of the at least one positive lens in the lens group moved during focusing.

19. The zoom lens as claimed in claim 1, wherein the condition expression (5-3) below is satisfied:

$$59 < vdGmp < 85 \quad (5\text{-}3),$$

where vdGmp is the largest Abbe number of the at least one positive lens in the lens group moved during focusing.

20. An imaging apparatus comprising the zoom lens as claimed in claim 1.

* * * * *